US011870276B2

United States Patent
Yahagi et al.

(10) Patent No.: US 11,870,276 B2
(45) Date of Patent: Jan. 9, 2024

(54) WIRELESS TERMINAL APPARATUS AND WIRELESS POWER TRANSMITTER

(71) Applicant: MAXELL, LTD., Kyoto (JP)

(72) Inventors: Yasuo Yahagi, Tokyo (JP); Takatoshi Shirosugi, Tokyo (JP); Hitoshi Akiyama, Kyoto (JP); Osamu Kawamae, Kyoto (JP); Manabu Katsuki, Kyoto (JP)

(73) Assignee: MAXELL, LTD., Kyoto (JP)

( * ) Notice: Subject to any disclaimer, the term of this patent is extended or adjusted under 35 U.S.C. 154(b) by 508 days.

(21) Appl. No.: 17/263,797

(22) PCT Filed: Aug. 2, 2018

(86) PCT No.: PCT/JP2018/029039
§ 371 (c)(1),
(2) Date: Jan. 27, 2021

(87) PCT Pub. No.: WO2020/026412
PCT Pub. Date: Feb. 6, 2020

(65) Prior Publication Data
US 2021/0167638 A1    Jun. 3, 2021

(51) Int. Cl.
*H04W 72/12* (2023.01)
*H02J 50/80* (2016.01)
(Continued)

(52) U.S. Cl.
CPC .............. *H02J 50/80* (2016.02); *H02J 50/20* (2016.02); *H02J 50/40* (2016.02); *H02J 50/90* (2016.02); *H04W 72/54* (2023.01)

(58) Field of Classification Search
CPC .......... H02J 50/20; H02J 50/40; H02J 50/402; H02J 50/80; H02J 50/90; H04W 72/54
(Continued)

(56) References Cited

U.S. PATENT DOCUMENTS

| 10,193,396 B1* | 1/2019 | Bell | H02J 50/90 |
| 10,536,040 B2* | 1/2020 | Lee | H04B 5/0037 |

(Continued)

FOREIGN PATENT DOCUMENTS

| JP | 2010-028932 A | 2/2010 |
| JP | 2010-288327 A | 12/2010 |

(Continued)

OTHER PUBLICATIONS

International Search Report issued in corresponding International Patent Application No. PCT/JP2018/029039, dated Oct. 23, 2018, with English translation.

*Primary Examiner* — Robert J Lopata
(74) *Attorney, Agent, or Firm* — Rimon P.C.; Tomoki Tanida

(57) ABSTRACT

A wireless power transfer system includes a wireless terminal apparatus, a wireless power transmitter, and a wireless base station (a wide-area base station and a narrow-area base station). The wireless base station creates schedule information containing allocation of wireless resources regarding the wireless data communication and the wireless power transfer on the basis of grasp of a request of the wireless data communication and a request of the wireless power transfer from the wireless terminal apparatus, and transmits the schedule information to the wireless power transmitter and the wireless terminal apparatus. The wireless power transmitter executes the wireless power transfer to the wireless terminal apparatus in accordance with the schedule information. The wireless terminal apparatus receives the wireless power transfer from the wireless power transmitter in accordance with the schedule information, and executes the wireless data communication via the wireless base station.

24 Claims, 28 Drawing Sheets

(51) Int. Cl.
   *H02J 50/90* (2016.01)
   *H02J 50/20* (2016.01)
   *H02J 50/40* (2016.01)
   *H04W 72/54* (2023.01)

(58) Field of Classification Search
   USPC .......................................................... 370/329
   See application file for complete search history.

(56) References Cited

U.S. PATENT DOCUMENTS

| | | | |
|---|---|---|---|
| 10,575,198 B1* | 2/2020 | Dash .................... | B60P 3/00 |
| 10,727,683 B2* | 7/2020 | Kaushik .............. | H02J 7/00034 |
| 2010/0013319 A1 | 1/2010 | Kamiyama et al. | |
| 2010/0315045 A1 | 12/2010 | Zeine | |
| 2011/0184888 A1* | 7/2011 | Lee ..................... | H02J 50/40 |
| | | | 320/108 |
| 2014/0194092 A1 | 7/2014 | Wanstedt et al. | |
| 2015/0349851 A1 | 12/2015 | Yasuoka et al. | |
| 2016/0005068 A1* | 1/2016 | Im ...................... | H04B 5/0037 |
| | | | 705/14.37 |
| 2016/0094083 A1* | 3/2016 | Park .................... | H04L 12/10 |
| | | | 320/108 |
| 2018/0109150 A1* | 4/2018 | Khan ................... | H02J 50/80 |
| 2019/0023140 A1* | 1/2019 | Kim ..................... | B60L 53/12 |
| 2019/0044392 A1* | 2/2019 | Chowdhury ......... | H02J 50/12 |
| 2019/0131827 A1* | 5/2019 | Johnston ............. | H02J 7/00034 |
| 2019/0148969 A1* | 5/2019 | Casse .................. | H02J 50/23 |
| | | | 320/108 |
| 2019/0386505 A1* | 12/2019 | Lin ...................... | H04W 12/08 |
| 2020/0280342 A1* | 9/2020 | Park .................... | H04B 5/0037 |
| 2021/0265867 A1* | 8/2021 | Park .................... | G06K 7/10128 |

FOREIGN PATENT DOCUMENTS

| | | |
|---|---|---|
| JP | 5456380 B2 | 3/2014 |
| JP | 2014-128064 A | 7/2014 |
| JP | 2015-231252 A | 12/2015 |
| JP | 2017-139954 A | 8/2017 |

* cited by examiner

FIG. 12
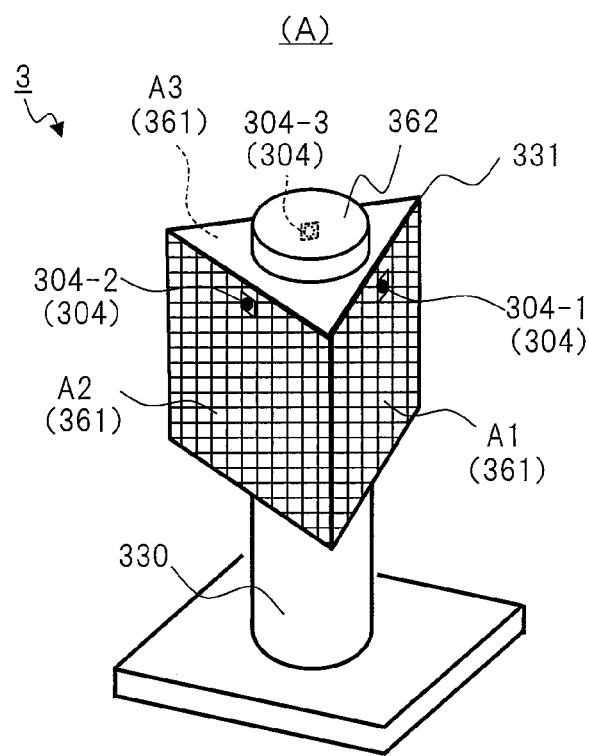
(A)
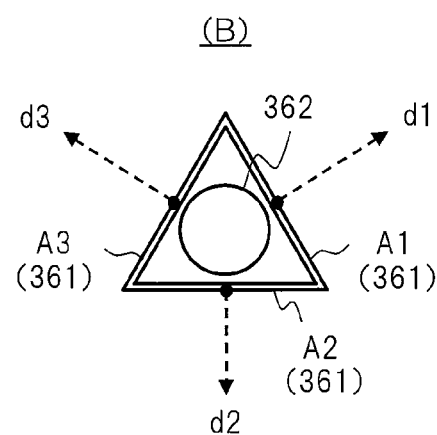
(B)

FIG. 13
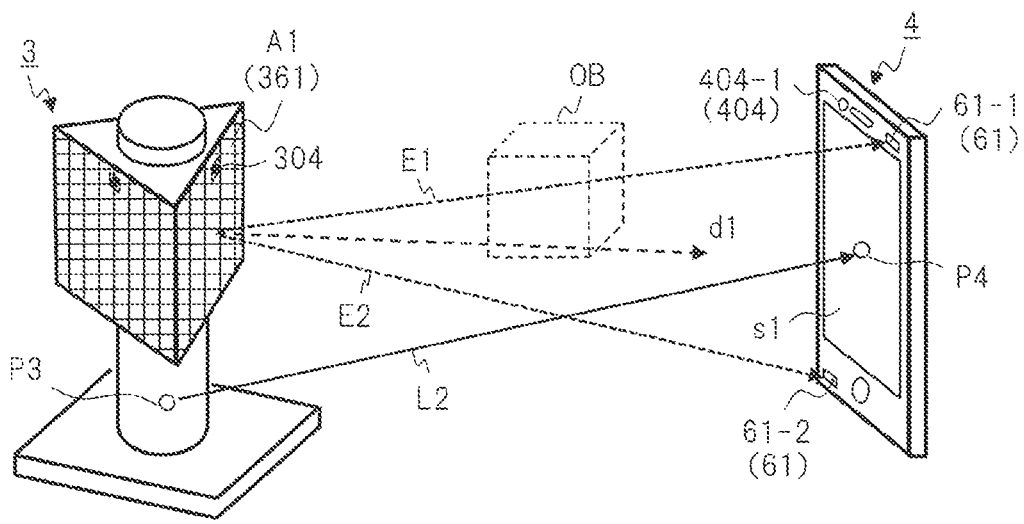
(A)
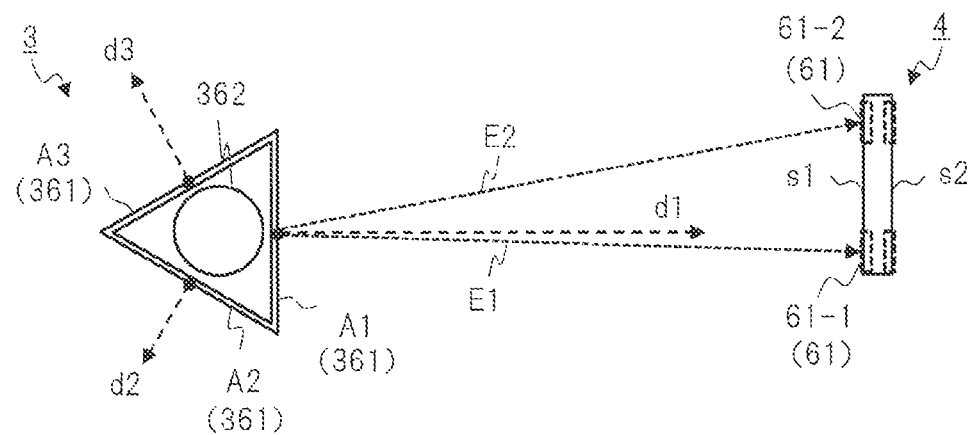
(B)
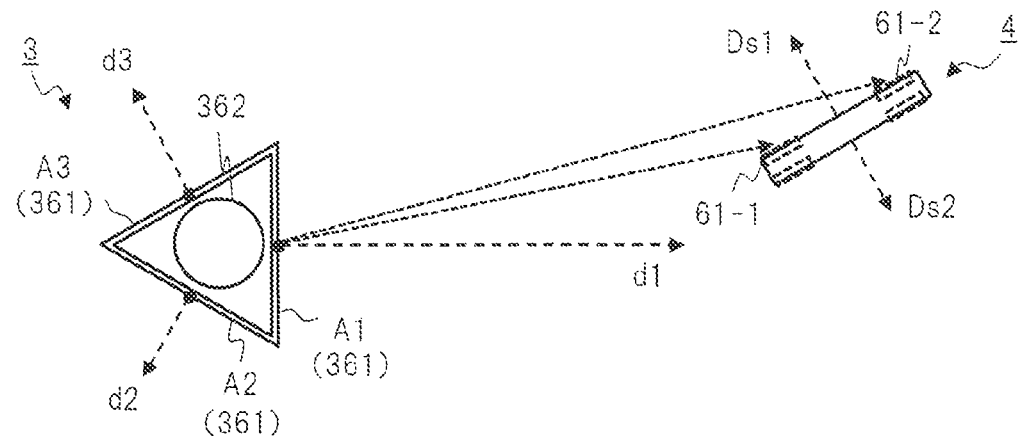
(C)

FIG. 22
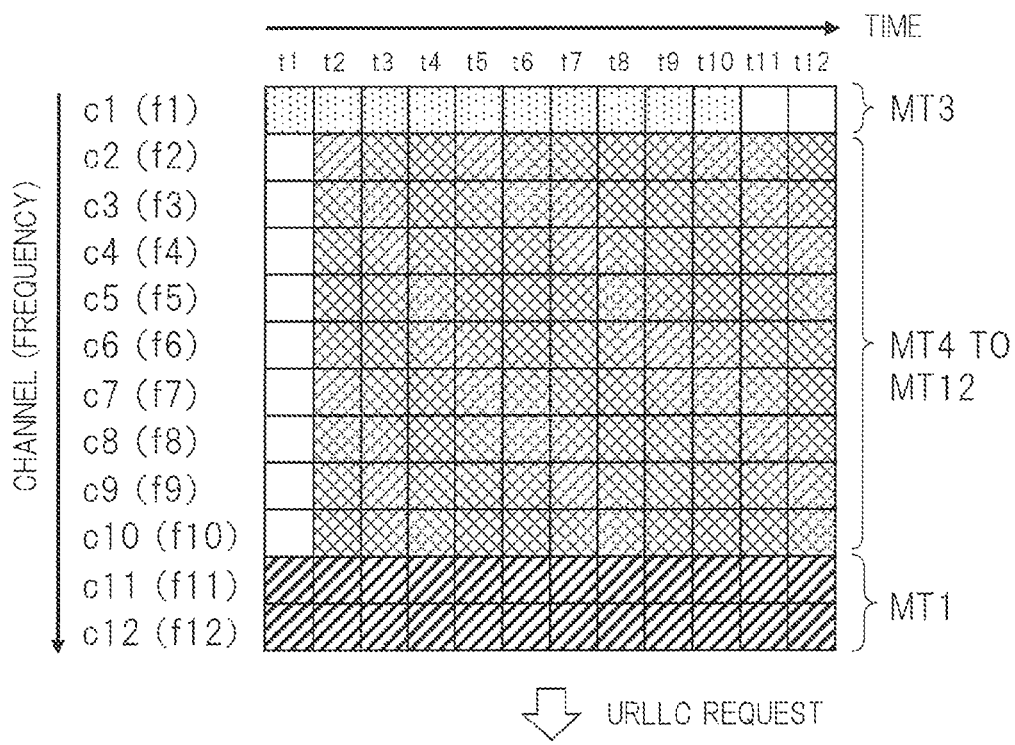
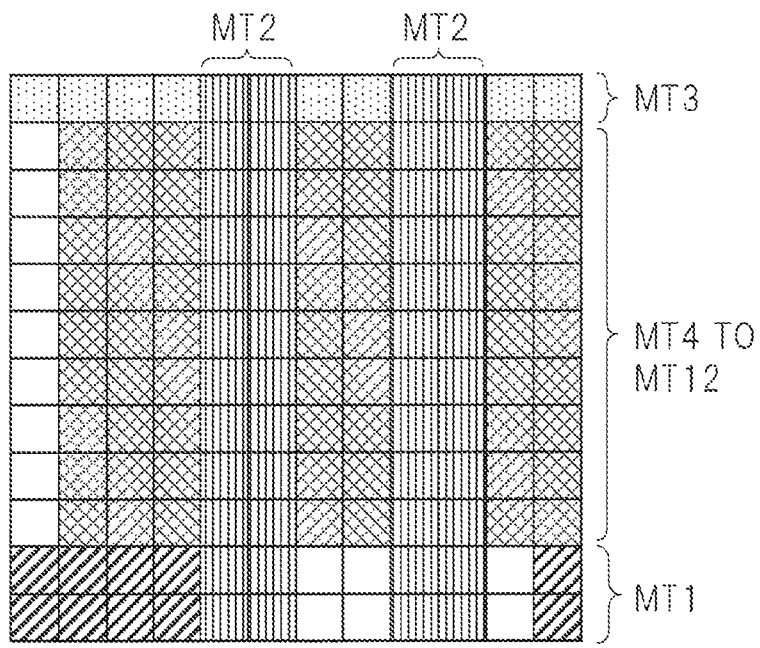

WIRELESS TERMINAL APPARATUS AND WIRELESS POWER TRANSMITTER

CROSS REFERENCE

This application is the U.S. National Phase under 35 U.S.C. § 371 of International Application No. PCT/JP2018/029039, filed on Aug. 2, 2018, the entire contents are hereby incorporated by reference.

TECHNICAL FIELD

The present invention relates to a technique such as a wireless power transfer system, a wireless communication system, a wireless terminal apparatus, and a wireless power transmitter. Further, the present invention relates to a technique of a wireless power transfer and wireless communication capable of utilizing electromagnetic waves such as microwaves or millimeter waves.

BACKGROUND ART

As a wireless power transfer technique, a system for executing wireless power transfer from a wireless power transmitter to a wireless terminal apparatus has been developed. A system that executes wireless power transfer over an access distance has already been realized. In recent years, a system that executes wireless power transfer over a medium distance (for example, about several meters) has also been developed. As a method of the wireless power transfer, there are several methods such as a radio wave transmitting method, an electromagnetic induction method, a magnetic resonance method, or an electric field coupling method, for example. In case of the radio wave transmitting method, wireless power transfer is executed by transmission of electromagnetic waves (for example, microwaves or millimeter waves) from a wireless power transmitter to a wireless terminal apparatus within a medium distance area.

As examples of a conventional technique regarding wireless power transfer, Japanese Patent No. 5456380 (Patent document 1), Japanese Patent Application Publication No. 2017-139954 (Patent document 2), and Japanese Patent Application Publication No. 2015-231252 (Patent document 3) are cited. Patent document 1 describes a system for executing wireless power transfer with low output from a wireless power transfer terminal to a wireless terminal apparatus in a wireless communication network. Patent document 2 describes a wireless electric power transmitting system for supplying wireless charging to a device via microwave energy. Patent document 3 describes an electromagnetic induction type wireless power transmitting apparatus.

RELATED ART DOCUMENTS

Patent Documents

Patent document 1: Japanese Patent No. 5456380
Patent document 2: Japanese Patent Application Publication No. 2017-139954
Patent document 3: Japanese Patent Application Publication No. 2015-231252

SUMMARY OF THE INVENTION

Problems to be Solved by the Invention

In wireless power transfer system that executes wireless power transfer by using electromagnetic waves or a wireless communication system that executes wireless communication (referred to also as "wireless data communication" in order to distinguish it from wireless communication for control) by using electromagnetic waves, both the wireless power transfer and the wireless data communication may be executed. For example, both a wireless power transfer request from a wireless terminal apparatus and a wireless data communication request from the wireless terminal apparatus or a wireless base station may be generated at close ng. In that case, undesired interference may occur between the wireless power transfer and the wireless data communication. As the interference, interference of frequencies of electromagnetic waves and a processing load when the both are processed at the same time are cited, for example. For this reason, there are problems in view of efficiency, reliability, or convenience of a user with respect to the wireless power transfer and the wireless data communication. Further, in a case where a plurality of wireless terminal apparatuses and a plurality of wireless power transmitters exist in an area that accepts a LAN (Local Area Network) or the like, the plurality of wireless power transfers and the plurality of wireless data communications may be mixed (or coexist). Even in that case, there is a problem related to interference.

It is an object of the present invention to provide a technique capable of preventing or reducing interference between wireless power transfer and wireless data communication with respect to a technique of the wireless power transfer and the wireless data communication, whereby it is possible to improve efficiency, reliability, and convenience of a user

Means for Solving the Problem

A representative embodiment of the present invention is a wireless terminal apparatus and a wireless power transmitter that constitute a wireless power transfer system, and is characterized by including a configuration described below.

A wireless terminal apparatus according to one embodiment is a wireless terminal apparatus constituting a wireless power transfer system. The wireless power transfer system includes: the wireless terminal apparatus as a target of wireless power transfer; a wireless power transmitter configured to execute the wireless power transfer to the wireless terminal apparatus; and a wireless base station configured to relay wireless data communication of the wireless terminal apparatus. In this case, the wireless base station creates schedule information for preventing or reducing interference regarding the wireless data communication and the wireless power transfer on a basis of grasp of a request of the wireless data communication and a request of the wireless power transfer of the wireless terminal apparatus, and transmits the schedule information to the wireless power transmitter and the wireless terminal apparatus, the schedule information containing allocation of wireless resources to the wireless data communication and the wireless power transfer. The wireless power transmitter executes the wireless power transfer to the wireless terminal apparatus in accordance with the schedule information. The wireless terminal apparatus receives the wireless power transfer from the wireless power transmitter in accordance with the schedule information, and executes the wireless data communication via the wireless base station.

A wireless power transmitter according to one embodiment is a wireless power transmitter constituting a wireless power transfer system. The wireless power transfer system includes: a wireless terminal apparatus as a target of wireless power transfer; the wireless power transmitter configured to execute wireless power transfer to the wireless terminal apparatus; and a wireless base station configured to relay wireless data communication of the wireless terminal apparatus. In this case, the wireless base station creates schedule information for preventing or reducing interference regarding the wireless data communication and the wireless power transfer on a basis of grasp of a request of the wireless data communication and a request of the wireless power transfer of the wireless terminal apparatus, and transmits the schedule information to the wireless power transmitter and the wireless terminal apparatus, the schedule information containing al location of wireless resources to the wireless data communication and the wireless power transfer. The wireless power transmitter executes the wireless power transfer to the wireless terminal apparatus in accordance with the schedule information. The wireless terminal apparatus receives the wireless power transfer from the wire less power transmitter in accordance with the schedule information, and executes the wireless data communication via the wireless base station.

Effects of the Invention

According to the representative embodiment of the present invention, with respect to the technique of wireless power transfer and wireless data communication, it is possible to prevent or reduce interference between the wireless power transfer and the wireless data communication, and this makes it possible to improve efficiency, reliability, and convenience of a user.

BRIEF DESCRIPTIONS OF THE DRAWINGS

FIG. 12 is a view illustrating a configuration example of appearance of the wireless power transmitter according to the first embodiment;

FIG. 13 is an explanatory drawing illustrating a relationship of Line of Sight between the wireless power transmitter and the wireless terminal apparatus according to the first embodiment;

FIG. 22 is a view illustrating a configuration example of a schedule corresponding to a case of FIG. 21;

Figure 29:
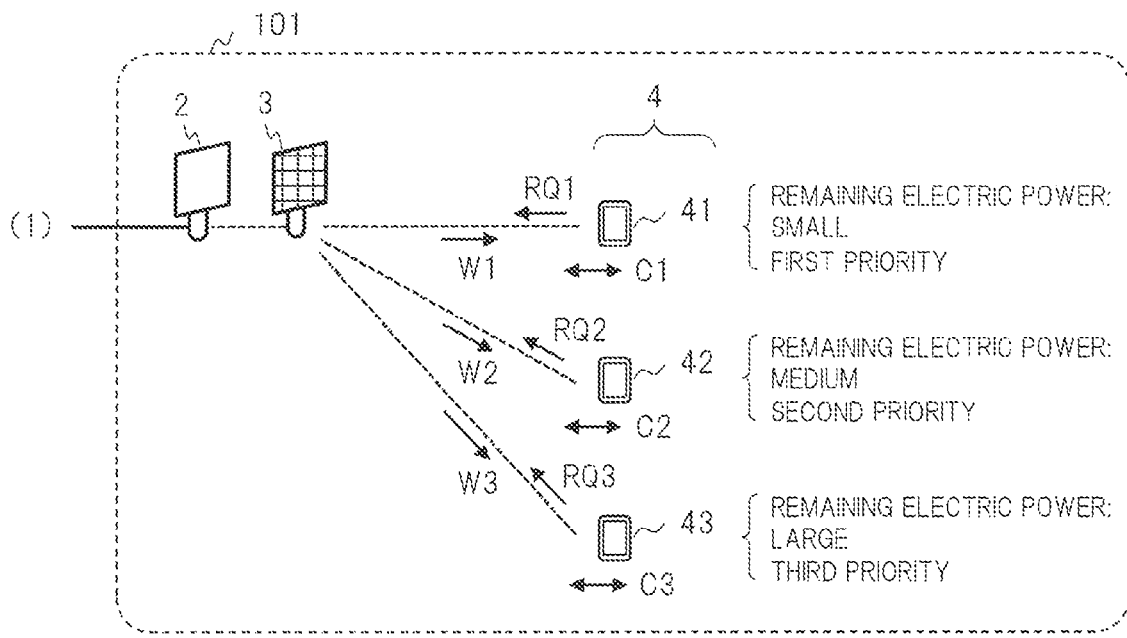
Figure 30:
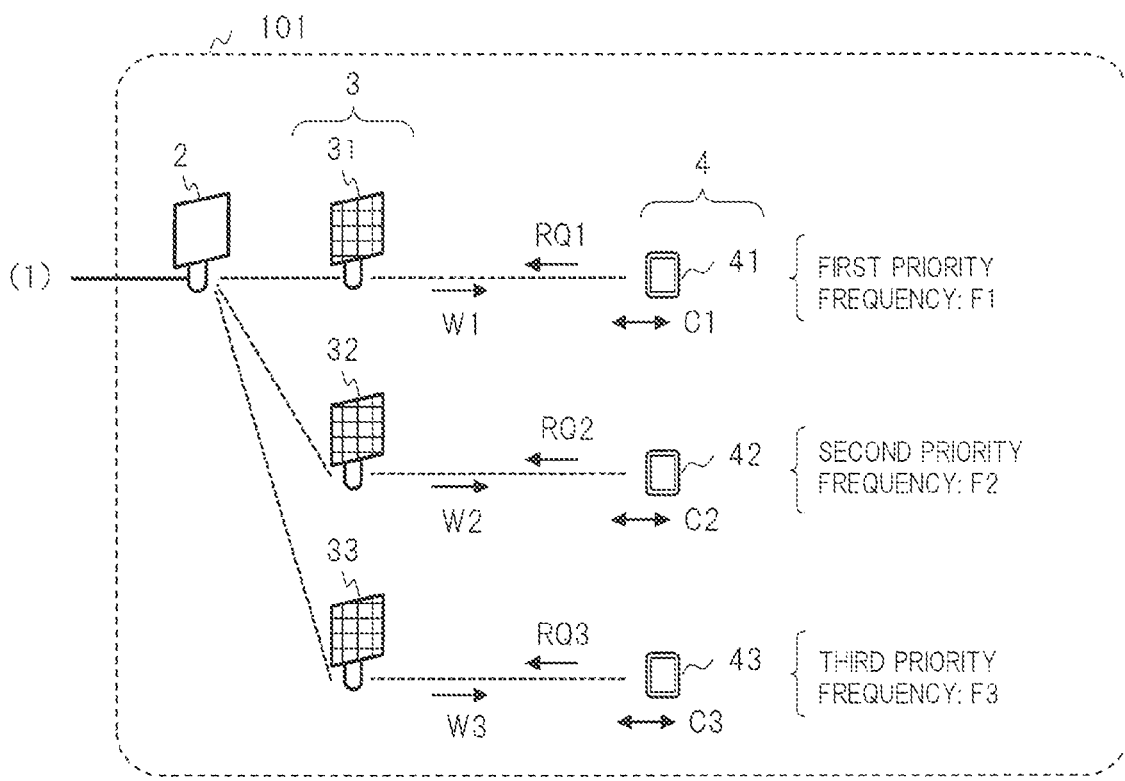

FIG. 29 is a view illustrating a first example of scheduling in a wireless power transfer system including a wireless terminal apparatus and a wireless power transmitter according to a fourth embodiment of the present invention; and FIG. 30 is a view illustrating a second example of the scheduling in the wireless power transfer system including the wireless terminal apparatus and the wireless power transmitter according to the fourth embodiment of the present invention.

DETAILED DESCRIPTION OF EMBODIMENTS

Hereinafter, embodiments of the present invention will be described in detail with reference to the drawings. Note that in each of the embodiments, "wireless data communication" indicates wireless communication that is a control target related to interference prevention in a wireless power transfer system.

[Problems and the Like]

Prerequisite techniques, problems, and the like will be described supplementary. In the wireless power transfer system according to the conventional technique example, for example, as described in Patent document 1, electromagnetic waves having at least one frequency are used at the time of wireless power transfer from a wireless power transmitter to a wireless terminal apparatus. Further, the wireless terminal apparatus executes wireless data communication with a wireless base station by using the electromagnetic waves having the at least one frequency in a case where timing or frequency between these wireless power transfer and wireless data communication match, interference or inefficiency may occur. Interference may cause one to interfere with the other such as a situation that wireless data communication for executing wireless power transfer cannot be executed or a situation that wireless power transfer for executing wireless data communication cannot be executed, for example. Alternatively, interference may cause a situation that efficiency of wireless power transfer is reduced or a situation that efficiency of wireless data communication is reduced. Further, in a case where an apparatus has to process a plurality of wireless power transfers or a plurality of wireless data communications at the same time, there is a possibility to become a situation that a processing load becomes too high. Each of the conventional technique examples does not describe a method of avoiding such a situation or a method of processing the both efficiently.

Further, for example, Patent document 3 describes an electromagnetic induction method. In case of such a method, effective electric power cannot be supplied unless a wireless power transmitter and a wireless terminal apparatus are brought close to each other within an area of a predetermined near distance (for example, several centimeters). In a wireless power transfer system using a radio wave transmitting method or the like, a user can carry out wireless power transfer in a state where the wireless terminal apparatus is separated from a location of the wireless power transmitter by a medium distance (for example, several meters), which is worth in view of convenience and the like. In this case, at the time of the wireless power transfer from the wireless power transmitter to the wireless terminal apparatus as a target, there is a possibility of interference with wireless power transfer or wireless data communication executed by another apparatus existing around there.

Further, in particular, in a case where wireless power transfer using a millimeter wave band is to be executed, high accuracy is required for a location relationship between a wireless power transmitter and a wireless terminal apparatus due to characteristics of millimeter waves. In a case where there is a shielding object on a straight line connecting the wireless power transmitter to the wireless terminal apparatus, or in a case where a location or a direction of an antenna is not suitable, there is a possibility that the wireless power transfer cannot be realized efficiently. In the conventional technique examples, interference and efficiency related to the wireless power transfer of the millimeter waves have not been considered sufficiently. Note that the millimeter waves (EHF) are electromagnetic waves having a wavelength of 1 to 10 mm and frequency of 30 to 300 GHz, Further, a case where a wireless terminal apparatus includes a communication interface (or a wireless communication interface device) that handles plural types of electromagnetic waves and a case where a wireless power transmitter includes a power transmitter that handles plural types of electromagnetic waves are assumed. As the plural types of electromagnetic waves, microwaves and millimeter waves are assumed, for example. In the conventional technique examples, interference and efficiency when plural types of electromagnetic waves are handled also have not been considered sufficiently.

Comparative Example

Figure 25:
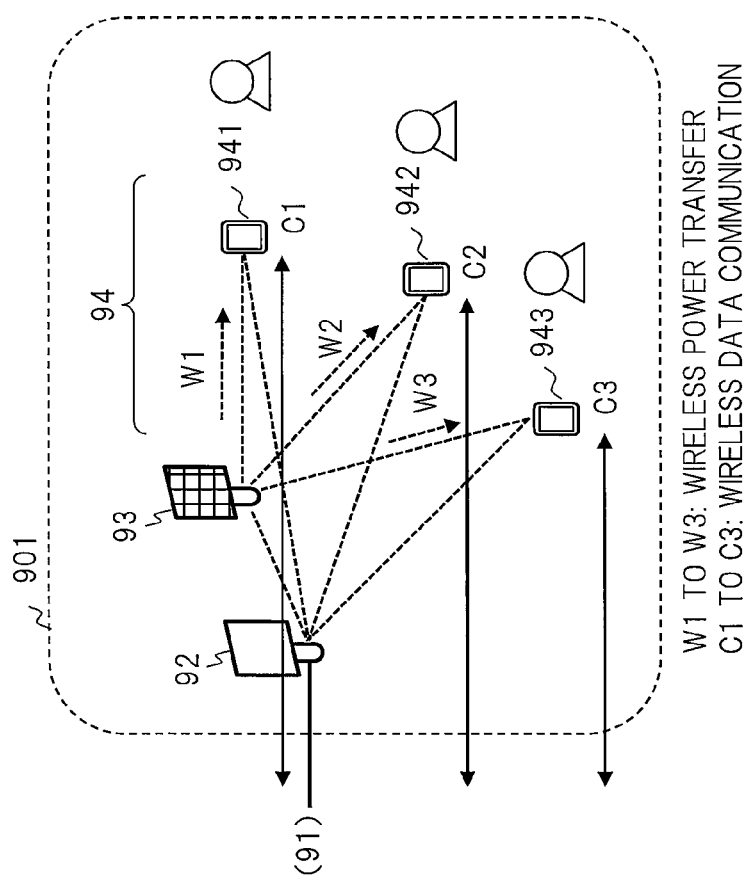
FIG. 25 is a view illustrating an example of interference in a wireless power transfer system according to a comparative example.

FIG. 25 illustrates a case of interference in a wireless power transfer system according to a comparative example. A narrow-area base station 92, a wireless power transmitter 93, and a wireless terminal apparatus 94 are arranged in an area 901. The narrow-area base station 92 is connected to a wide-area base station 91. The wireless terminal apparatus 94 includes wireless terminal apparatuses 941 to 943 as an example of a plurality of wireless terminal apparatuses. The wireless terminal apparatus 941 executes wireless data communication C1, and receives a wireless power transfer W1. The wireless terminal apparatus 942 executes wireless data communication C2, and receives a wireless power transfer W2. The wireless terminal apparatus 943 executes wireless data communication C3, and receives a wireless power transfer W3. For example, there is a possibility that interference occurs among these six operations.

Note that with respect to a portion of the plurality of wireless data communications (the wireless data communications C1 to C3), conventionally, scheduling, for example, allocation of different frequencies (also called as "channels") is generally executed by a wireless base station so that interference does not occur. However, with respect to a portion of the plurality of wireless power transfers (the wireless power transfers W1 to W3), conventionally, interference including a relationship of the wireless data communications C1 to C3 is not fully considered, and scheduling for preventing interference is not executed.

Moreover, in the configuration illustrated in FIG. 25, it is assumed that two types of electromagnetic waves including microwaves and millimeter wave can be used as electromagnetic waves related to radio waves. In this case, four types of operations including (1) wireless data communication of microwaves, (2) wireless data communication of millimeter waves, (3) wireless power transfer of microwaves, and (4) wireless power transfer of millimeter waves may be generated. There is also a problem such as interference with respect to these operations First Embodiment A wireless power transfer system including a wireless terminal apparatus and a wireless power transmitter according to a first embodiment of the present invention will be described with reference to FIG. 1 to FIG. 24. An outline and basic functions according to the first embodiment are as follows.

(1) This wireless power transfer system has a mechanism to execute scheduling in view of interference between wireless power transfer and wireless data communication and the whole efficiency thereof. For example, the wireless base station has a function to execute scheduling. The wireless base station allocates wireless resources (each including a time and a frequency) to the wireless data communication and the wireless power transfer thus requested so that interference is prevented or reduced, and creates a schedule. The wireless terminal apparatus and the wireless power transmitter according to the first embodiment have a function to request scheduling to the wireless base station. Each of the wireless terminal apparatus and the wireless power transmitter transmits information on a state on its own apparatus and a request, and obtains schedule information from the wireless base station. Each of the wireless terminal apparatus and the wireless power transmitter controls execution of the wireless power transfer and the wireless data communication in accordance with the schedule information.

(2) In this wireless power transfer system, at the time of scheduling, for example, various kinds of methods such as a method of dividing a time by the wireless power transfer and the wireless data communication, a method of dividing a frequency, a method of separating antennas, or a method of separating types of electromagnetic waves are used.

(3) The wireless terminal apparatus according to the first embodiment includes a communication interface that deals with plural types of electromagnetic waves, in particular, millimeter waves and microwaves. The wireless power transmitter according to the first embodiment includes a power transmitter that deals with plural types of electromagnetic waves, in particular, mill meter waves and microwaves. The wireless terminal apparatus according to the first embodiment switches states of an antenna of the communication interface so as to execute power reception of wireless power transfer or wireless data communication in accordance with schedule information. The wireless power transmitter according to the first embodiment switches states of an antenna of the power transmitter so as to execute wireless power transfer in accordance with the schedule information.

[Wireless Power Transfer System (1)]

Figure 1:
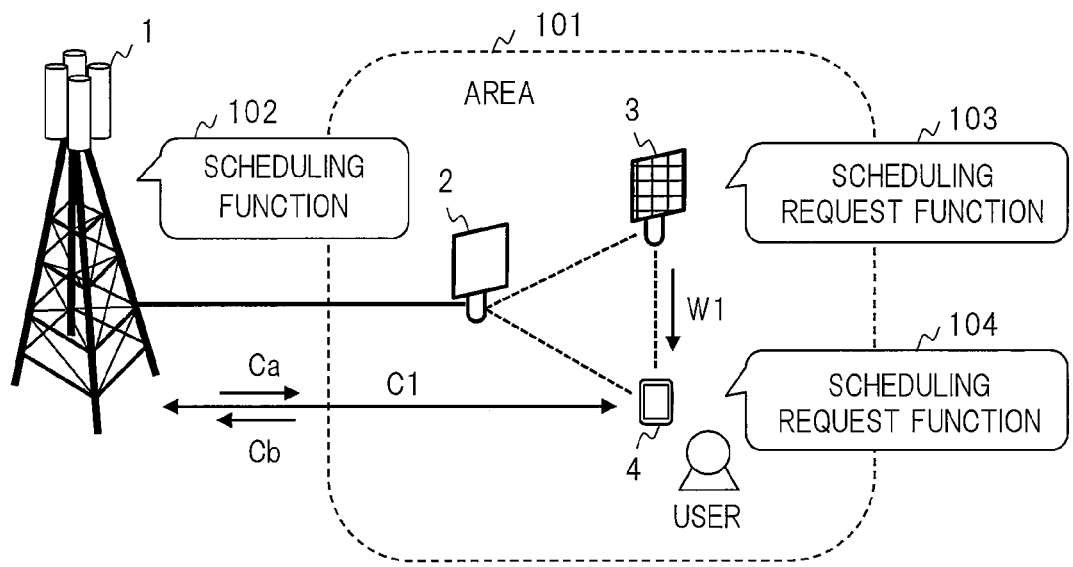
FIG. 1 is a view illustrating a configuration of a wireless power transfer system including a wireless terminal apparatus and a wireless power transmitter according to a first embodiment of the present invention.

FIG. 1 illustrates a configuration outline of a wireless power transfer system according to the first embodiment. In other words, this wireless power transfer system is a wireless communication system. This wireless power transfer system includes a global base station (wide-area base station) 1, a local base station (narrow-area base station) 2, a wireless power transmitter 3, and a wireless terminal apparatus 4. One or more narrow-area base stations 2, one or more wireless power transmitters 3, and one or more wireless terminal apparatuses 4 are provided within a predetermined area 101. The area 101 is an area dealing with a wireless LAN, such as a home or an office. One or more users respectively uses the wireless terminal apparatus 4 and the like in the area 101. The wide-area base station 1 and the narrow-area base station 2 are connected by an optical fiber or wirelessly. The narrow-area base station 2, the wireless power transmitter 3, and the wireless terminal apparatus 4 are wirelessly connected to each other (illustrated by broken lines). The narrow-area base station 2 may be connected to the wireless power transmitter 3 via optical fibers. The wireless power transmitter 3 is wirelessly connected to the wireless terminal apparatus 4. The wireless terminal apparatus 4 is a portable information terminal apparatus such as a smartphone or a tablet terminal, for example, and is possessed by a user.

This wireless power transfer system includes the wide-area base station 1 and the narrow-area base station 2 as wireless base stations. Each of the wireless base stations is an apparatus that communicates with the wireless terminal apparatus 4 and the wireless power transmitter 3, and relays wireless data communication of the wireless terminal apparatus 4. The wide-area base station 1 constitutes a core network of a wireless communication network (or a mobile network), and may be called a macro base station or the like. The wide-area base station 1 is a base station that covers a distance range from several hundred meters to tens of kilometers, for example. The Internet and the like are connected to the wireless communication network. The wireless terminal apparatus 4 and the like are also allowed to execute wire less data communication with a server apparatus on the Internet.

The narrow-area base station 2 is connected to the wide-area base station 1 for communication, for example, and corresponds to an apparatus such as an access point or a router, which constitutes a wireless LAN. The narrow-area base station 2 is a base station that covers a distance range from several meters to several tens of meters, for example. The narrow-area base station 2 may be called a small base station, a spot base station, a femto base station, an ultra small base station, or the like in accordance with the radius of an area that can cover wireless communication, and is a generic term including all of them.

In the configuration example of FIG. 1, the wireless power transmitter 3 and the narrow-area base station 2 are independent from each other, and are installed at locations separated from each other. The wireless power transmitter 3 and the narrow-area base station 2 cooperate with each other by communication. Note that the wireless power transmitter 3 and the narrow-area base station 2 may be arranged at substantially the same location.

The wireless power transmitter 3 has a wireless power transfer function for executing wireless power transfer for the wireless terminal apparatus 4. The wireless power transmitter 3 executes a wireless power transfer W1 to the wireless terminal apparatus 4. The wireless power transmitter 3 also has a wireless communication function with the narrow-area base station 2 and a wireless communication function with the wireless terminal apparatus 4, and executes control communication and the like by using the wireless communication function.

The wireless terminal apparatus 4 has a wireless data communication function and a function for receiving wireless power transfer from the wireless power transmitter 3. The wireless terminal apparatus 4 executes wireless data communication C1 with another wireless terminal apparatus or the other apparatus via wireless communication with the narrow-area base station 2. Wireless data communication Ca in a receiving direction and wireless data communication Cb in a transmitting direction are included as the wireless data communication C1. The wireless data communication Ca is wireless data communication in the receiving direction to the wireless terminal apparatus 4 via a wireless base station from the outside of the area 101, for example, another remote wireless terminal apparatus. The wireless data communication Cb is wireless data communication in the transmitting direction to the outside of the area 101, for example, another remote wireless terminal apparatus from the wireless terminal apparatus 4. The wireless data communication C1 is realized by known procedures of establishing a connection, transmitting or receiving data in a connection state, and disconnecting the connection.

In this wireless power transfer system, the wireless base station, in particular, the wide-area base station 1 has a scheduling function 102. In corresponding thereto, the wireless power transmitter 3 has a scheduling request function 103, and the wireless terminal apparatus 4 has a scheduling request function 104. The scheduling function 102 is a function to create a schedule including allocation of wireless resources with respect to both wireless power transfer and wireless data communication related to the wireless power transmitter 3 and the wireless terminal apparatus 4. Each of the scheduling request functions 103 and 104 is a function to transmit information or a request to the scheduling function 102; obtain schedule information; manage execution of wireless power transfer and wireless data communication in accordance with the schedule information. This scheduling determines allocation of a time, a frequency, and antennas so that interference of both the wireless power transfer and the wireless data communication is prevented or reduced.

[Wireless Power Transfer System (2)]

Figure 2:
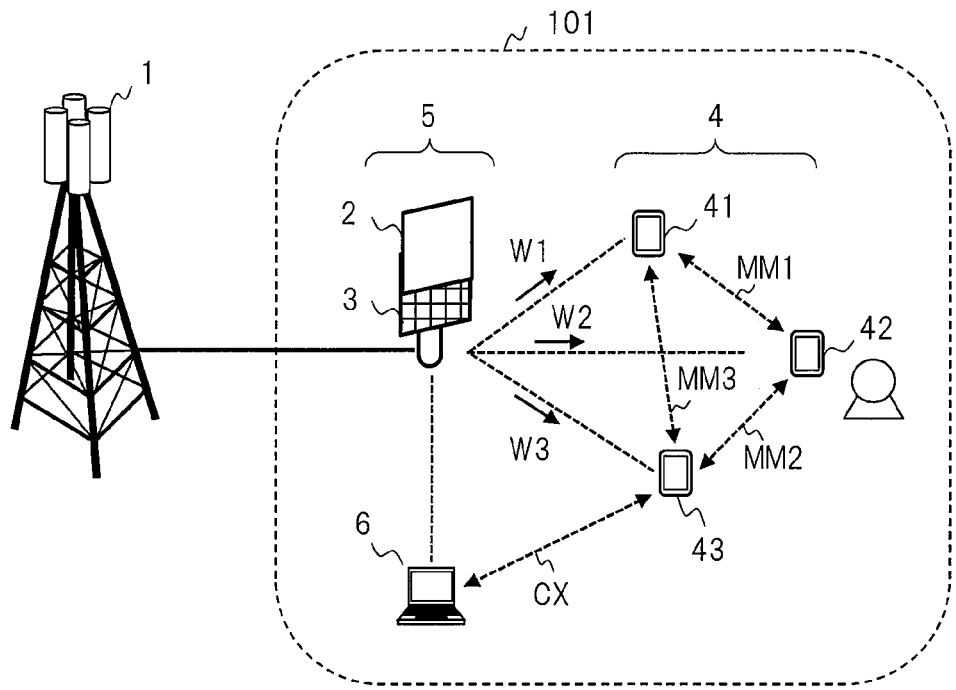
FIG. 2 is a view illustrating another configuration example of the wireless power transfer system.

FIG. 2 illustrates another configuration example of the wireless power transfer system. In the wireless power transfer system illustrated in FIG. 2, a wireless power transmitter 3 is established at the same location as an integrated type with a narrow-area base station 2, which cooperates with each other. In other words, functions of the wireless power transmitter 3 and functions of the narrow-area base station 2 are implemented as one device. This device is a wireless base station device with a wireless power transfer function or a wireless power transmitter with a wireless base station function. This one apparatus is described as a wireless base station power transmitter 5.

Further, in the configuration example of FIG. 2, a case where a plurality of wireless terminal apparatuses 4, for example, three wireless terminal apparatuses 41, 42, and 43 exists within the area 101 with respect to one wireless base station power transmitter 5 and they are respectively connected to each other wirelessly is illustrated. Each of the plurality of wireless terminal apparatuses 4 (41 to 43) is capable of wireless data communication and wireless power transfer with the narrow-area base station 2 (the wireless base station power transmitter 5). Each of the plurality of wireless terminal apparatuses 4 (41 to 43) may mutually execute wireless communication via the narrower-area base station 2 (the wireless base station power transmitter 5). The wireless communication is also included in the wireless data communication as a scheduling target.

Further, in the configuration example of FIG. 2, as wireless data communication, a case where the plurality of wireless terminal apparatuses 4 (41 to 43) mutually and directly communicates with the other apparatus in the vicinity without going through the wireless base station (the narrow-area base station 2) (multiple-apparatus connection data communication, will be described later) is also illustrated. Examples of this communication are illustrated as communications MM1, MM2, MM3. This communication may be realized by short-range wireless communication using an interface such as Bluetooth (registered trademark), for example. This type of wireless communication is also included in the wireless data communication as the scheduling target.

Further, in the wireless power transfer system in the configuration example of FIG. 2, a PC is wirelessly connected to the narrow-area base station 2 and the wireless terminal apparatus 4 within the area 101 as the other device 6, for example. In this case, the wireless terminal apparatus 4 is capable of wireless data communication CX with the other device 6 (PC). This wireless data communication CX can be included n the wireless data communication as the scheduling target.

[Wireless Power Transfer System (3)]

Figure 3:
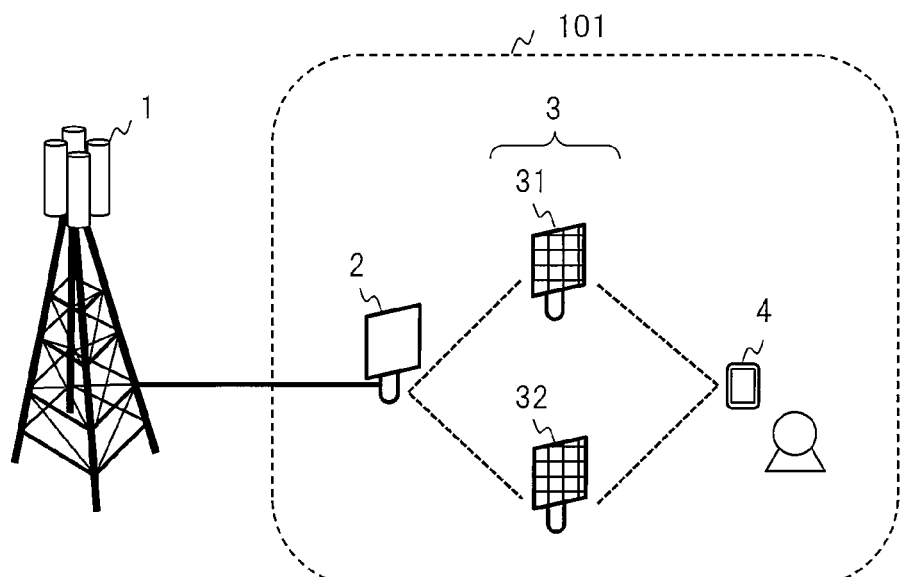
FIG. 3 is a view illustrating still another configuration example of the wireless power transfer system.

FIG. 3 illustrates still another configuration example of the wireless power transfer system as a modification example. In this wireless power transfer system, a plurality (for example, two) of wireless power transmitters 3 (31, 32) is wirelessly connected to one narrow-area base station. 2 within the area 101. Further, one wireless terminal apparatus 4 is wirelessly connected to the plurality (for example, two) of wireless power transmitters 3 (31, 32). In this case, the wireless terminal apparatus 4 can receive wireless power transfer with any of the wireless power transmitters 3. Moreover, in still another configuration example, the plurality of wireless terminal apparatuses 4 may be wirelessly connected to each of the wireless power transmitters 3.

[Usage Scene]

Figure 4:
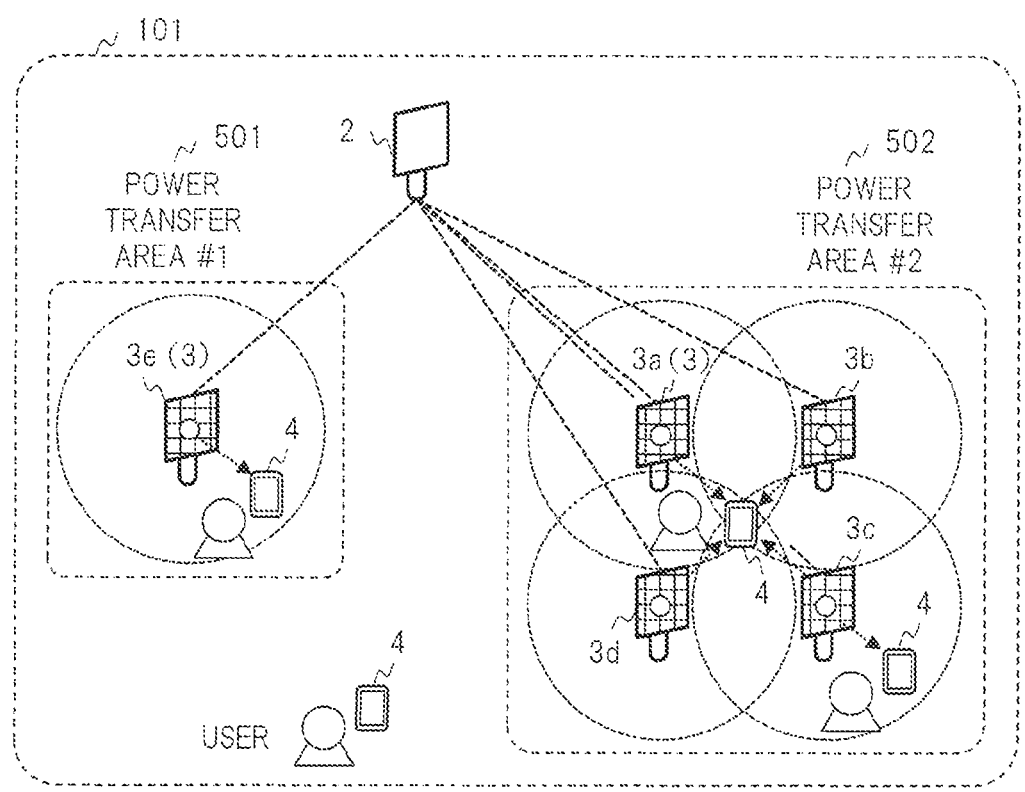
FIG. 4 is a view illustrating a configuration example of an area of the wireless power transfer system and a usage scene thereof.

FIG. 4 shows a configuration example of an area 101 in the wireless power transfer system illustrated in FIG. 1 and the like and an example of a usage scene. The area 101 is associated with a floor of a company, for example. One or more narrow-area base stations 2 and one or more wireless power transmitters 3 are installed in the area 101. In the example illustrated in FIG. 4, each of five wireless power transmitters 3 is wirelessly connected to one narrow-area base station 2. Power transfer areas 501 and 502 are provided within the area 101 as power transfer areas. One or more wireless power transmitters 3 are installed in each power transfer area, which is an area or a spot where wireless power transfer is allowed. The required number of wireless power transmitters 3 is installed so that power transfer areas are constituted in all area or a part area of the area 101 in accordance with needs. The wireless power transmitters 3 can be added, removed, or moved in accordance with the needs. A power transferable range of each of the wireless power transmitters 3 is indicated by a circle. This range indicates a range corresponding to a medium distance (about several meters) in a case where wireless power transfer by millimeter waves is executed in a radio wave transmitting method, for example. The user in the area 101 can receive wireless power transfer by appropriately bringing his or her wireless terminal apparatus 4 in a power transfer area as needed.

In the present embodiment, one wireless power transmitter 3 (3e) is installed in the power transfer area 501. Four wireless power transmitters 3 (3a to 3d) are installed in the power transfer area 502. In particular, power transferable ranges of the respective wireless power transmitters 3 may be configured so as to overlap with each other like the power transfer area 502. In case of the power transfer area 502, the wireless terminal apparatus 4 of the user can receive wireless power transfer so long as the wireless terminal apparatus 4 is within the range of any of the wireless power transmitters 3 (3a to 3d).

The user may change an installation location of the wireless power transmitter 3 within the area 101 in accordance with needs. Locations of the narrow-area base station 2 and the wireless power transmitter 3 are set in advance at the time of system installation, and information thereof is manage. In a case where the location of the wireless power transmitter 3 is changed, a location on setting is also updated. For example, the setting of a relative location of the wireless power transmitter 3 with respect to the narrow-area base station 2 is updated. Note that at that time, the narrow-area base station 2 may detect the location of the wireless power transmitter 3 and update the setting, or the wireless power transmitter 3 may detect the location thereof and notify the narrow-area base station 2 of it, thereby updating the setting.

As another configuration example, a plurality of wireless power transmitters 3 may be installed at an adjacent and dense location in the power transfer area. Further, a wireless power transmitter capable of a conventional adjacent type wireless power transfer and a corresponding wireless terminal apparatus may be mixed within the area 101.

[Wireless Power Transfer Method]

The wireless power transfer system between the wireless power transmitter 3 and the wireless terminal apparatus 4 is not limited basically. However, the radio wave transmitting method is used particularly in the first embodiment. In the radio wave transmitting method, a medium distance (about several meters) is set as a power-transmittable distance where the wireless power transmitter 3 covers, and wireless power transfer is possible within a range of the distance. In a case where the wireless terminal apparatus 4 exists within this range, it is possible to receive the wireless power transfer. In the radio wave transmitting method, the wireless power transmitter 3 (in other words, a power transmitter) converts electric power into electromagnetic waves, and transmits the electromagnetic waves from an antenna. The wireless terminal apparatus 4 (in other words, a power receiving apparatus) receives the electromagnetic waves by the antenna, converts them into electric power, and uses the electric power, for example, charges a battery.

Further, in the first embodiment, microwaves or millimeter waves can be used as the electromagnetic waves in the radio wave transmitting method. The wireless terminal apparatus 4 includes a communication interface that deals with these plural types of electromagnetic waves. The wireless power transmitter 3 includes a power transmitter that deals with the plural types of electromagnetic waves.

[Scheduling Function and Scheduling Request Function]

Generally, a wireless base station manages and grasps a wireless communication status of a predetermined area (the area 101 in FIG. 1). For this reason, in this wireless power transfer system, the wireless base station executes scheduling related to wireless data communication and wireless power transfer. In the first embodiment, the wide-area base station 1 includes the scheduling function 102 that is a function to execute the scheduling. In another embodiment, the narrow-area base station 2 may include the scheduling function 102. The wireless terminal apparatus 4 and the wireless power transmitter 3 includes a function (the scheduling request functions 103 and 104) to transmit information for reflecting the scheduling and a request thereof to the narrow-area base station 2 and the wide-area base station 1.

In a case where two types of requests of wireless power transfer and wireless data communication are generated in the area 101, in a case where a wireless power transfer request is generated during execution of wireless data communication, or in a case where a wireless data communication request is generated during execution of wireless power transfer, the wide-area base station 1 executes scheduling by means of the scheduling function 102. Specifically, as a method of the scheduling, between one or more wireless power transfer and one or more wireless data communication, there is a method of dividing a time, a method of dividing frequency, a method of separating antennas, and the like. A method of combining the respective methods can be executed.

The wireless terminal apparatus 4 and the wireless power transmitter 3 according to the first embodiment cause the wireless base station (the narrow-area base station 2 and the wide-area base station to execute scheduling and create a suitable schedule in cooperation with them. This makes it possible to efficiently execute wireless power transfer and wireless data communication as a whole in accordance with the schedule without interference of the wireless power transfer and the wireless data communication.

[Scheduling Method (1)—Time Division Separation Method]

As a scheduling method, a time division separation method is as follows.

(1-1) For example, in FIG. 1, in a case where two requests of a request of the wireless power transfer 1 and a request of the wireless data communication C1 are generated in substantially the same time zone with respect to the wireless terminal apparatus 4, scheduling is executed as follows. As a first example of a schedule, the wireless terminal apparatus 4 is first caused to execute the wireless power transfer W1 in a first time, and is next caused to execute the wireless data communication C1 in a second time. Alternatively, as a second example of the schedule, the wireless terminal apparatus 4 is first caused to execute the wireless data communication C1 in the first time, and is next caused to execute the wireless power transfer W1 in the second time.

Whether any of the wireless power transfer and the wireless data communication is first to be executed is determined in accordance with types of the wireless power transfer and the wireless data communication at that time, priority or urgency, a state of the wireless terminal apparatus 4 and the like. For example, in a case where a charging state value (a charging rate or the like) of the battery of the wireless terminal apparatus 4 is equal to or less than a threshold value, it is determined that priority is high, and the wireless power transfer is first executed. In a case where the charging state value of the battery of the wireless terminal apparatus 4 is larger than the threshold value, it is determined that priority is low, and the wireless power transfer is executed later.

(1-2) Further, for example, in FIG. 2, in a case where there are requests of a plurality of wireless power transfers regarding the plurality of wireless terminal apparatuses 4 in substantially the same time zone, scheduling is executed so that a time is divided in the plurality of wireless power transfers. For example, there are the wireless power transfer W1 to the wireless terminal apparatus 41 and the wireless power transfer W2 to the wireless terminal apparatus 42. In that case, as a first example of a schedule, the wireless terminal apparatus 41 is first caused to execute the wireless power transfer W1 in a first time, and the wireless terminal apparatus 42 is next caused to execute the wireless power transfer W2 in a second time. Alternatively, as a second example of the schedule, the wireless terminal apparatus 42 is first caused to execute the wireless power transfer W2 in the first time, and the wireless terminal apparatus 41 is next caused to execute the wireless power transfer W1 in the second time.

(1-3) Further, in a case where an antenna provided in the communication interface of the wireless terminal apparatus 4 is an antenna that can be shared by wireless power transfer and wireless data communication (referred to as a "shared antenna"), the shared antenna is shared by the wireless power transfer and the wireless data communication, and scheduling can be executed so that a time is divided. The wireless terminal apparatus 4 switches the shared antenna between at the time of the wireless power transfer and at the time of the wireless data communication in accordance with the schedule. The wireless terminal apparatus 4 has a configuration of hardware and software including an antenna switch capable of such switching (will be described later).

[Scheduling Method (2)—Frequency Division Separation Method]

As the scheduling method, a frequency division separation method is as follows.

(2-1) For example, in FIG. 1, in a case where two requests of a request of the wireless power transfer and a request of the wireless data communication are generated in substantially the same time zone with respect to a certain wireless terminal apparatus 4, scheduling is executed so as to use different frequencies as follows. As a first example of a schedule, a first frequency is allocated to the wireless power transfer W1, and a different second frequency is allocated to the wireless data communication C1. A frequency to be used is selected among available frequencies at that time and allocated. Note that in case of this method, in a case where there is no problem in interference between electromagnetic waves with the frequencies to be used, the wireless power transfer and the wireless data communication using these frequencies may be executed in the same time zone.

(2-2) Further, in FIG. 2, in a case where there are requests of a plurality of wireless power transfers regarding the plurality of wireless terminal apparatuses 4 in substantially the same time zone, scheduling is executed so that frequencies are divided in the plurality of wireless power transfers. As a first example of a schedule, a first frequency is allocated to the wireless power transfer W1 of the wireless terminal apparatus 41, and different second frequency is allocated to the wireless power transfer W2 of the wireless terminal apparatus 42. For example, in a case where a plurality of frequencies can be switched in the communication interface of the wireless terminal apparatus 4, it can be addressed by switching of frequencies in the communication interface. Alternatively, in a case where a plurality of communication interfaces according to frequencies is provided as the communication interface of the wireless terminal apparatus 4, it can be addressed by switching of the communication interfaces to be used.

[Scheduling Method (3)—Antenna Separating Method]

As the scheduling method, an antenna separating method is as follows. The communication interface of the wireless terminal apparatus 4 includes a plurality of available antennas. For example, in FIG. 1, in a case where two requests of a request of the wireless power transfer W1 and a request of the wireless data communication C1 are generated in substantially the same time zone with respect to a certain wireless terminal apparatus 4, scheduling is executed so as to use different antennas as follows. As an example of a schedule, a first antenna is allocated to the wireless power transfer W1, and a second antenna is allocated to the wireless data communication C1. Note that in case of this method, in a case where there is no problem in interference between the antennas to be used, the wireless power transfer and the wireless data communication using the plurality of antennas may be in the same time zone. The wireless terminal apparatus 4 uses an antenna switch and the like to switch the antennas to be used.

[Scheduling Method (4)—Millimeter Waves/Microwaves Separating Method]

As the scheduling method, a millimeter wave/microwave separating method, that is, a method of separating types of electromagnetic waves (millimeter waves and microwaves) and corresponding communication interfaces between wireless power transfer and wireless data communication is as follows. The communication interface of the wireless terminal apparatus 4 includes a plurality of communication interfaces for which the types of electromagnetic waves to be used (for example, millimeter waves, microwaves) are different from, each other. For example, in FIG. 1, in a case where two requests of a request of the wireless power transfer W1 and a request of the wireless data communication C1 are generated in substantially the same time zone with respect to a certain the wireless terminal apparatus 4, scheduling is executed so as to use different types of electromagnetic waves as follows. As an example of a schedule, a communication interface for millimeter waves is allocated to the wireless power transfer W1, and a communication interface for microwaves is allocated to the wireless data communication C1.

[Communication System (1)]

Figure 5:
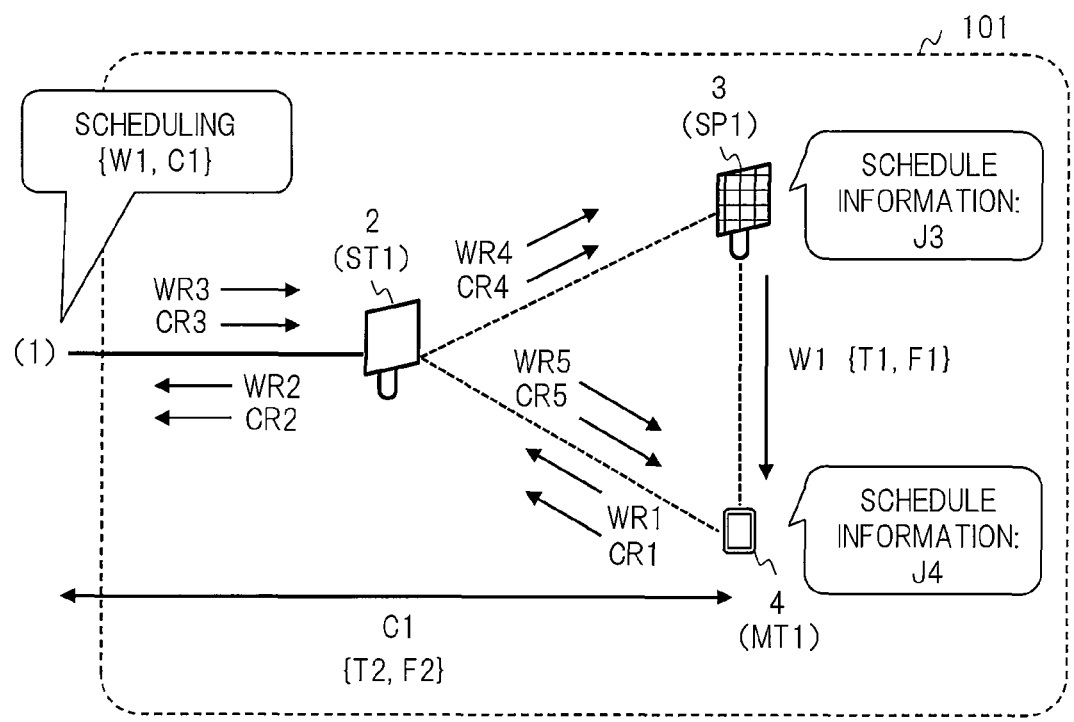
FIG. 5 is a view illustrating a first communication system according to the first embodiment.

Hereinafter, detail s of the first embodiment will further be described. FIG. 5 illustrates a first communication system according to the first embodiment. The first communication system illustrates an example of a detailed communication system when wireless power transfer and wireless data communication are processed on the basis of scheduling among a wide-area base station 1, a narrow-area base station 2, a wireless power transmitter 3, and a wireless terminal apparatus 4. In the first communication system, the wide-area base station executes the scheduling. Further, in the first communication system, a wireless power transfer request from the wireless terminal apparatus 4 is transmitted to a wireless base station (the narrow-area base station 2).

There are one wireless terminal apparatus 4 (whose ID=MT1), one wireless power transmitter 3 (whose ID=SP1), and one narrow-area base station 2 (whose ID=ST1) in an area 101. Wireless data communication C1 and wireless power transfer W1 regarding the wireless terminal apparatus 4 (MT1), which is a target of scheduling, are illustrated. The wireless data communication C1 is communication from the wireless terminal apparatus 4 (MT1) to another wireless terminal apparatus of the outside or communication from another wireless terminal apparatus of the outside to the wireless terminal apparatus 4 (MT1), for example. The wireless power transfer W1 is a wireless power transfer from the wireless power transmitter 3 (SP1) to the wireless terminal apparatus 4 (MT1).

FIG. 5 illustrates procedures WR1 to WR5 as communication procedures regarding a request of the wireless power transfer W1. In the procedure WR1, the wireless terminal apparatus 4 transmits a wireless power transfer request to the narrow-area base station 2. In the procedure WR2, the narrow-area base station 2 transmits the wireless power transfer request from the wireless terminal apparatus 4 to the wide-area base station 1. In the procedure WR3, the wide-area base station 1 transmits schedule information and the like to the narrow-area base station 2 after scheduling is executed. In the procedure WR4, the narrow-area base station 2 transmits the schedule information and the like to the wireless power transmitter 3. Further, in the procedure WR5, the narrow-area base station 2 transmits the schedule information and the like to the wireless terminal apparatus 4.

Procedures CR1 to CR5 are illustrated as communication procedures regarding a request of the wireless data communication C1. In the procedure CR1, the wireless terminal apparatus 4 transmits a request of connection of wireless data communication to the narrow-area base station 2. In the procedure CR2, the narrow-area base station 2 transmits the request from the wireless terminal apparatus 4 to the wide-area base station 1. In the procedure CR3, the wide-area base station 1 transmits schedule information and the like to the narrow-area base station 2 after scheduling is executed. In the procedure CR4, the narrow-area base station 2 transmits the schedule information and the like to the wireless power transmitter 3. Further, in the procedure CR5, the narrow-area base station 2 transmits the schedule information and the like to the wireless terminal apparatus 4.

An example of the scheduling is as follows. The wide-area base station 1 executes the latest scheduling according to a situation at that time when the request is received in the procedure WR2 and when the request is received in the procedure CR2. Further, in a case where there are both the request of the wireless power transfer W1 and the request of the wireless data communication C1, the wide-area base station 1 determines a schedule by the time division separation method described above. For example, a first time T1 and a first frequency F1 are allocated to the wireless power transfer W1. A second time T2 and a second frequency F2 are allocated to the wireless data communication C1. The wide-area base station 1 transmits schedule information containing such information on allocation (schedule information J3 and schedule information J4) to the wireless power transmitter 3 and the wireless terminal apparatus 4. Note that the content of the schedule information J3 corresponds to the content of the schedule information J4.

The wireless power transmitter 3 executes the wireless power transfer W1 for the wireless terminal apparatus 4 with the first time T1 and the first frequency F1 in accordance with the obtained schedule information J3. In corresponding thereto, the wireless terminal apparatus 4 receives the wireless power transfer W1 from the wireless power transmitter 3 in accordance with the obtained schedule information J4. Further, the wireless terminal apparatus 4 executes the wireless data communication C1 with the second time T2 and the second frequency F2 in accordance with the schedule information J4.

As described above, in the first communication system, each of the wide-area base station 1, the narrow-area base station 2, and the wireless power transmitter 3 grasps states of the wireless power transfer W1 and the wireless data communication C1 regarding the wireless terminal apparatus 4 as a target though the scheduling. Then, each apparatus processes the wireless power transfer W1 and the wireless data communication C1 in accordance with a schedule.

[Wireless Terminal Apparatus (1-1)]

Figure 6:
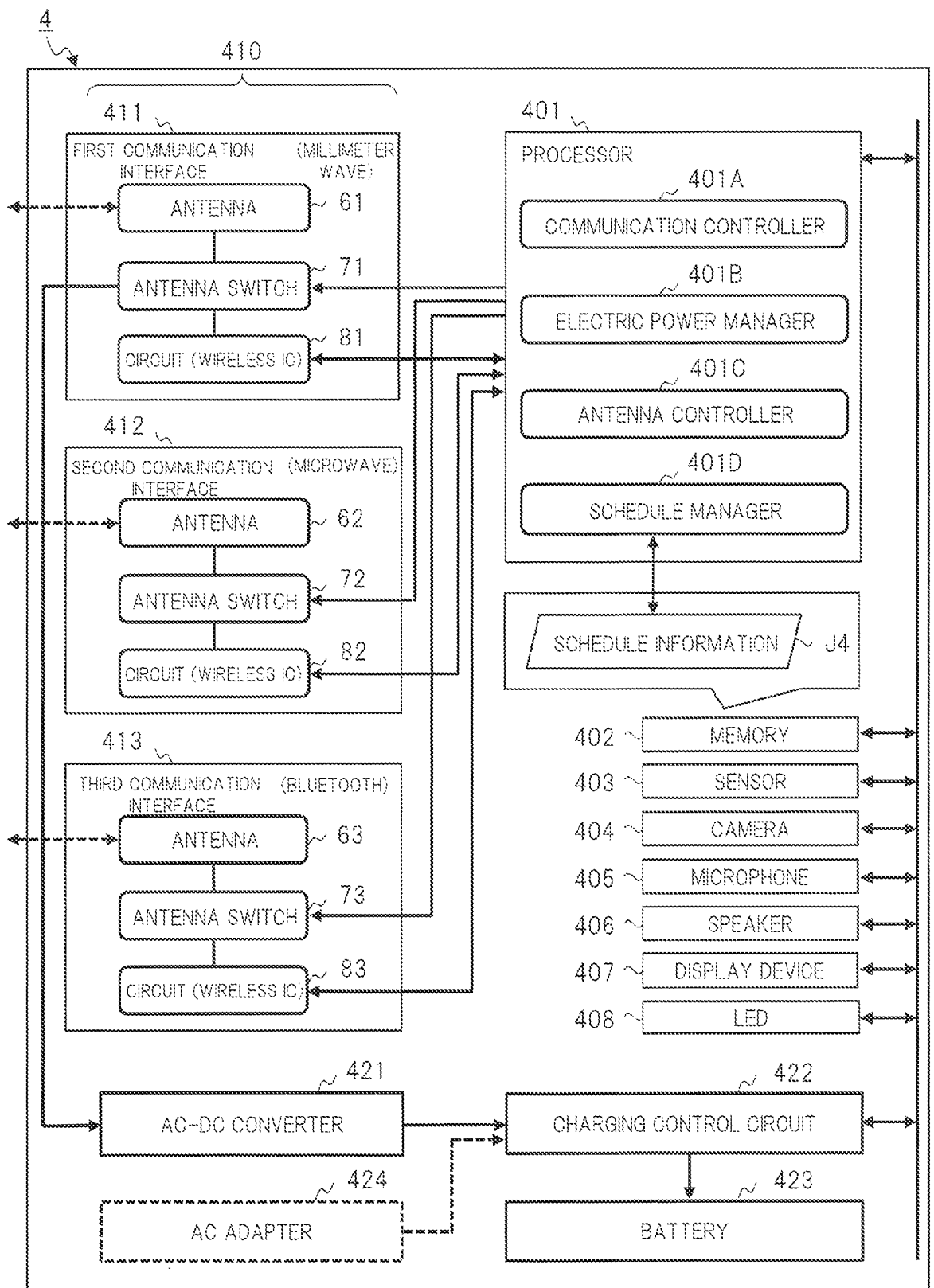
FIG. 6 is a view illustrating a configuration of the wireless terminal apparatus according to the first embodiment.

FIG. 6 illustrates a block configuration of the wireless terminal apparatus 4. It illustrates a case where this wireless terminal apparatus 4 is a portable information terminal apparatus such as a smartphone. The wireless terminal apparatus 4 includes a processor 401, a memory 402, a sensor 403, a camera 404, a microphone 405, a speaker 406, a display 407, an LED 408, a communication interface 410, an AC-DC converter 421, a charging control circuit 422, a battery 423, an AC adapter 424, and the like, and they are connected to each other via a bus or the like. The communication interface 410 includes a first communication interface 411, a second communication interface 412, and a third communication interface 413. The communication interface 410 is a wireless communication interface apparatus The battery 423 is fitted to the charging control circuit 422. The AC-DC converter 421 is connected to the charging control circuit 422. An antenna switch 71 of the first communication interface 411 is connected to the AC-DC converter 421. The AC adapter 424 can be connected to the charging control circuit 422 in a case where a remaining amount of the battery 423 (charged electric power) is not sufficient to operate the wireless terminal apparatus 4. In a state where the AC adapter 424 is connected thereto, electric power supplied from commercial power source can be charged to the battery 423 from the AC adapter 424 via the charging control circuit 422.

Each of antenna switches 71 to 73 is an element for switching an antenna and a circuit to be used in accordance with a schedule and a purpose. Each of the antenna switches 71 to 73 is provided between the corresponding antenna and the corresponding circuit. In the configuration example illustrated in FIG. 6, only the antenna switch 71 of the first communication interface 411 among the antenna switches 71 to 73 is connected to the AC-DC converter 421. Namely, in this configuration, a wireless power transfer when charging to the battery 423 is possible from only the first communication interface 411 (an antenna 61). In accordance with a connection state of the antenna switch 71, AC electric power from the antenna 61 is converted into DC electric power by the AC-DC converter 421, and is supplied to the charging control circuit 422.

The processor 401 is configured by a CPU, a ROM, a RAM and the like, and executes a control of the whole wireless terminal apparatus 4. The processor 401 controls each communication interface of the communication interface 410 (antenna switches 71 to 73 and circuit 81 to 83). The processor 401 includes a communication controller 401A, an electric power manager 401B, an antenna controller 401C, and a schedule manager 401D as processing units configured by software program processing or hardware circuit. Programs, various kinds of data, setting information, and the like are stored in the memory 402. Data obtained by wireless communication (containing schedule information J4) and image data photographed by the camera 404 are stored in the memory 402, for example.

The sensor 403 is known sensor devices including a GPS sensor, a gyro sensor, an acceleration sensor, an electromagnetic compass, an illuminance sensor, and a proximity sensor. The GPS sensor obtains location information of the wireless terminal apparatus 4. The gyro sensor obtains information regarding inclination, rotation, and a direction of the wireless terminal apparatus 4. The acceleration sensor obtains information regarding acceleration. The illuminance sensor obtains information regarding brightness. The proximity sensor obtains information regarding a proximity state of objects. The microphone 405 and the speaker 406 are used to input and output audio. The display 407 is a touch panel, for example, and also receives a touch input operation. The LED 408 is used for illumination of the camera 404. Further, although it will be described later, the LED 408 includes an LED used to let the user know a location of the antenna 61 of millimeter waves by means of light emission.

The first communication interface 411 is a communication interface that executes wireless communication with the narrow-area base station 2 or the other terminal by using millimeter waves. The second communication interface 412 is a communication interface that executes wireless communication with the narrow-area base station 2 or the other terminal by using microwaves. The third communication interface 413 is a communication interface that executes wireless communication among adjacent apparatuses by Bluetooth in the present embodiment.

The first communication interface 411 includes an antenna 61, an antenna switch 71, and a circuit 81. The antenna 61 is an antenna that can transmit and receive by using millimeter waves as electromagnetic wave. The antenna 61 of the first communication interface 411 is basically an array antenna. The antenna 61 can be used as an antenna combined with a lens. The circuit 81 is a circuit such as a wireless IC in which wireless communication interface processing is implemented, and executes processing of transmission and reception regarding wireless communication using millimeter waves on the basis of a control of the processor 401. The antenna switch 71 is connected between the antenna 61 and the circuit 81, and is also connected to the AC-DC converter 421. The processor 401 controls a connection state between the antenna 61 and the circuit 81 by controlling a state of the antenna switch 71.

The second communication 412 includes an antenna 62, an antenna switch 72, and a circuit 82. The antenna 62 is an antenna that can transmit and receive by using microwaves as electromagnetic waves. The circuit 82 executes processing of transmission and reception regarding wireless communication using microwaves on the basis of a control of the processor 401. The antenna switch 72 is connected between the antenna 62 and the circuit 82. The processor 401 controls states of the antenna 62 and the circuit 82 by controlling a state of the antenna switch 72.

The third communication interface 413 includes an antenna 63, an antenna switch 73, and a circuit 83. The antenna 63 is an antenna that can transmit and receive by using electromagnetic waves corresponding to Bluetooth. The circuit 83 executes processing of transmission and reception regarding wireless communication of Bluetooth on the basis of a control of the processor 401. The antenna switch 73 is connected between the antenna 63 and the circuit 83. The processor 401 controls states of the antenna 63 and the circuit 83 by controlling a state of the antenna switch 73.

In the first embodiment, the antenna 61 of the first communication interface 411 is a shared antenna that can address both wireless data communication and wireless power transfer. With respect to this shared antenna, wireless data communication and wireless power transfer can be switched in accordance with the state of the antenna switch 71. For example, when the wireless data communication is executed with respect to the first communication interface 411, it is set to a state where the antenna 61 and the circuit 81 are connected to each other by the antenna switch 71. For example, the circuit 81 processes information from, the processor 401 to send a transmitting signal to the antenna 61, and processes a receiving signal from the antenna 61 to send information to the processor 401. When the wireless power transfer is executed, it is set to a state where the antenna 61 and the AC-DC converter 421 are connected to each other by the antenna switch 71. In case of wireless power transfer, AC electric power received by the antenna 61 is converted into DC electric power by the AC-DC converter 421, and is charged to the battery 423 via the charging control circuit 422.

The communication controller 401A controls protocol processing of a wireless communication interface. The communication controller 401A determines necessity of wireless data communication to generate a wireless data communication request (=a connection request).

The electric power manager 401B monitors and manages a state such as a remaining amount of the battery 423 and a state of electric power; determines necessity of wireless power transfer on the basis of the state; and generates a request of the wireless power transfer if needed.

The antenna controller 401C controls switching of the antenna switches 71 to 73 in accordance with schedule information J4 so as to select and use the antenna and the circuit of the communication interface 410.

The schedule manager 401D stores, in the memory 402, the schedule information J4 containing wireless resource allocation obtained from, the narrow-area base station 2 or the wireless power transmitter 3, and manages it. The schedule manager 401D controls execution of the wireless data communication and the wireless power transfer in accordance with the schedule information J4.

[Wireless Terminal Apparatus (1-2) Wireless Communication Method]

An example of a wireless communication method and a wireless communication interface corresponding to implementation in the communication controller 401A and the communication interface 410 of the wireless terminal apparatus 4 is as follows. (1) Wi-Fi (registered trademark), (2) LTE (registered trademark), (3) WiGig (registered trademark), (4) WiMAX (registered trademark), (5) Bluetooth, and (6) 5G NR (New Radio) of 3GPP (3rd Generation Partnership Project). In particular, the WiGig and the New Radio are a communication system corresponding to electromagnetic waves in a millimeter wave band. The first communication interface 411 has implementation that accepts the WiGig or the New Radio. The second communication interface 412 has implementation that accepts the Wi-Fi, the LTE, and the WiMAX. The third communication interface 413 has implementation that accepts the Bluetooth. The third communication interface 413 accepts other wireless communication interface than a mobile network.

[Wireless Terminal Apparatus (1-3)—Antenna Switch]

Figure 7:
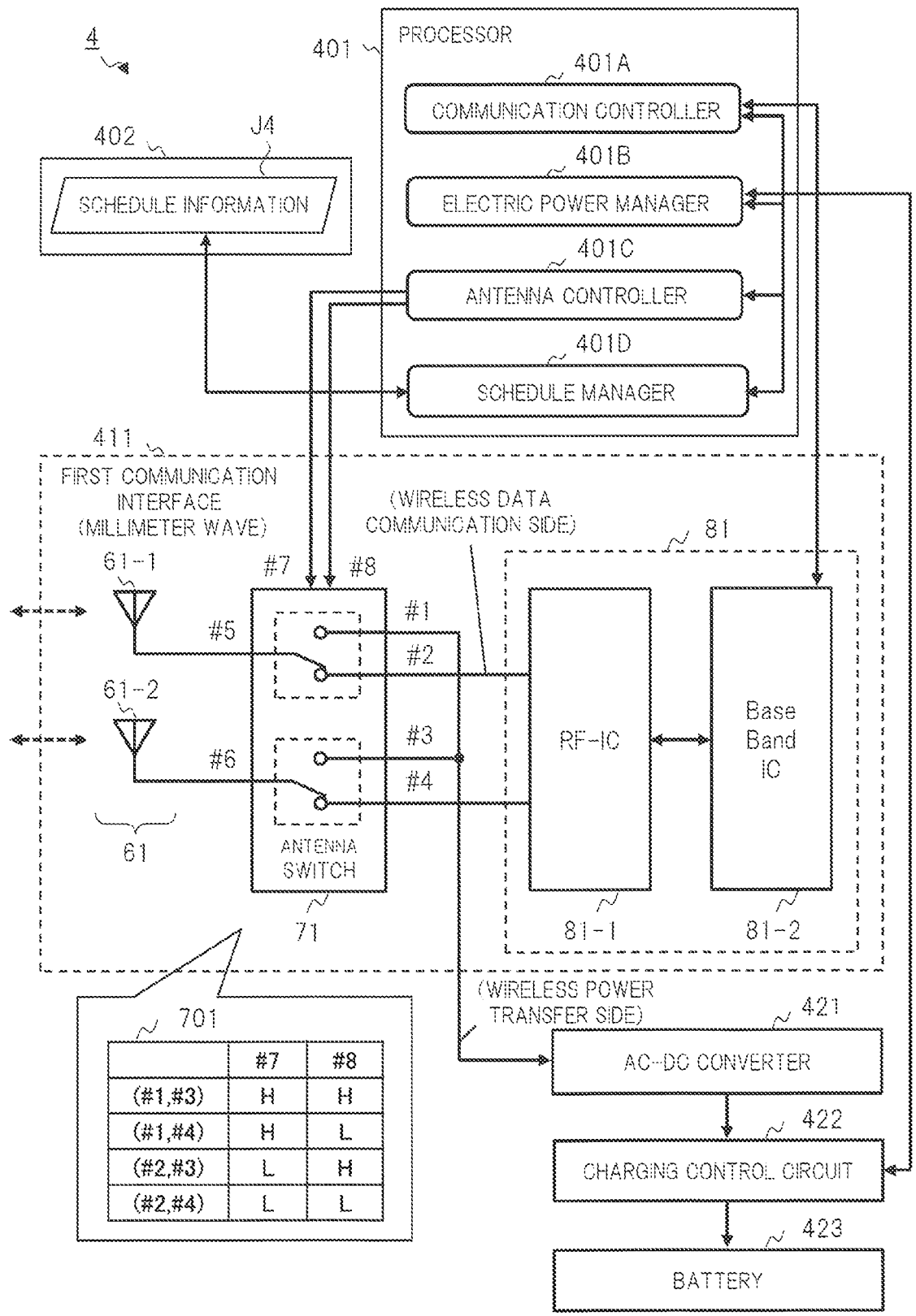
FIG. 7 is a view illustrating a configuration of an antenna switch and the like of the wireless terminal apparatus according to the first embodiment.

FIG. 7 illustrates a configuration example regarding an antenna 61, an antenna switch 71, and a circuit 81 of a first communication interface 411 in a wireless terminal apparatus 4. In the present embodiment, an antenna 61-1 and an antenna 61-2 are provided as two antennas 61 that accepts the millimeter wave band. The circuit (wireless IC) 81 includes an RF IC 81-1 (RE: Radio Frequency) and a base band IC 81-2.

The antenna switch 71 has eight terminals indicated by numbers #1 to #8. The two terminals #5 and #6 are respectively connected to the antennas 61 (61-1, 61-2). The AC-DC converter 421 (that is, wireless power transfer side) is connected to the two terminals #1 and #3. The RF IC 81-1 (that is, wireless data communication side) is connected to the two terminal #2 and #4. The processor 401 (in particular, the antenna controller 401C) is connected to control terminals that are the two terminals #7 and #8.

Connection destinations (#1, #2, #3, and #4) of the switch in the antenna switch 71 are selected by an input of a control signal from, the antenna controller 401C to the control terminals (#7, #8). A table 701 indicates a truth table of the antenna switch 71. Depending upon whether an input of each of the control terminals (#7 and #8) is "H" (High) or "L" (Low) in the cable 701, a wireless power transfer side or a wireless data communication side is selected as the connection destination of the switch, that is the connection destination of the antenna 61. The input of #7 is used for switching regarding the antenna 61-1 (#5), and the input of #8 is used for switching regarding the antenna 61-2 (#6). For example, in a case where the inputs of (#7, #8) are (H, H), (#1, #3) are selected as the connection destinations of the antennas 61-1, 61-2. Namely, both the two antennas are connected to the AC-DC converter 421 (the wireless power transfer side). In case of (L, L), (#2, #4) are selected as the connection destinations of the antenna 61-1, 61-2. Namely, both the two antennas are connected to the RF IC 81-1 (the wireless data communication side). In case of (H, L), the antenna 61-1 is connected to the wireless power transfer side, and the antenna 61-2 is connected to the wireless data communication side. In case of (L, H), the antenna 61-1 is connected to the wireless data communication, and the antenna 61-2 is connected to the wireless power transfer. Note that the switch in the antenna switch can take an off state in accordance with a control. For example, in a case where the switch to which the antenna 61-1 is connected is in the off state, it becomes a state where any of the terminals #1 and #2 is not connected to the terminal #5. In this off state, both the wireless power transfer and the wireless data communication are not executed.

The processor 401 (in particular, the schedule manager 401D) obtains the schedule information J4 from the narrow-area base station 2 or the wireless power transmitter 3, and stores it in the memory 402. The schedule manager 401D controls execution of the wireless data communication and the wireless power transfer in accordance with the schedule information J4 of the memory 402 in cooperation with the antenna controller 401C and the like. In accordance with a control, the antenna controller 401C gives a control signal to the antenna switch 71. In accordance with the control, the communication controller 401A controls an operation of the circuit 81. In accordance with the control, the electric power manager 401B controls an operation of the charging control circuit 422.

[Wireless Terminal Apparatus (1-4)—Modification Example]

Figure 8:
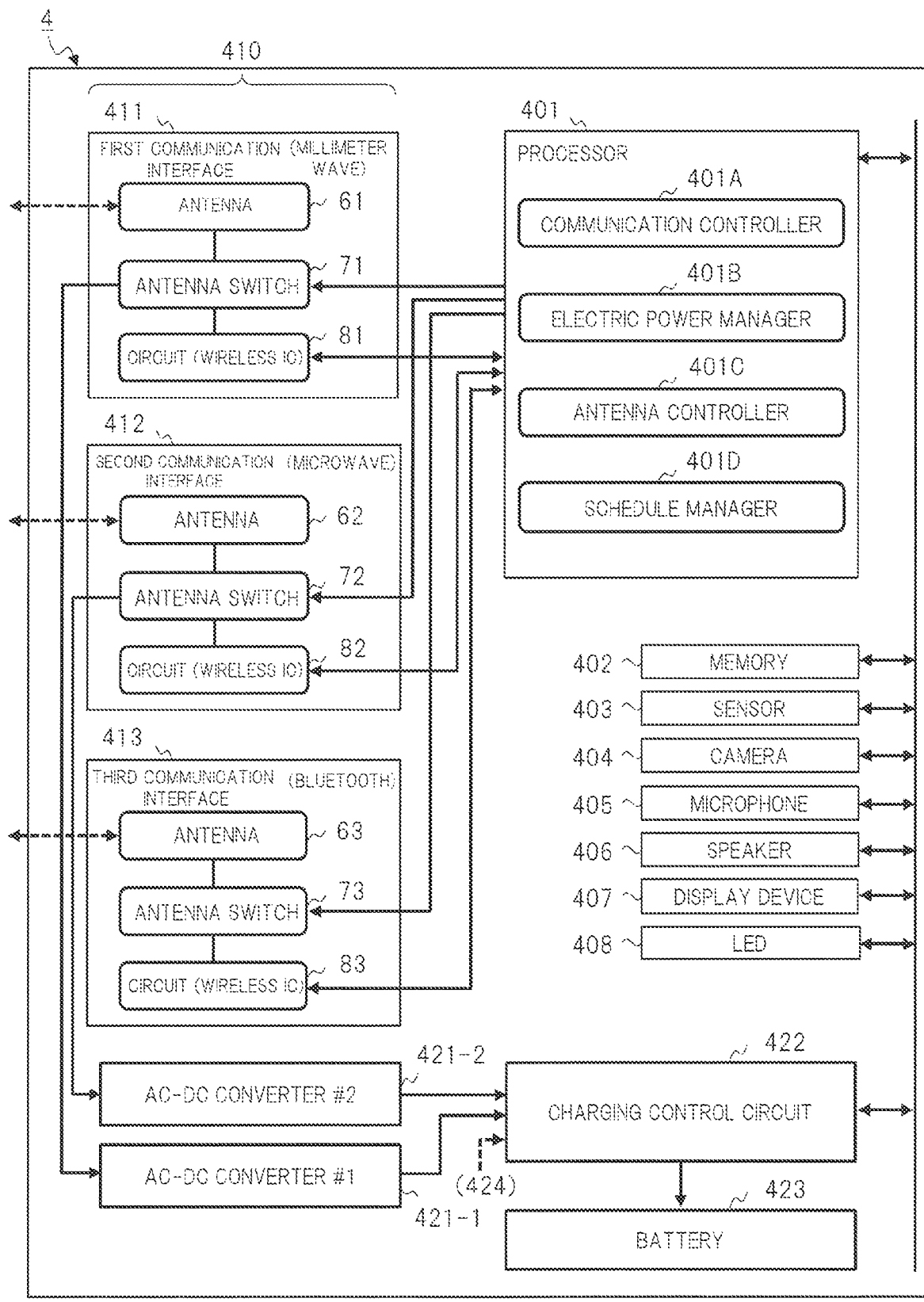
FIG. 8 is a view illustrating a configuration of the wireless terminal apparatus according to a modification example of the first embodiment.

FIG. 8 illustrates a configuration of a wireless terminal apparatus 4 according to a modification example with respect to FIG. 6. A modification example illustrated in FIG. 8 has a difference with the configuration illustrated in FIG. 6 as follows. In this wireless terminal apparatus 4, two of a first AC-DC converter 421-1 and a second AC-DC converter 421-2 are provided in parallel as AC-DC converters. In the communication interface 410, the antenna switch 71 of the first communication interface 411 is connected to the first AC-DC converter 421-1, and the antenna switch 72 of the second communication interface 412 is connected to the second AC-DC converter 421-2. Namely, this configuration allows charging to the battery 423 from either the first communication interface 411 for a millimeter wave band or the second communication interface 412 for a microwave band.

In this modification example, each of the antenna 61 of the first communication interface 411 and the antenna 62 of the second communication interface 412 is a shared antenna that can accept both wireless data communication and wireless power transfer. With respect to this shared antenna, the wireless data communication and the wireless power transfer can be switched in accordance with states of the antenna switches 71, 72.

The configuration of the AC-DC converter is not limited to this, and any is possible. These two AC-DC converters can be configured so as to be integrated into and shared one AC-DC converter. However, in case of the shared configuration, the first communication interface 411 accepts the millimeter wave band and the second communication interface 412 accepts a microwave band. For this reason, it is necessary to use a wide band AC-DC converter.

[Wireless Terminal Apparatus (1-5)—Appearance]

Figure 9:
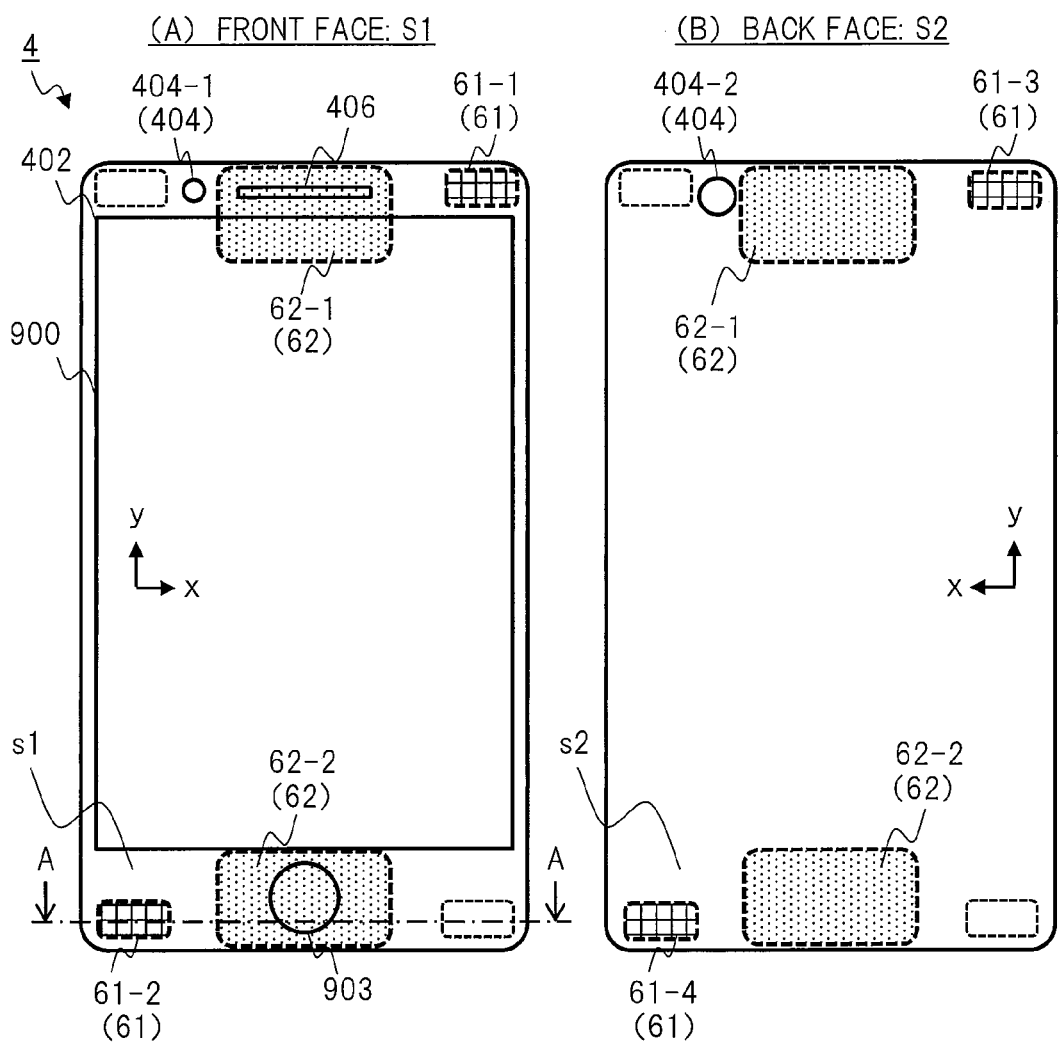
FIG. 9 is a view illustrating a configuration example of appearance of the wireless terminal apparatus according to the first embodiment.

FIG. 9 illustrates a configuration example regarding appearance of the wireless terminal apparatus 4, in particular, a configuration example regarding an antenna in case of a smartphone. (A) of FIG. 9 illustrates a configuration of a plane (referred to as an "x-y plane") of a front face s1 side, which is a side that has a display screen, of a housing of the wireless terminal apparatus 4, and (B) illustrates a configuration of the plane of a back face s2 side. An x direction corresponds to a short side, and a y direction corresponds to a long side. A display screen 900 of the touch panel that is the display 407 is provided on the front face s1 as a main rectangular area. A home button 903, an in camera 404-1 (in particular, a lens unit) of the camera 404, the speaker 406, and the like are provided in a frame area that is provided outside the display screen 900 on the front face s1. The microphone 405 and the like (not illustrated in the drawing) is provided in the vicinity of a side face of the housing. An out camera 404-2 (in particular, a lens unit) of the camera 404, and the like are provided on the back face s2.

Further, although they are illustrated by a broken line, the antennas 62 (62-1, 62-2) of the second communication interface 412 for a microwave band are provided in the housing of the wireless terminal apparatus 4. In the present embodiment, the two antennas 62-1, 62-2 are provided at upper and lower locations of the long side (the y direction) in the frame area in a plane view of the front face s1 and the back face s2 of the housing. In particular, the antenna 62-1 at the upper side is an antenna that accepts the Wi-Fi, and the antenna 62-2 at the lower side is an antenna that accepts the LTE and the New Radio.

Further, the antennas 61 (61-1 to 61-4) of the first communication interface 411 for the millimeter wave band are provided within the housing of the wireless terminal apparatus 4 in a state where a part thereof is exposed to the front face s1 and the back face s2. In the present embodiment, total four antennas 61-1 to 61-4 are particularly provided as an exposed antenna unit at right and left locations of upper and lower sides in the long side (the y direction) of the frame area. Specifically, the antenna 61-1 is provided at an upper right location of the front face s1; the antenna 61-2 is provided at a lower left location of the front face s1; the antenna 61-3 is provided at an upper right location of the back face s2; and the antenna 61-4 is provided at a lower left location of the back face s2.

Figure 10:
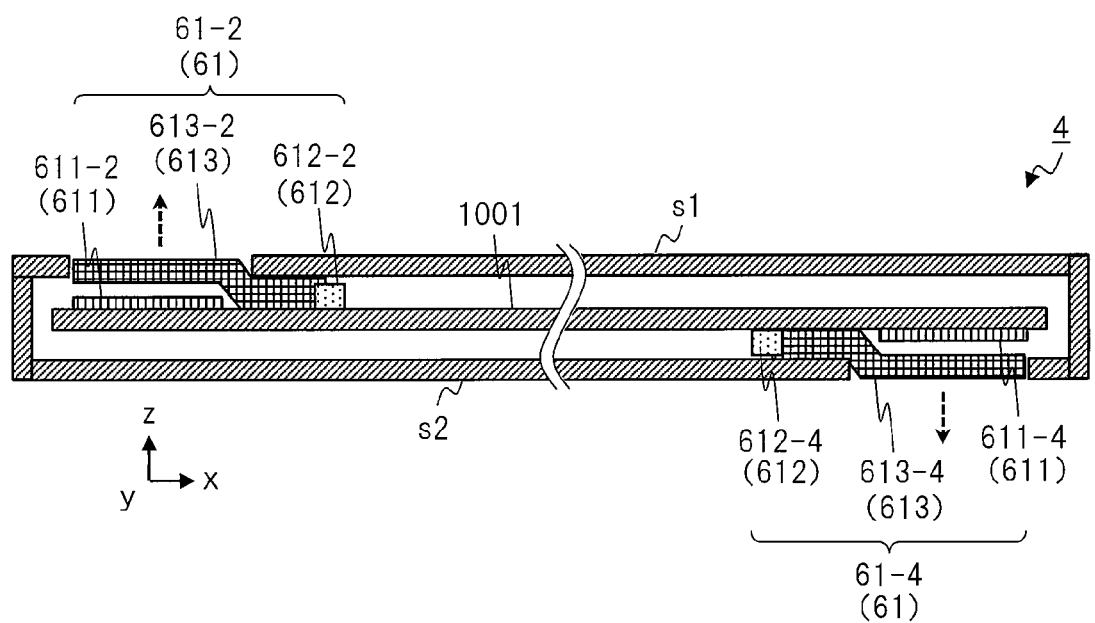
FIG. 10 is a view illustrating a configuration example of a cross section of the wireless terminal apparatus illustrated in FIG. 9.

FIG. 10 illustrates a part of a cross section (referred to as an "x-z plane") of an A-A line at the lower side of the front face s1 illustrated in (A) of FIG. 9. The antennas 61 (61-2, 62-4) for the millimeter wave band are respectively implemented at the front face s1 side and the back face s2 side on a substrate 1001 within the housing of the wireless terminal apparatus 4. Each of the antennas 61 is configured by components such as an antenna element 611, an LED element 612 (a part of the LED 408), or an optical guiding part 613. For example, the antenna 61-2 of the front face s1 includes an antenna element 611-2, an LED element 612-2, and an optical guiding part 613-2. The antenna 61-4 of the back face s2 includes an antenna element 611-4, an LED element 612-4, and an optical guiding part 613-4.

The optical guiding part 613 is transparent, and guides light emission of the LED element 612 to emit the light to the outside from a region where a part is exposed from the front face s1 or the back face s2 (that is, the location of the antenna unit illustrated in FIG. 9). The respective components are arranged so that the optical guiding part 613 overlaps the upper side of the antenna element 611 in a thickness direction (a z direction) of the housing. A surface of the optical guiding part 613 exposes so as to become substantially the same surface as the front face s1 or the back face s2.

When the antenna 61 for the millimeter wave band is used, for example, the processor 401 controls the LED element 612 so as to emit light during wireless power transfer. This causes the optical guiding part 613 of the antenna 61 on the front face s1 or the back face s2 to emit light. A location of the optical guiding part 613 corresponds to a location of the antenna element 611. This makes it possible to easily let the user know the location of the antenna 61 for millimeter waves (the antenna unit) by means of light. The antennas 61 (61-1, 61-3) of the upper side portion are also configured in the similar manner.

[Wireless Power Transmitter (1-1)]

Figure 11:
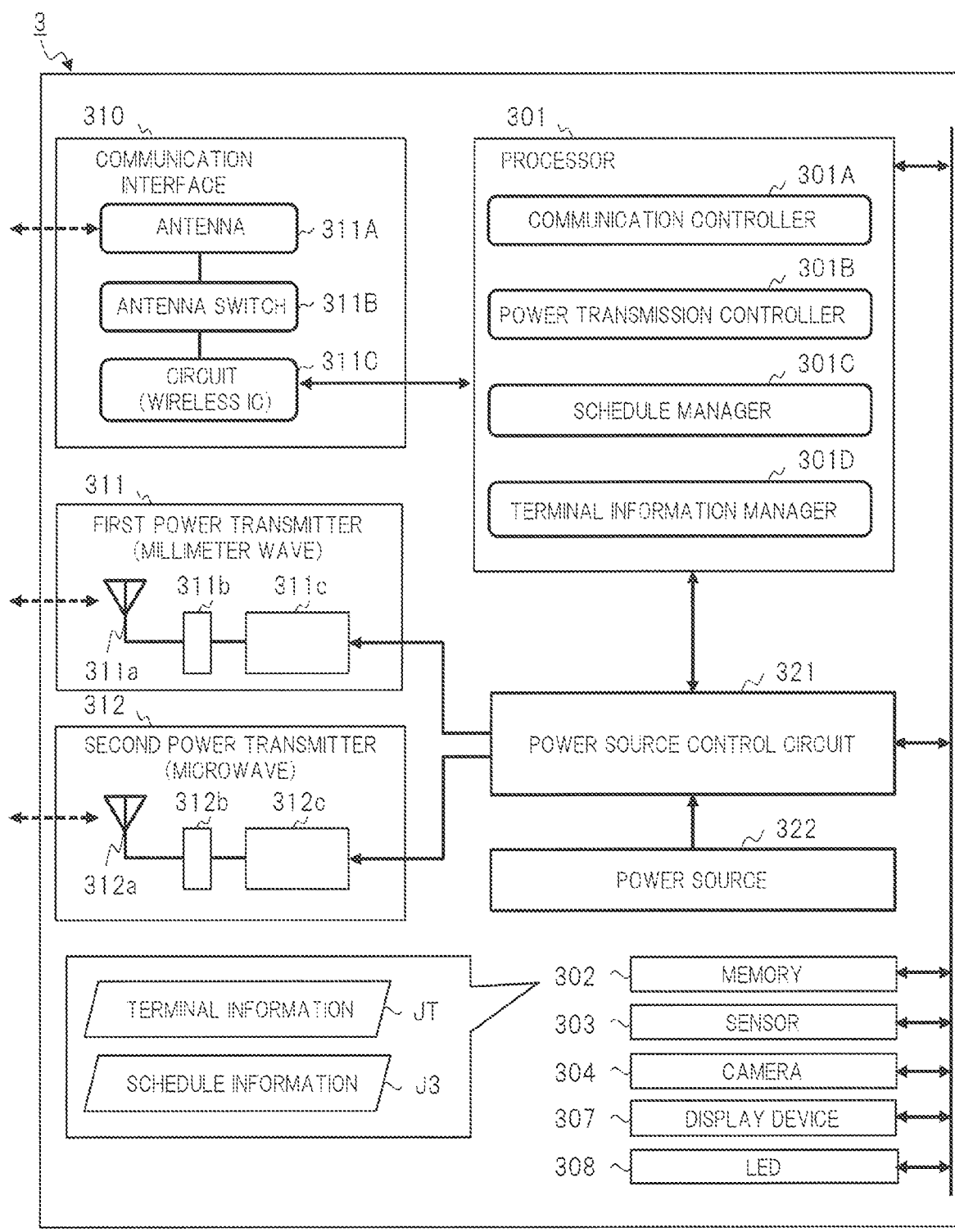
FIG. 11 is a view illustrating a configuration of the wireless power transmitter according to the first embodiment.

FIG. 11 illustrates a block configuration of the wireless power transmitter 3. The wireless power transmitter 3 includes a processor 301, a memory 302, a sensor 303, a camera 304, a display 307, an LED 308, a communication interface 310, a first power transmitter 311, a second power transmitter 312, a power source control circuit 321, a power source 322, and the like.

The processor 301 is configured by a CPU or the like, and executes a control of the whole wireless power transmitter 3 to control power transmission (that is, transmission of electromagnetic waves during wireless power transfer. During the wireless power transfer, the processor 301 controls to supply electric power to the power transmitters (the first power transmitter 311, the second power transmitter 312) from the power source 322 via the power source control circuit 321. The processor 301 includes, as processing units performed by program processing or the like, a communication controller 301A, a power transmission controller 301B, a schedule manager 301C, and a terminal information manager 301D.

The communication interface 310 corresponds to a wireless communication interface device for executing wireless communication with the narrow-area base station 2 or the wireless terminal apparatus 4. The communication interface 310 includes an antenna 311A, an antenna switch 311B, and a circuit (wireless IC) 311. The first power transmitter 311 executes wireless power transfer by a millimeter wave band. The second power transmitter 312 executes wireless power transfer by a microwave band. Each of the power transmitters includes an antenna, an antenna switch, a circuit, and the like. The first power transmitter 311 includes an antenna 311a, an antenna switch 311b, and a circuit 311c. The second power transmitter 312 includes an antenna 312a, an antenna switch 312b, and a circuit 312c.

The communication controller 301A controls wireless communication of the communication interface 310. The power transmission controller 301B controls wireless power transfer by the power transmitters (the first power transmitter 311, the second power transmitter 312). The schedule manager 301C stores, in the memory 302, the schedule information J3 obtained from the narrow-area base station 2, and manages it. The schedule manager 301C controls execution of the wireless power transfer in accordance with the schedule information J3 in cooperation with the respective units. The terminal information manager 301D obtains terminal information JT from the wireless terminal apparatus 4 to store it in the memory 302, and grasps and manages a state of the wireless terminal apparatus 4 on the basis of the terminal information CT and the like.

[Wireless Power Transmitter (1-2)]

FIG. 12 illustrates a configuration example of appearance of the wireless power transmitter 3. (A) of FIG. 12 illustrates the configuration in a perspective view, (B) thereof illustrates the configuration in a plane view from a vertically upper side. A schematically triangular prism-shaped antenna unit 331 is provided in the wireless power transmitter 3 with respect to a column 330 that is a body thereof. An antenna 362 that is a microwave antenna that accepts a microwave band is provided on vertex faces of the column 330 and the antenna unit 331. The antenna 362 has a disk shape, for example. This antenna 362 corresponds to the antenna 312a of the second power transmitter 312 illustrated in FIG. 11.

Further, antennas A1, A2, and A3 are provided on three side surfaces of the triangular prism of the antenna unit 331 as three antennas 361 each of which is a millimeter wave antenna that accepts a millimeter wave band. These antennas 361 (A1 to A3) correspond to the antenna 311A of the first power transmitter 311 illustrated in FIG. 11, and each of the antennas 361 (A1 to A3) is configured by an array antenna. Namely, although it is not illustrated, a plurality of small antennas (array antenna elements) is arranged on a surface of the antenna A1, for example.

In (B), the respective antennas A1 to A3 of the antennas 361 are respectively directed to directions, in the present embodiment, directions d1 to d3 obtained by dividing 360 degrees in a horizontal direction into three. A direction of the antenna 361 and a direction of each of the side surfaces mean a direction perpendicular to the face. Further, by configuring the antenna unit 331 so as to be capable of rotating with respect to the column 330, it becomes possible for the user to adjust the directions of the three side surfaces of the antenna 361.

Further, in the present embodiment, as illustrated in (A) of FIG. 12, cameras 304 (304-1 to 304-3) are provided on the surfaces of the antennas 361 (A1 to A3). For example, each of the cameras 304 (in particular, lens units) is provided at a position near an upper side of each of the side surfaces, the position avoiding the corresponding array antenna element. A photographing direction of each of the cameras 304 (that is, an optical axis of each of the lens units) is the same as the direction d1 to d3 of the corresponding antenna A1 to A3 and the corresponding side surface. The wireless power transmitter 3 can grasp, on the basis of an image of the camera 304, existence and the location (in particular, the positions of the antenna 61 described above) of the wireless terminal apparatus 4 that is a target of the wireless power transfer. In particular, the wireless power transmitter 3 can grasp whether there is the antenna 61 of the wireless terminal apparatus 4 within a predetermined range centered on any of the directions (the directions d1 to d3) of the antenna 361 (A1 to A3) or not and whether there is no shielding object in the direction or not.

The configuration of the wireless power transmitter 3 is not limited to the configuration example described above, and any configuration example is possible. For example, the wireless power transmitter 3 may be configured so as not to include the cameras 304. Further, for example, the antennas 361 and the antenna unit 331 may be configured so as to have four or more side surfaces and four or more directions, or may be configured so as to have two or less side surface(s) and two or less direction (s). Further, for example, the position of each of the cameras 304 may be a central position of the surface of each of the antennas 361, or may be the other position of the surface of each of the antennas 361.

[Millimeter Wave Wireless Power Transfer and Relationship of Line of Sight (1)]

FIG. 13 illustrates an example of a location relationship between the wireless power transmitter 3 and the wireless terminal apparatus 4 in a case where wireless power transfer using millimeter waves is executed. (A) of FIG. 13 illustrates an outline in a perspective view, in particular, illustrates a "relationship of Line of Sight (LOS)" between the antenna 361 for a millimeter wave band (for example, the antenna A1) of the wireless power transmitter 3 and the antenna 61 for the millimeter wave band of the wireless terminal apparatus 4. In a space, a rough location of the wireless power transmitter 3 is set to a location P3, and a rough location of the wireless terminal apparatus 4 is set to a location P4. A distance between the location P3 and the location P4 is several meters or shorter.

In the present embodiment, the antenna A1 of the wireless power transmitter 3 and the antennas 61 (61-1, 61-2) on the front face s1 of the wireless terminal apparatus 4 are disposed so as to roughly face each other. A line E1 is a line connecting the antenna A1 to the antenna 61-1, and a line E2 is a line connecting the antenna A1 to the antenna 61-2. In a case where such a direction of the line between the antennas is within a predetermined range sufficiently close to the direction d1 of the antenna A1, it is possible to execute the wireless power transfer using the millimeter wave efficiently. In a case where such a direction of the line between the antennas is outside the predetermined range centered on the direction d1 of the antenna A1, the wireless power transfer cannot be executed efficiently. Further, in a case where there is a shielding object OB on the line between the antennas, the millimeter waves are shielded, whereby the wireless power transfer cannot be executed efficiently or it becomes impossible to execute the wireless power transfer.

(B) of FIG. 13 illustrates an arrangement example when viewed from a vertically upper side by overlooking. In particular, a case where the line E1 between the antennas substantially coincides with the direction d1 of the antenna A1 is illustrated. In this case, in particular, the most efficient wireless power transfer is possible by using the antenna 61-1 corresponding to the line E1. Even in a case where the antenna 61-2 corresponding to the line E2 is used, sufficiently efficient wireless power transfer is possible.

Further, in an arrangement example illustrated in (C) of FIG. 13, in particular, a case where there is no line that forms a "relationship of Line of Sight" by which efficient wireless power transfer is possible with respect to the direction d1 of the antenna A1 is illustrated. A direction perpendicular to the front face s1 of the wireless terminal apparatus 4 is indicated by a direction Ds1, and a direction perpendicular to the back face s2 thereof is indicated by a direction Ds2. A direction of the antennas 61-1, 61-2 on the front face s1 is the same as the direction Ds1. A direction of the antennas 61-3, 61-4 of the back face s2 is the same as the direction Ds2. In accordance with a state of the direction (or posture) of the wireless terminal apparatus 4, it becomes a state where a difference between the direction d1 of the antenna A1 and any of the directions Ds1, Ds2 of the wireless terminal apparatus 4 is large. For that reason, a good "relationship of Line of Sight" cannot be formed.

As described above, in particular, in a case where wireless data communication or wireless power transfer is executed by using electromagnetic waves in the millimeter wave band, it is important that the wireless base station or the wireless power transmitter 3 and the wireless terminal apparatus 4 has a "relationship of Line of Sight". Namely, in a case where transmission and reception of millimeter waves on a line connecting the wireless power transmitter 3 to the wireless terminal apparatus 4 is considered, for example, the "relationship of Line of Sight" indicates a state where no object that shields the millimeter waves intervenes on the straight line. Further, the "relationship of Line of Sight" indicates a state where a difference between the direction of the antenna of the wireless power transmitter 3 and the direction of the antenna of the wireless terminal apparatus 4 is sufficiently small. Further, the "relationship of Line of Sight" indicates a state where the antenna of the wireless power transmitter 3 and the antenna of the wireless terminal apparatus 4 ideally face each other in a state where there is no shielding object.

[Millimeter Wave Wireless Power Transfer and Relationship of Line of Sight (2)]

Figure 14:
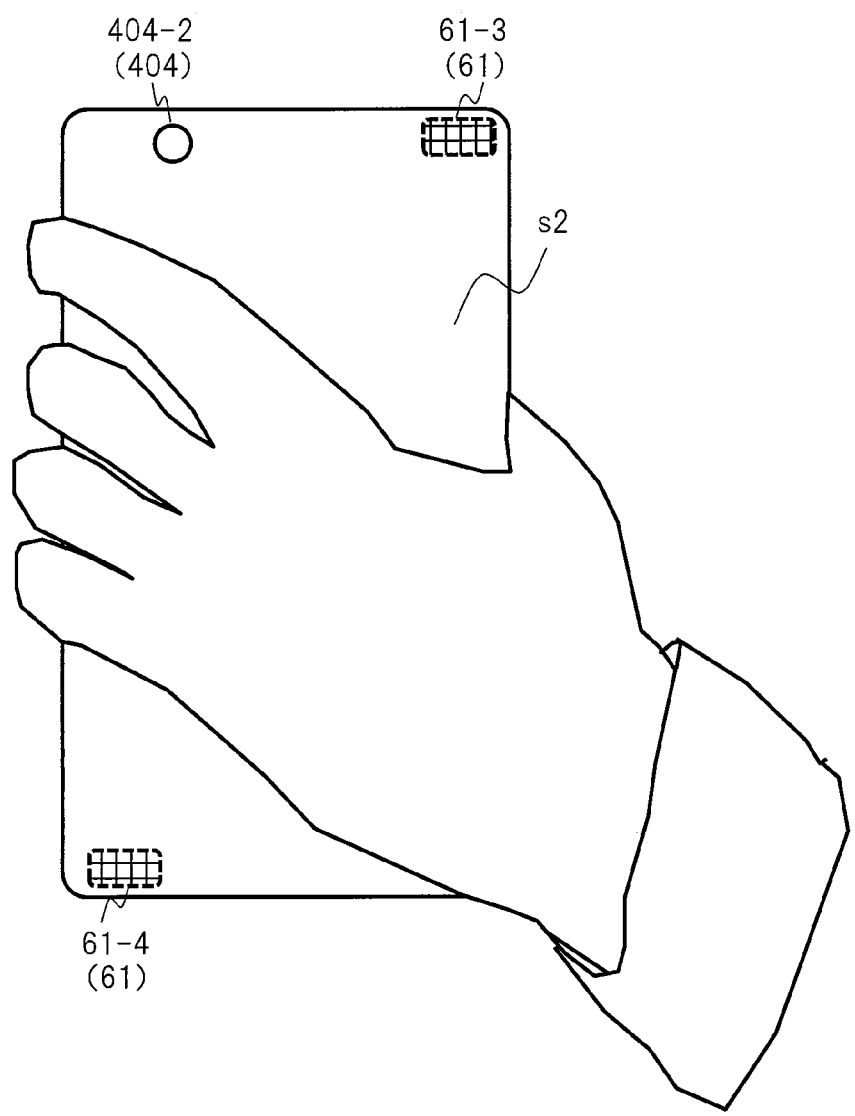
FIG. 14 is a view illustrating an example of a state where a user holds the wireless terminal apparatus according to the first embodiment.

FIG. 14 illustrates an example of a state when the user holds and operates the wireless terminal apparatus 4 illustrated in FIG. 9 by his or her hand. Electromagnetic waves in the millimeter wave band are significantly attenuated compared with electromagnetic waves of the microwaves. For that reason, when the wireless power transfer in the millimeter wave band is executed, it is desirable that the antenna 61 for the millimeter wave band is disposed so as not to be hidden by the hand or body of the user when viewed from the antenna 361 of the wireless power transmitter 3. Further, the electromagnetic waves in the millimeter wave band has higher straightness compared with the electromagnetic waves of the microwaves. In other words, a directional characteristic in the direction is stronger. For that reason, in order to execute efficient wireless power transfer, high accuracy is requested with respect to a location relationship for the wireless power transfer by the millimeter waves, that is, the location of each of the antennas 61, 361.

In the example of the state illustrated in FIG. 14, when the user holds the wireless terminal apparatus 4 by his or her left hand, the antennas 61 (61-3, 61-4) for the millimeter waves on the back face s2 become a state where they are exposed without being hidden by his or her hand. In other words, the locations of the antennas 61 are designed so that the corresponding antenna is hardly hidden in such a handheld state. In this handheld state, the antenna 61 can form the relationship of Line of Sight with the antenna 361 (FIG. 13) of the wireless power transmitter 3.

Further, as in the present embodiment, in a case where a plurality of antennas, in particular, the antennas 61 for the millimeter waves are configured so as to be provided at a plurality of different positions in a housing of the wireless terminal apparatus 4, a method of separating the antennas to be used can be applied at the time of scheduling. In other words, the electromagnetic waves to be used are spatially separated by separation of the antennas in this method. This makes it possible to prevent or reduce interference between the electromagnetic waves. For example, in a case where a certain wireless terminal apparatus 4 requires to execute both wireless data communication using millimeter waves and wireless power transfer using millimeter waves, the following can be executed as an example of scheduling. Namely, one antenna (for example, the antenna 61-3) is allocated for the wireless data communication, and another antenna (for example, the antenna 61-4) is allocated for the wireless power transfer. In this case, it is also possible to execute the wireless data communication and the wireless power transfer in parallel at the same time by using these antennas.

[Wireless Terminal Apparatus—Processing Flow]

Figure 15:
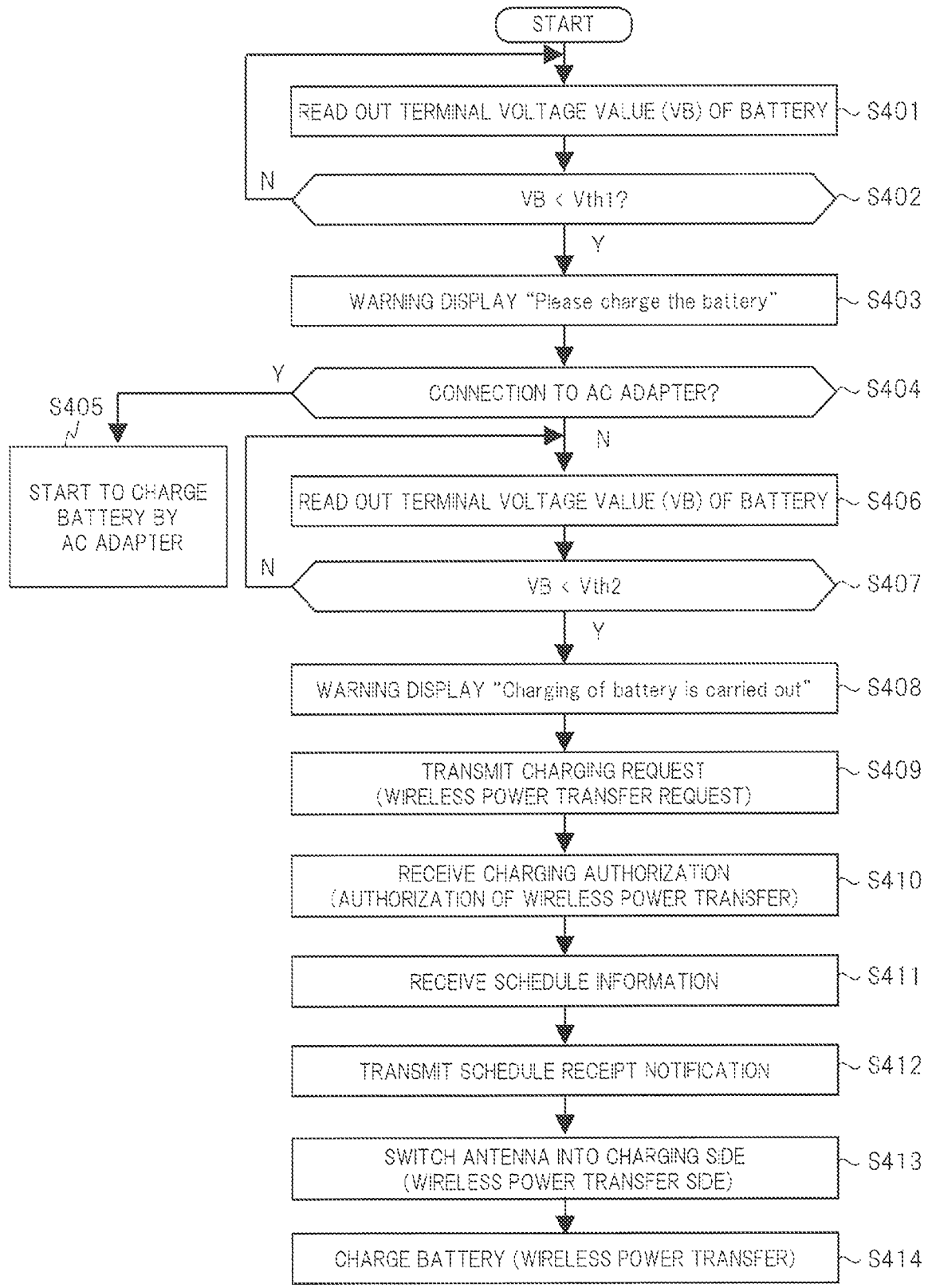
FIG. 15 is a view illustrating a processing flow of wireless terminal apparatus according to the first embodiment.

FIG. 15 illustrates a processing flow related to a control of charging of the battery 423 in the wireless terminal apparatus 4. The flow illustrated in FIG. 15 includes Steps S401 to S414. Hereinafter, the processing flow will be described in the order of Steps. The present processing flow corresponds to a function that automatic charging can be executed by using wireless power transfer when the remaining amount of the battery 423 becomes low. As a result, even in a case where the user forgets to charge the battery 423 via the AC adapter 424, the battery 423 can be charged automatically if the wireless terminal apparatus 4 exists within the area of the wireless power transmitter 3.

At S401, the electric power manager 401B (FIG. 6) of the wireless terminal apparatus 4 monitors a terminal voltage of the battery 423 via the charging control circuit 422, and reads out its terminal voltage value (hereinafter, referred to as "VB"). At S402, the electric power manager 401B uses a threshold value Vth1 and a threshold value Vth2 (Vth1>Vth2), which are set in advance, regarding the terminal voltage value VP to determine the magnitude of the terminal voltage value VP at that time with respect to each of their threshold values. In a case where it is determined that the terminal voltage value VP is smaller than the threshold value Vth1(Y) (VP<Vth1, the processing flow proceeds to S403. At S403, the electric power manager 401B executes warning display on the display 407. The warning display is display of information for prompting the user to carry out charging, such as "Please charge the battery", for example. Note that an audio output may be used similarly. In a case where the electric power manager 401B determines at S404 that the AC adapter 424 is connected to the battery 423 within a predetermined time from, the warning display (Y), the processing flow proceeds to S405. In a case where the electric power manager 401P determines at S404 that the AC adapter 424 is not connected to the battery 423 therewithin (N), the processing flow proceeds to S406. At S405, the electric power manager 401B starts to charge the battery 423 via the AC adapter 424 and the charging control circuit 422.

At S406, the electric power manager 401B reads out the terminal voltage value VB of the battery 423 again. In a case where the electric power manager 401B determines at S407 that the terminal voltage value VB is smaller the threshold value Vth2 (Y) (VP<Vth2), the processing flow proceeds to S408. At S408, the electric power manager 401B executes warning display on the display 407. The warning display is display of information indicating execution of automatic charging, such as "Charging of battery is carried out", for example.

At S409, the electric power manager 401B transmits a wireless power transfer request, which is a charging request, to the narrow-area base station 2. At S410, the electric power manager 401B receives authorization of wireless power transfer from the narrow-area base station 2. At S411, the schedule manager 401D receives the schedule information J4 from the narrow-area base station 2. At S412, the schedule manager 401D transmits schedule receipt notification to the narrow-area base station 2. At S413, the antenna controller 401C switches, in accordance with the schedule information J4, the antenna switch 71 so that the antenna 61 of the first communication interface 411 is connected to the AC-DC converter 421 at a charging side (wireless power transfer side), for example. At S414, the electric power manager 401B executes charging of the battery 423 on the basis of electric power received from the antenna 61 via the AC-DC converter 421 and the charging control circuit 422.

[Wireless Power Transmitter—Processing Flow]

Figure 16:
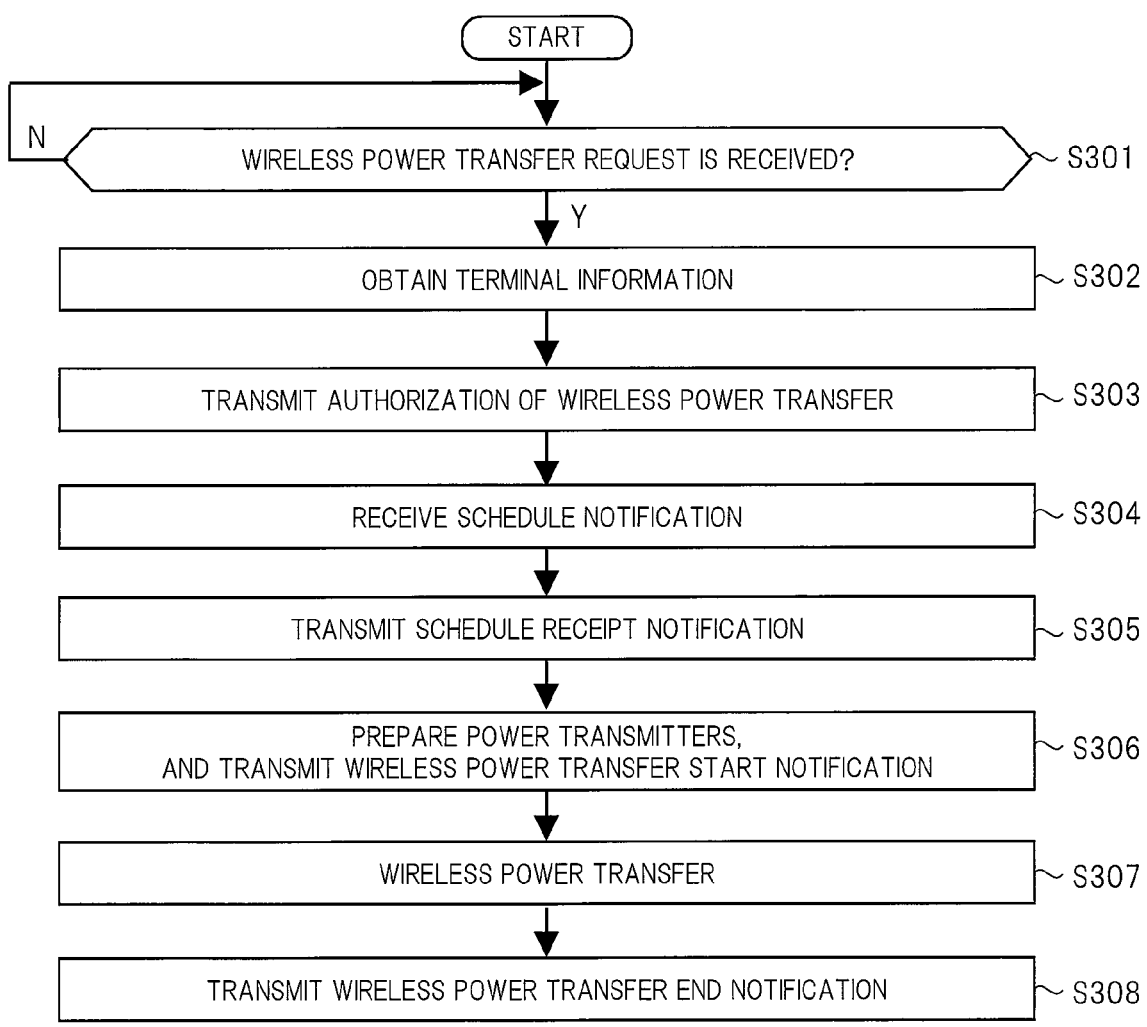
FIG. 16 is a view illustrating a processing flow of the wireless power transmitter according to the first embodiment.

FIG. 16 illustrates a processing flow related to a control of the wireless power transfer n the wireless power transmitter 3. The flow illustrated in FIG. 16 includes Steps S301 to S303. Hereinafter, the processing flow will be described in the order of Steps. At S301, the wireless power transmitter 3 confirms whether a wireless power transfer request from the wireless terminal apparatus 4, the narrow-area base station 2 or the wide-area base station 1 is received or not. In a case where it is confirmed that the wireless power transfer request is received (Y), the processing flow proceeds to S302. At S302, the wireless power transmitter 3 obtains the terminal information JT regarding the wireless terminal apparatus 4, which becomes a target by the wireless power transfer request. Alternatively, the wireless power transmitter 3 refers to the terminal information JT that has already been obtained in the memory 302. At S303, the wireless power transmitter 3 determines whether wireless power transfer to the wireless power transmitter 3 as a target can be executed or not on the basis of the wireless power transfer request and the terminal information JT. In a case where the wireless power transfer request is authorized, the wireless power transmitter transmits authorization of wireless power transfer to the narrow-area base station 2 or the wide-area base station 1. At S304, the wireless power transmitter 3 receives schedule notification (the schedule information J3) from the narrow-area base station 2 or the wide-area base station 1. The wireless power transmitter 3 stores the obtained schedule information J3 in the memory 302. At S305, the wireless power transmitter 3 transmits the schedule receipt notification to the narrow-area base station 2 or the wide-area base station 1. At S306, the wireless power transmitter 3 controls a state of each of the power transmitters as preparation for wireless power transfer in accordance with the schedule information J3, and transmits wireless power transfer start notification to the narrow-area base station 2 or the wide-area base station 1. At S307, the wireless power transmitter 3 starts wireless power transfer for the wireless terminal apparatus 4. At S308, the wireless power transmitter 3 stops the wireless power transfer for the wireless terminal apparatus 4, and transmits wireless power transfer end notification to the narrow-area base station 2 or the wide-area base station 1.

[Wireless Resource and Schedule]

Figure 17:
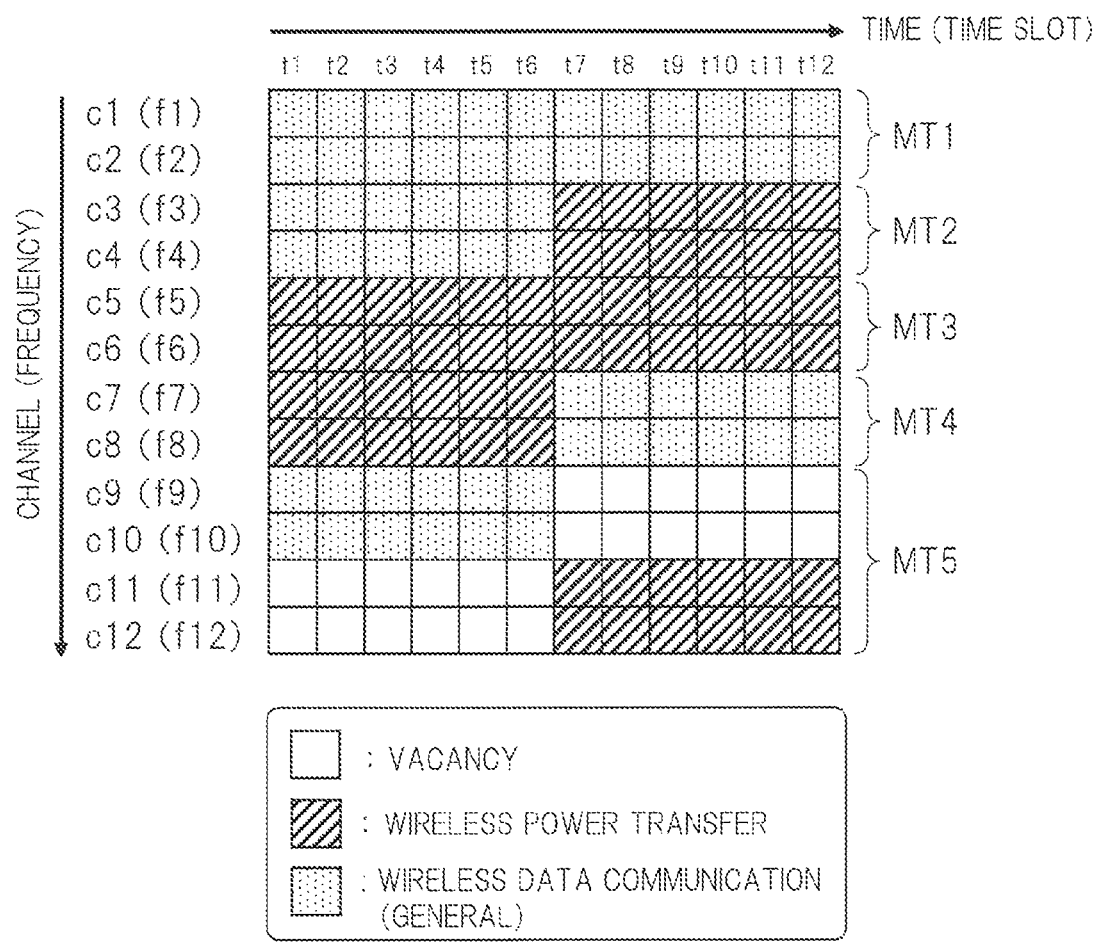
FIG. 17 is a view illustrating a configuration example of a schedule according to the first embodiment.

FIG. 17 illustrates an example of wireless resources and schedule. In a table of FIG. 17, wireless resources and schedules are represented by a matrix in which a horizontal axis thereof indicates times (time slots) and a vertical axis thereof indicates channels (frequencies). One cell in the table represents a wireless resource unit. In the present embodiment, a case where there are a channel c1 (frequency f1) to a channel c12 (frequency f12) in an area 101 as a plurality of available channels (that is, frequencies) is illustrated. In the present embodiment, a portion of times t1 to t12 is illustrated. A plurality of wireless terminal apparatuses 4 (whose IDs=MT1 to MT5) (for example, five) exist within the area 101. The following is an example of scheduling.

The channel c1 (the frequency f1) and the channel c2 (the frequency f2) are allocated to a wireless terminal apparatus MT1 for wireless data communication (indicated by a dot pattern) the times t1 to t12. Further, the channel c3 (the frequency f3) and the channel c4 (the frequency f4) are allocated to a wireless terminal apparatus MT2 for wireless data communication during the times t1 to t6, and the channel c3 (the frequency f3) and the channel c4 (the frequency f4) are allocated to the wireless terminal apparatus MT2 for wireless power transfer (indicated by a diagonal line pattern) during the times t7 to t12. Further, the channel c5 (the frequency f5) and the channel c6 (the frequency f6) are allocated to a wireless terminal apparatus MT3 for wireless power transfer during the times t1 to t12. Further, the channel c7 (the frequency f7) and the channel c8 (the frequency f8) are allocated to a wireless terminal apparatus MT4 for wireless power transfer during the times t1 to t6, and the channel c7 (the frequency f7) and the channel c8 (the frequency f8) are allocated to the wireless terminal apparatus MT4 for wireless data communication during the times t7 to t12. Further, the channel c9 (the frequency f9) and the channel c10 (the frequency f10) are allocated to a wireless terminal apparatus MT5 for wireless data communication during the times t1 to t6, and the channel c11 (the frequency f11) and the channel c12 (the frequency f12) are allocated to the wireless terminal apparatus MT5 for wireless terminal apparatus MT5 for during the times t7 to t12.

[Wireless Communication Sequence (1)]

Figure 18:
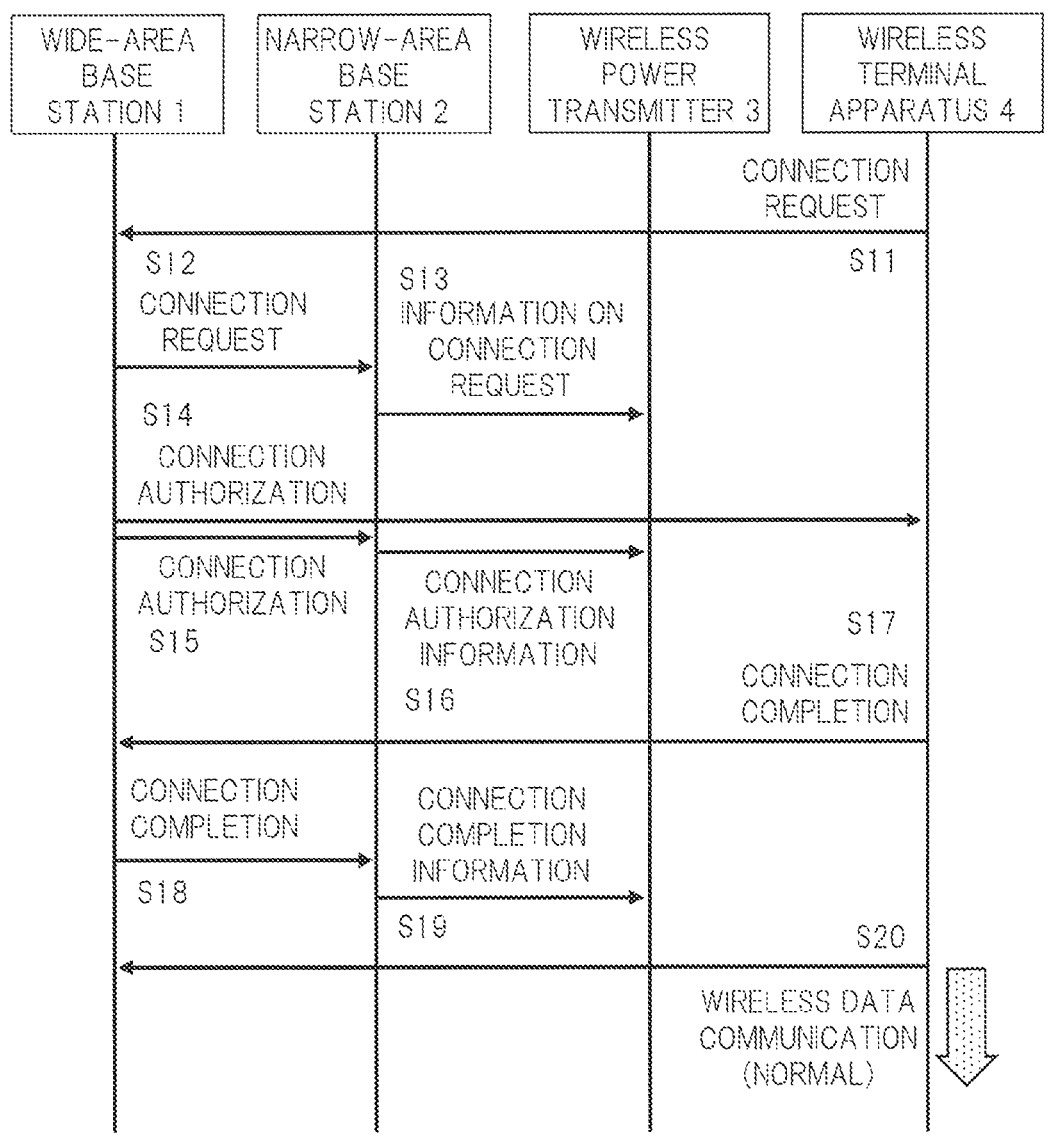
FIG. 18 is a view illustrating a sequence among apparatuses during wireless data communication according to the first embodiment.

FIG. 18 illustrates an example of a sequence of wireless communication in a case where a request of normal wireless data communication is generated. Note that scheduling regarding only wireless data communication (that is, wireless resource allocation) is executed herein. The flow illustrated in FIG. 18 includes Steps S11 to S20 below.

At S11, the wireless terminal apparatus 4 transmits a connection request, which is a wireless data communication request, to the wide-area base station 1. The wide-area base station 1 grasps the wireless data communication request. At S12, the wide-area base station 1 transmits information on the corresponding connection request to the narrow-area base station 2. At S13, the narrow-area base station 2 transmits the information on the corresponding connection request to the wireless power transmitter 3. In a case where connection to wireless data communication is authorized at S14, the wide-area base station 1 transmits connection authorization notification to the wireless terminal apparatus 4. Further, at S15, the wide-area base station 1 transmits the corresponding connection authorization notification to the narrow-area base station 2. At S16, the narrow-area base station 2 transmits corresponding connection authorization information to the wireless power transmitter 3. At S17, the wireless terminal apparatus 4 transmits connection completion notification to the wide-area base station 1 on the basis of reception of the connection authorization at S14. At S18, the wide-area base station 1 transmits the corresponding connection completion notification to the narrow-area base station 2. At S19, the narrow-area base station 2 transmits corresponding: connection completion information to the wireless power transmitter 3. At S20, the wireless terminal apparatus 4 executes wireless data communication through the wide-area base station 1.

As described above, the wireless power transmitter 3 and the narrow-area base station 2 obtain and grasp information regarding a request for wireless data communication from the wireless terminal apparatus 4 and a state thereof through the wide-area base station 1. Note that as examples of the content of normal wireless data communication, a case where the wireless terminal apparatus 4 makes a call to an external wireless terminal apparatus and a case where the wireless terminal apparatus 4 receives a call from an external wireless terminal apparatus are cited. As another example, a case where transmission and reception of data are executed between the wireless terminal apparatus 4 and an external server apparatus is cited. As still another example, the wireless terminal apparatus 4 executes communication with another wireless terminal apparatus 4 or the other device 6 that exist in the vicinity of the wireless terminal apparatus 4 within the area 101 is cited as illustrated in FIG. 2.

[Wireless Communication Sequence (2)]

Figure 19:
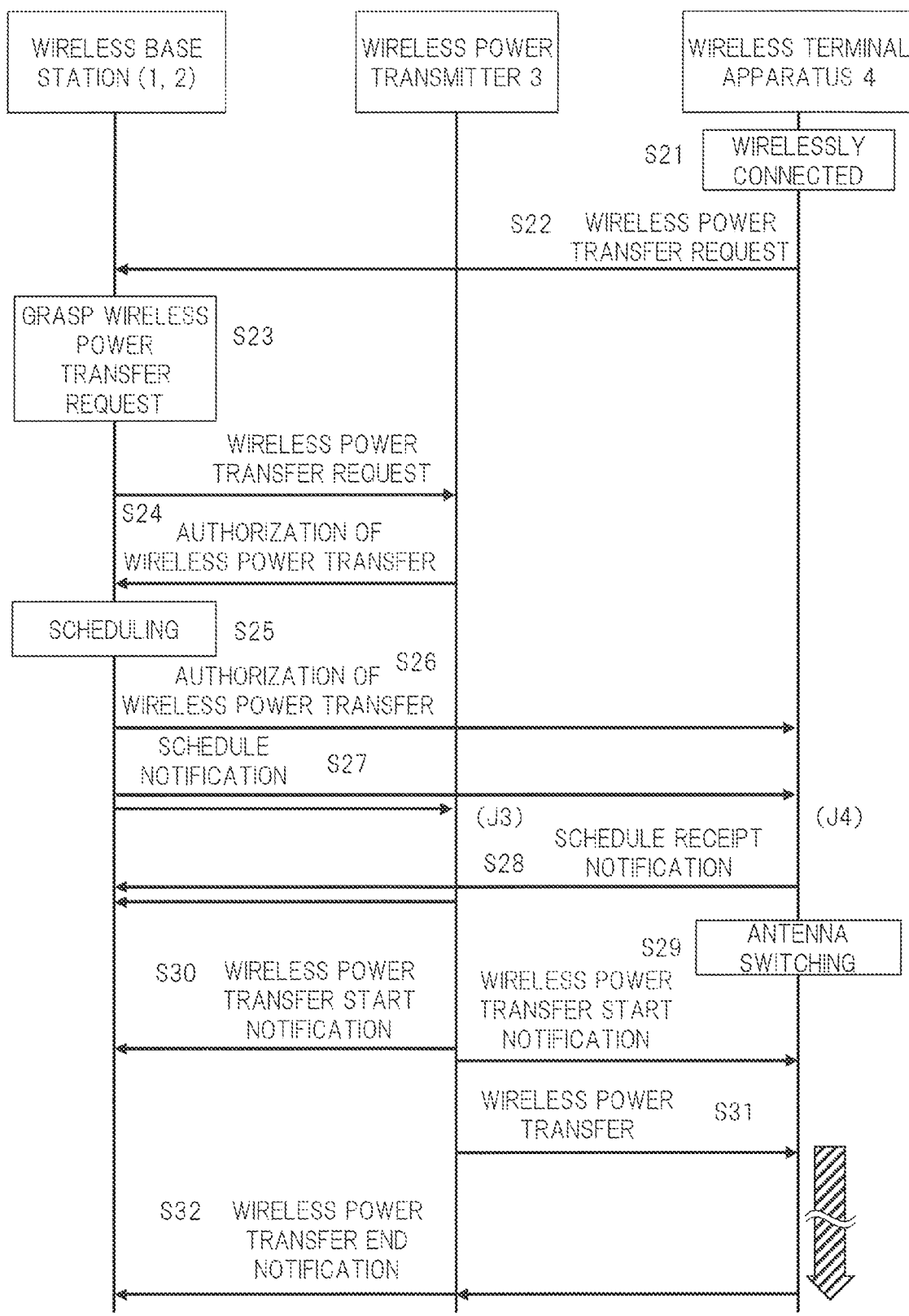
FIG. 19 is a view illustrating a first sequence among the apparatuses according to the first embodiment.

FIG. 19 illustrates one example of a sequence of wireless communication (hereinafter, referred to as a "first sequence"). The first sequence illustrates a sequence of wireless communication in which the wireless terminal apparatus 4 (whose ID=MT1) that is in a state where connection of the wireless data communication (that is, connection to the wireless communication network) has already been completed as illustrated in FIG. 18 further receives wireless power transfer from the wireless power transmitter 3 (whose ID=PS1). FIG. 19 illustrates operations such as control communication among a wireless base station, the wireless power transmitter 3 (PS1), and the wireless terminal apparatus 4 (MT1). Note that the wide-area base station 1 and the narrow-area base station 2 are combined into one and illustrated as a wireless base station. In the first sequence, a case where the wide-area base station 1 executes scheduling and a time division separation method and the like are used will be described as an example. The first sequence includes Steps S21 to S32 below.

At S21, the wireless terminal apparatus 4 is in a wirelessly connected state as illustrated in FIG. 18. Namely, a certain wireless resource (for example, frequency F1) has already been allocated to the wireless terminal apparatus 4 for the wireless data communication. At S22, the wireless terminal apparatus 4 determines necessity for charging of the battery 423. In a case where it is determined that there is necessity, the wireless terminal apparatus 4 transmits a wireless power transfer request to the wide-area base station 1 together with terminal information JT thereof. The terminal information JT contains various kinds of information such as an ID, a type, a position, device configuration information, or a state of the wireless terminal apparatus 4. The device configuration information contains information on a type of each of antennas and the number of antennas in the communication interface 410, for example. The state includes an electric power state, for example, a charging state of the battery 423. At S22, the wireless terminal apparatus 4 may transmit the wireless power transfer request to the wide-area base station 1 through the narrow-area base station 2, or may transmit the wireless power transfer request directly to the wide-area base station 1.

At S23, the wide-area base station 1 receives and grasps the wireless power transfer request with the terminal information JT, and also transmits the corresponding wireless power transfer request to the wireless power transmitter 3 through the narrow-area base station 2. At S24, in a case where execution of wireless power transfer regarding the received wireless power transfer request is to be authorized, the wireless power transmitter 3 transmits authorization of wireless power transfer to the wide-area base station 1 through the narrow-area base station 2. Information on wireless resources available for wireless power transfer of the wireless power transmitter 3 (such as time, frequency, or antennas) may be contained in information on authorization of wireless power transfer.

At S25, the wide-area base station 1 executes scheduling regarding both wireless power transfer and wireless data communication on the basis of reception of the authorization of wireless power transfer. On the basis of wireless resources that can be used at that time, the wide-area base station 1 creates a schedule (corresponding schedule information) so that interference between the wireless power transfer and the wireless data communication is prevented or reduced. In the present embodiment, the wide-area base station 1 executes the latest scheduling on the basis of the frequency F1 that the wireless terminal apparatus 4 that has already been connected wirelessly allocates for the wireless data communication and wireless resources such as vadant frequencies at that time. The latest scheduling contains reconsideration of an existing schedule. Information on allocation of the wireless resources for both of the wireless data communication and the wireless power transfer is contained in the schedule information. During the scheduling, wireless resources (including time and frequency) regarding the requested wireless power transfer are allocated on the basis of both importance and priority of existing wireless data communication and importance and priority of the requested wireless power transfer.

Specifically, in the present embodiment, the wide-area base station 1 switches the wireless terminal apparatus 4 from a state where wireless data communication is executed to a state where wireless power transfer is executed by the time division separation method and a frequency division separation method. For example, the wide-area base station 1 switches from a state where the second communication interface 412 of the wireless terminal apparatus 4 executes wireless data communication by using the antenna 62 for a microwave band and the frequency F1 to a state where the first communication interface 411 executes wireless power transfer by using the antenna 61 for a millimeter wave band and frequency F2 (which is frequency different from the frequency F1). In this case, interference can be prevented by separating the time and the frequency between the wireless data communication and the wireless power transfer.

At S26, the wide-area base station 1 notifies the wireless terminal apparatus 4 of authorization of wireless power transfer after the wireless resource of the requested wireless power transfer is scheduled. Further, at S27, the wide-area base station 1 notifies each apparatus of the wireless terminal apparatus 4, the narrow-area base station 2, and the wireless power transmitter 3 of the latest schedule information thus created. Namely, each apparatus receives and grasps the schedule information. The wireless terminal apparatus 4 obtains the schedule information J4 described above, and the wireless power transmitter 3 obtains the schedule information J3 described above. At S28, each apparatus of the wireless terminal apparatus 4, the narrow-area base station 2, and the wireless power transmitter 3 transmits schedule receipt notification to the wide-area base station 1. The schedule receipt notification is notification of confirming that the schedule information is received.

At S29, the wireless terminal apparatus 4 executes switching of antenna switches so as to switch a state of the communication interface 410 from the wireless data communication side to the wireless power transfer side in accordance with the schedule information J4. Namely, the wireless terminal apparatus 4 executes preparation for executing wireless power transfer. At S30, the wireless power transmitter 3 transmits wireless power transfer start notification to the wide-area base station 1 through the narrow-area base station 2 in accordance with the schedule information J3, and also transmits it to the wireless terminal apparatus 4. At S31, the wireless power transmitter 3 starts the wireless power transfer with the wireless terminal apparatus 4 in accordance with the schedule information J3. The wireless terminal apparatus 4 receives the wireless power transfer from the wireless power transmitter 3 to charge the received electric power to the battery 423. At S32, in a case where the wireless power transfer is ended in accordance with the schedule information J3, the wireless power transmitter 3 transmits wireless power transfer end notification to the wide-area base station 1 through the narrow-area base station 2. The wide-area base station 1 receives the wireless power transfer end notification to grasp a state of each of the apparatuses. Thus, the wireless power transfer and the wireless data communication are scheduled so that the time and frequency to be used are separated. Therefore, interference between the two is prevented.

[Wireless Communication Sequence (3)]

Figure 20:
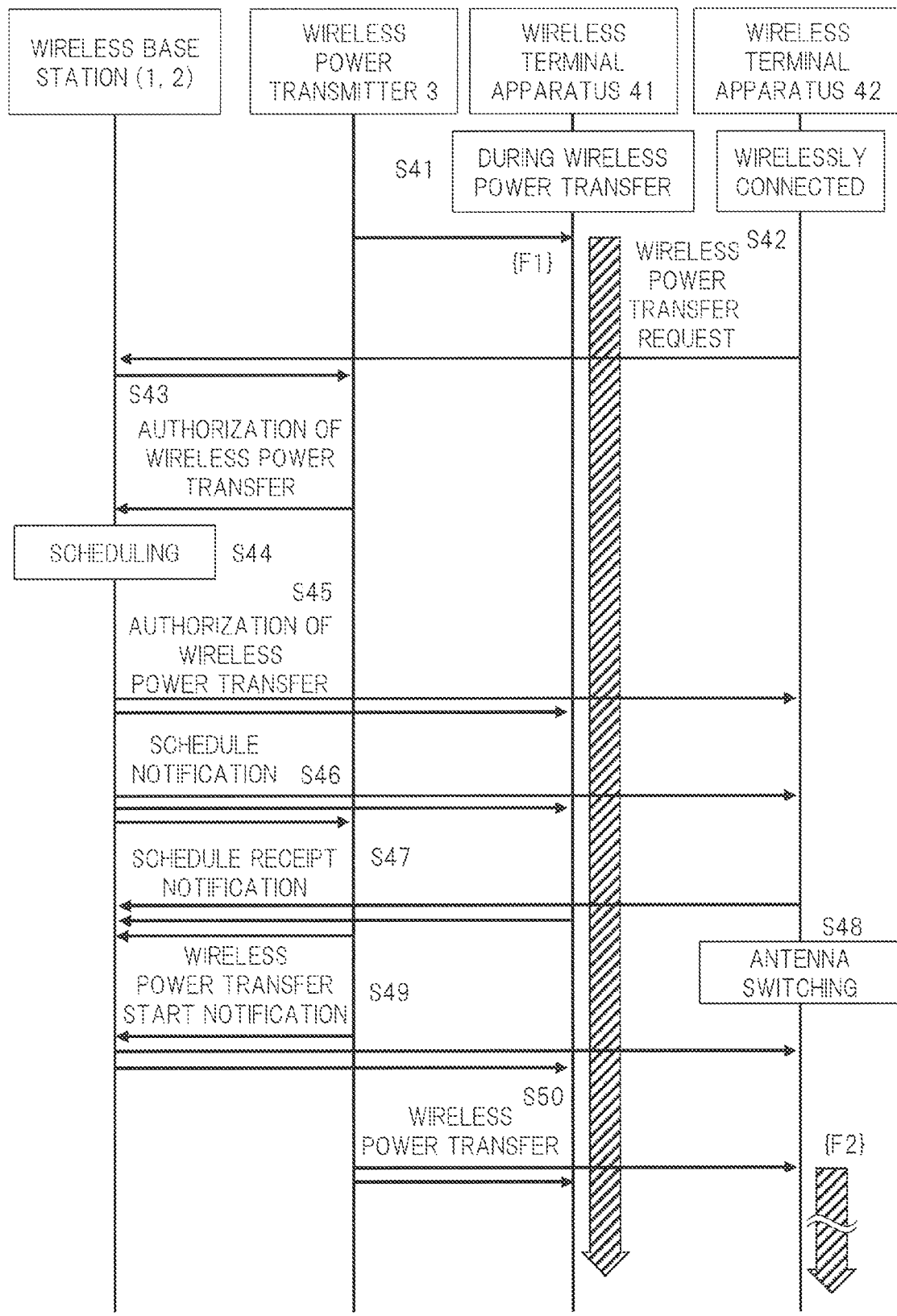
FIG. 20 is a view illustrating a second sequence among the apparatuses according to the first embodiment.

FIG. 20 illustrates another example of the sequence of wireless communication (hereinafter, referred to as a "second sequence"). In the second sequence, scheduling in the following case is illustrated. A case where there are two wireless terminal apparatuses 4 (41, 42) within a power transferable range of one wireless power transmitter 3 in an area 101 is illustrated. It is assumed that the other wireless terminal apparatus 42 that has already been connected wirelessly generates a wireless power transfer request in a state where one wireless terminal apparatus 41 receiving wireless power transfer at frequency F1. The sequence illustrated FIG. 20 includes Steps S41 to S50 below.

At S41, the wireless terminal apparatus 41 is executing wireless power transfer with the wireless power transmitter 3 in accordance with an existing schedule by allocating the frequency F1. Further, the wireless terminal apparatus 42 is in a state where it has already been connected to wireless data communication by allocating predetermined frequency. At S42, the wireless terminal apparatus 42 transmits a wireless power transfer request to a wireless base station (a wide-area base station 1) on the basis of determination of necessity of charging, and the wide-area base station 1 transmits the corresponding wireless power transfer request to the wireless power transmitter 3 through a narrow-area base station 2. At S43, the wireless power transmitter 3 transmits authorization of wireless power transfer to the wide-area base station 1 through the narrow-area base station 2.

At S44, the wide-area base station 1 executes scheduling on the basis of grasp of the wireless power transfer request and the authorization or wireless power transfer. At that time, the wide-area base station 1 creates the latest schedule regarding wireless data communication and wireless power transfer on the basis of a state of allocation of wireless resources to the plurality of wireless terminal apparatuses 4 (41, 42) and a state of vacant wireless resources. Specifically, in the present embodiment, the wide-area base station 1 allocates frequency different from the frequency F1 of the wireless power transfer of the wireless terminal apparatus 41 in the same time zone, for example, frequency F2 as a wireless resource for the wireless power transfer of the wireless terminal apparatus 42 during scheduling. The present embodiment is similar to the scheduling of the wireless terminal apparatuses MT2 and MT3 illustrated in FIG. 17.

At S45, the wide-area base station 1 transmits the authorization of wireless power transfer to the wireless terminal apparatus 42 and the wireless terminal apparatus 41. Note that in the present embodiment, the wide-area base station 1 transmits information on the corresponding authorization of wireless power transfer not only to the wireless terminal apparatus 42 that executed the wireless power transfer request, but also to the other wireless terminal apparatus 41. At S46, the wide-area base station 1 transmits schedule notification to the narrow-area base station 2, the wireless power transmitter 3, the wireless terminal apparatus 41, and the wireless terminal apparatus 42. Note that in the present embodiment, the wide-area base station 1 transmits the corresponding schedule notification not only to the wireless terminal apparatus 42, but also to the wireless terminal apparatus 41. The wireless power transmitter 3 obtains schedule information J3, while the wireless terminal apparatus 41 and the wireless terminal apparatus 42 obtain schedule information J4.

At S47, each apparatus of the narrow-area base station 2, the wireless power transmitter 3, the wireless terminal apparatus 41, and the wireless terminal apparatus 42 transmits schedule receipt notification to the wide area base station 1. At S48, the wireless terminal apparatus 42 switches the antenna switch so that the antenna is connected to the wireless power transfer side to execute preparation of wireless power transfer. At S49, the wireless power transmitter 3 transmits wireless power transfer start notification to the wide-area base station 1 through the narrow-area base station 2. The wide-area base station 1 transmits the corresponding wireless power transfer start notification to the wireless terminal apparatus 41 and the wireless terminal apparatus 42 through the narrow-area base station 2. The wireless power transfer start notification at this time is notification that the wireless power transmitter 3 starts wireless power transfer for the wireless terminal apparatus 42 by using the frequency F2.

At S50, the wireless power transmitter 3 ongoingly continues the wireless power transfer to the wireless terminal apparatus 41 by using the frequency f1. The wireless power transmitter 3 newly starts wireless power transfer for the wireless terminal apparatus 42 by using the frequency F2. The wireless terminal apparatus 42 receives the wireless power transfer at the frequency F2, rand charges received electric power to the battery 423. Then, in a case where each wireless power transfer is ended, the wireless resource is released on the basis of the wireless power transfer end notification. The wireless base station can use the released wireless resource at the time of new scheduling. As described above, in the example of the second sequence, it is possible to prevent interference by separating frequencies of the wireless power transfers for the plurality of wireless terminal apparatuses 4 in the same time zone.

Note that the sequence in a case where the narrow-area base station 2 and the wireless power transmitter 3 are separate bodies as illustrated in FIG. 1 is illustrated in the above. Even in a case where the narrow-area base station 2 and the wireless power transmitter 3 are integrated as the wireless base station power transmitter 5 as illustrated in FIG. 2, similar control can be realized. In that case, wireless communication between the narrow-area base station 2 and the wireless power transmitter 3 can be reduced.

Further, in the above, the sequence in a case where the wide-area base station 1 executes scheduling has been illustrated. However, even in a case where the narrow-area base station 2 or the wireless base station power transmitter 5 executes scheduling, similar control can be realized. Note that there may be a difference in a scheduling target area between a case where the wide-area base station 1 executes the scheduling and a case where the narrow-area base station 2 executes the scheduling. In a case where the narrow-area base station 2 executes the scheduling, the scheduling target area is limited to the area 101. In a case where the wide-area base station 1 executes the scheduling, the scheduling target area may be a wider area than the area 101.

In the second sequence, assuming cooperation among the plurality of wireless terminal apparatuses 4, the method of notifying both the wireless terminal apparatus 41 and the wireless terminal apparatus 42 of the schedule notification and the wireless power transfer start notification is adopted. However, the present invention is not limited to this, and any method can be adopted. A method of notifying only the wireless terminal apparatus 42 as a target of the schedule notification or the like may be used.

[Wireless Communication Sequence (4)—Highest Priority Data Communication]

Figure 21:
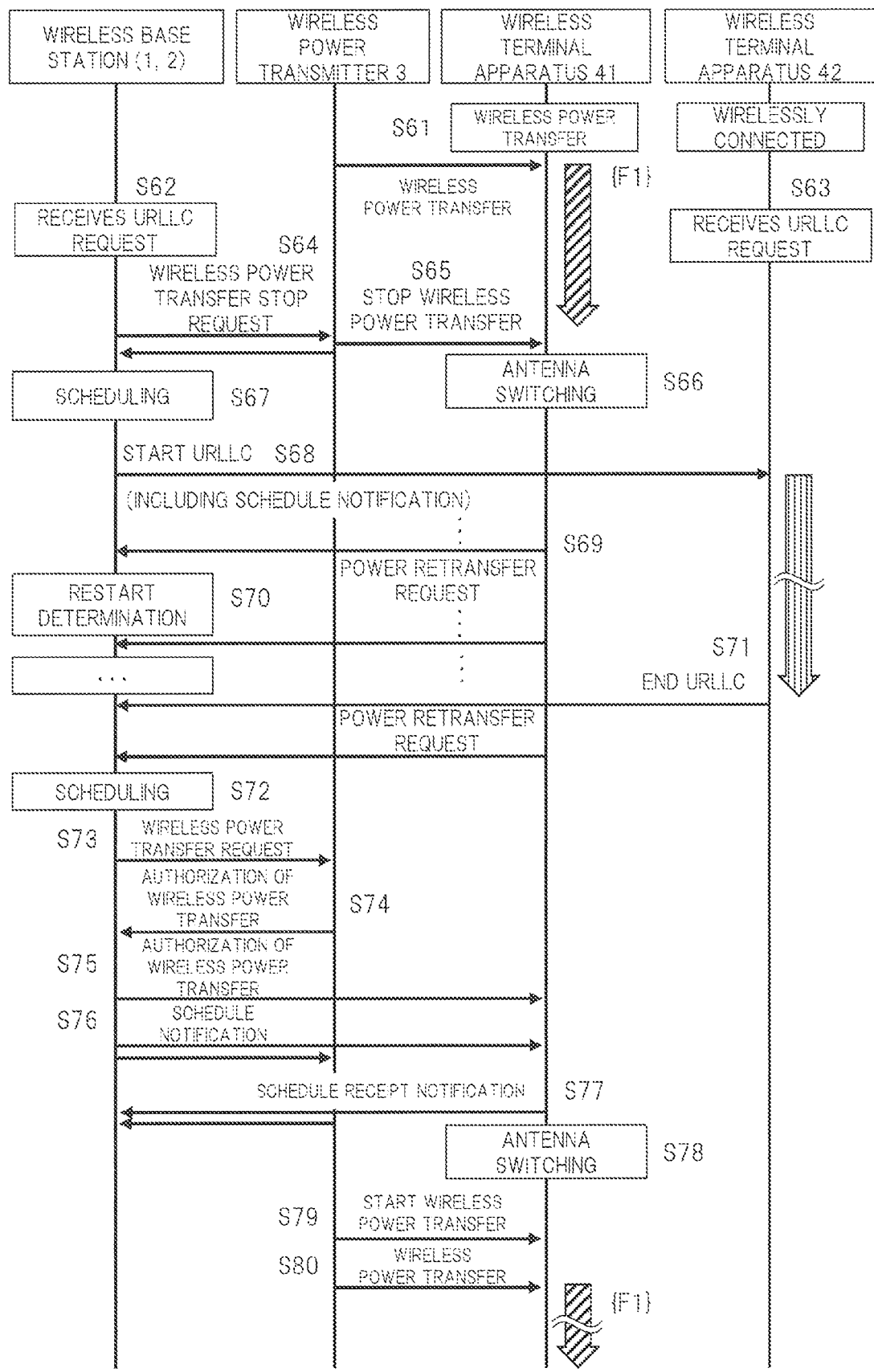
FIG. 21 is a view illustrating a third sequence among the apparatuses according to the first embodiment.

FIG. 21 illustrates still another example of the sequence of wireless communication (hereinafter, referred to as a "third sequence"). In the present embodiment, a case where a request of a type of wireless data communication with higher importance and higher priority (referred to as "highest priority data communication"), which is distinguished from normal (in other words, general) wireless data communication is generate as wireless data communication is illustrated. In the present embodiment, one wireless terminal apparatus 41 of a plurality (for example, two) of wireless terminal apparatuses 4 (41, 42) in an area 101 is in a state where it is receiving wireless power transfer from a wireless power transmitter 3 by using frequency F1. At that time, a case where a request of the highest priority data communication is generated in a state where the other wireless terminal apparatus 42 has already been connected to the wireless data communication is illustrated. The sequence illustrated in FIG. 21 includes Steps S61 to S80 below.

Here, the highest priority data communication is wireless data communication (at least one communication of transmission or reception) has property of Ultra-Reliable and Low Latency Communications (URLLC). The URLLC is communication in which communication in real time is continued and non-disconnection is desirable. The URLLC is applied to remote surgery, automatic vehicle driving, and the like, for example. The URLLC is not limited to a control within a single narrow-area base station 2 (the corresponding area 101) to which the wireless terminal apparatus 4 belongs, and may be communication with an apparatus such as another wireless terminal apparatus 4 that exists within an area that another wide-area base station 1 different from, the wide-area base station 1 to which the narrow-area base station 2 belongs has jurisdiction over. The URLLC is supposed to be executed using all channels of a millimeter wave band due to its nature, for example.

At S61, wireless power transfer for the wireless terminal apparatus 41 is executed from the wireless power transmitter 3 by using the frequency F1 on the basis of an existing schedule. Further, the wireless terminal apparatus 42 is in a state where it has already been connected by wireless data communication using predetermined frequency. At S62, the narrow-area base station 2 receives an URLLC request from the wide-area base station 1 as an interrupt signal. The wide-area base station 1 receives the URLLC request from the other wide-area base station through a core network or the like. A target of the URLLC is the wireless terminal apparatus 42. At S63, the wireless terminal apparatus 42 also receives the URLLC request through the wide-area base station 1 at substantially the same time as the narrow-area base station 2.

At S64, the narrow-area base station 2 grasps that wireless data communication to the target wireless terminal apparatus 42 is of a high priority type on the basis of the URLLC request. Further, at that time, the narrow-area base station 2 also grasps that the wireless terminal apparatus 41 is in a state during wireless power transfer. The narrow-area base station 2 determines that the URLLC should be given the highest priority so that the URLLC does not interfere with the other wireless data communication or the other wireless power transfer. For that reason, at S64, the narrow-area base station 2 first transmits a wireless power transfer stop request regarding the executing wireless power transfer to the wireless power transmitter 3. At S65, the wireless power transmitter 3 immediately stops the wireless power transfer for the wireless terminal apparatus 41 in accordance with reception of the wireless power transfer stop request. Further, at that time, the wireless power transmitter 3 transmits wireless power transfer stop notification to the narrow-area base station 2 and the wireless terminal apparatus 41.

At S66, the wireless terminal apparatus 41 that receives the wireless power transfer stop notification switches the antenna switch so that the antenna is connected from the wireless power transfer side to the wireless data communication side. Note that at the time of a normal state, the wireless terminal apparatus 4 standardizes the wireless data communication, and thus keeps a state where the antenna is connected to the wireless data communication side.

At S67, the narrow-area base station 2 executes scheduling in view of the URLLC. For example, time and frequency are preferentially secured for the URLLC of the wireless terminal apparatus 42. Then, at S68, the narrow-area base station 2 starts the URLLC for the wireless terminal apparatus 42 together with schedule notification. Along with this, the wireless terminal apparatus 42 executes the wireless data communication of the URLLC with an external device on the other side through the narrow-area base station 2 and the wide-area base station. 1.

On the other hand, at S69, after the wireless power transfer is stopped halfway at S65, the wireless terminal apparatus 41 transmits a power retransfer request, which is a request for restart of the wireless power transfer, to the narrow-area base station 2 at regular timing, for example. Alternatively, the wireless terminal apparatus 41 may transmit the power retransfer request to the wireless power transmitter 3, and the wireless power transmitter 3 may transmit the power retransfer request corresponding to the narrow-area base station 2.

At S70, when the power retransfer request is received, the narrow-area base station 2 determines whether the wireless power transfer is restarted or not (in other words, authorized or not). In the present embodiment, the narrow-area base station 2 determines that restart or authorization is not executed in a state where the URLLC continues. In the present embodiment, in a case where the URLLC continues or is not ended when the power retransfer request is received, the narrow-area base station 2 does not transmit a response to the wireless terminal apparatus 41. Alternatively, the narrow-area base station 2 may transmit a response of unauthorization. At S71, in a case where the URLLC is ended, the URLLC end notification is transmitted from the wireless terminal apparatus 42 to the narrow-area base station 2. Alternatively, the narrow-area base station 2 grasps an URLLC end state on the basis of communication with the wide-area base station 1.

At S72, in case of a state where the URLLC is ended when the power retransfer request is received, the narrow-area base station 2 executes scheduling again. Since a wireless resource for the URLLC is released in this scheduling, the narrow-area base station 2 can create a new schedule by using the wireless resource. For example, for wireless power transfer of the wireless terminal apparatus 41, the frequency F1 is allocated again. Note that at the time of this scheduling, a frequency different from the previous frequency F1 may be allocated depending upon a situation.

At S73, the narrow-area base station 2 transmits a wireless power transfer request based on the new schedule to the wireless power transmitter 3. At S74, in case of a state where the wireless power transfer can be restarted, the wireless power transmitter 3 transmits authorization of the wireless power transfer to the narrow-area base station 2. At S75, the narrow-area base station 2 transmits authorization of the wireless power transfer, which is authorization of restart of the wireless power transfer, to the wireless terminal apparatus 41. At S76, the narrow-area base station 2 transmits new schedule notification to the wireless power transmitter 3 and the wireless terminal apparatus 41. At S77, each of the wireless power transmitter 3 and the wireless terminal apparatus 41 transmits schedule receipt notification to the narrow-area base station 2. At S78, in a case where frequency or the like changes, the wireless terminal apparatus 41 addresses the change in accordance with schedule information to switch the antenna switch so that the antenna is connected to the wireless power transfer side.

At S79, the wireless power transmitter 3 transmits wireless power transfer start notification to the wireless terminal apparatus 41. This notification is notification that the wireless power transfer to the wireless terminal apparatus 41 is restarted using the frequency F1 allocated by scheduling. The wireless power transmitter 3 then starts the wireless power transfer with the wireless terminal apparatus 41 by using the frequency F1. The wireless terminal apparatus 41 receives the wireless power transfer to charge received electric power into the battery 423.

In the sequence described above, at S66, the wireless terminal apparatus 41 switches the antenna from the wireless power transfer side to the wireless data communication side, and at S78, switches the antenna from the wireless data communication side to the wireless power transfer side. The following may be a sequence of a modification example. At S66, the wireless terminal apparatus 41 does not switch the antenna from the wireless power transfer side to the wireless data communication side, and at S69, transmits a power retransfer request to the narrow-area base station 2. Further, in a case where authorization of wireless power transfer for restart is received at S75, the wireless terminal apparatus 41 does not switch the antenna at S78, and restarts the wireless power transfer. The present invention is not limited to the example of the URLLC described above. In a case where urgency, the degree of importance, priority and the like can be determined with respect to the type or the content of the wireless data communication, scheduling and control can be executed in accordance with the determination.

Scheduling Example

FIG. 22 illustrates a schedule example that also corresponds to the example of the third sequence illustrated in FIGS. 21. (A) and (B) of FIG. 22 illustrates examples of a change in schedule information on wireless resource allocation before and after the URLLC request. In the present embodiment, there are twelve wireless terminal apparatuses 4 (whose ID=MT1 to MT12) as the plurality of wireless terminal apparatuses 4 in the area 101, for example. In the schedule of (A), the wireless terminal apparatus MT1 uses two channels of channels c12, c13 to receive wireless power transfer during time t1 to t12. The wireless terminal apparatus MT3 uses one channel c1 to execute general wireless data communication during time t1 to t10. Further, nine wireless terminal apparatuses 4 of the wireless terminal apparatuses MT4 to MT12 uses nine channels of channel c2 to c10 to execute multiple-apparatus connection data communication (MMTC, indicated by a grid pattern) as illustrated in the example of FIG. 2.

In a case where a request of the URLLC is generated as the highest priority communication for the wireless terminal apparatus MT2 as a target, a schedule of (B) is created by scheduling. In the schedule of (B), the wireless terminal apparatus MT2 uses all the channels c1 to c12 to execute the URLLC (indicated by a stripe pattern) at times t5, t6, t9, and t10. Due to the generation of the URLLC, the wireless power transfer for the wireless terminal apparatus MTA using the channels c12, c13 is interrupted at the time t5. The general wireless data communication for the wireless terminal apparatus MT3 using the channel c1 is interrupted at the time of the URLLC. The MMTC for the wireless terminal apparatuses MT4 to MT12 using the channels c2 to c10 is interrupted at the time of the URLLC.

In a case where the URLLC for the wireless terminal apparatus MT2 via the narrow-area base station 2 is ended, wireless power transfer for the wireless terminal apparatus MT1 using the channels c12, c13 is restarted at the time t12 immediately after a time of one cell. This is because data of the wireless terminal apparatus MT3 and data of the wireless terminal apparatuses MT4 to MT12, which are interrupted by the URLLC and are time-shifted due to the scheduling of the narrow area base station 2, are restored in the narrow-area base station 2 by an error correction technique such as HARQ (Hybrid Automatic Repeat request).

In the example described above, the wireless power transfer of the wireless terminal apparatus MT1 is restarted again using the wireless resource at the same frequency after the URLLC is ended in the similar manner illustrated in FIG. 21. On the other hand, in another example of scheduling, the narrow-area base station 2 manages the schedule together with the states of the wireless terminal apparatus MT3 and the wireless terminal apparatuses MT4 to MT12, whereby it is also possible to restart the wireless power transfer for the wireless terminal apparatus MT1 after the URLLC is ended.

[Location Managing Function]

In the first embodiment, each of the apparatuses of the wireless power transfer system further includes a location managing function that is a function for location grasping or location correction of each of the apparatuses related to wireless power transfer. This location managing function is a function that particularly realizes accuracy improvement of the wireless power transfer using a millimeter wave band. In the present system, before wireless power transfer using millimeter waves, a location of the wireless terminal apparatus 4 when viewed from the wireless power transmitter 3 is obtained by correction using this function on the basis of terminal location information possessed by the narrow-area base station 2. The wireless power transmitter 3 can execute the wireless power transfer using the millimeter waves with high accuracy by using the location on the basis of a relationship of Line of Sight.

Figure 23:
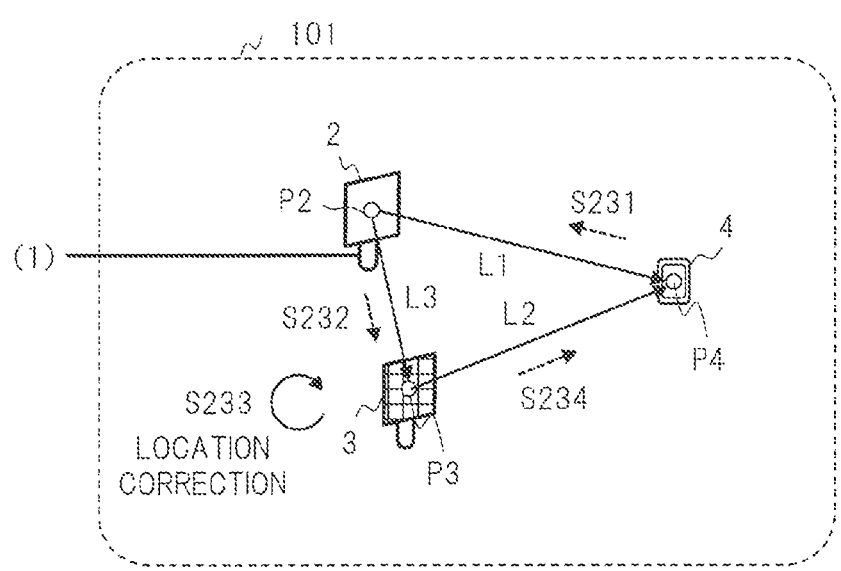
FIG. 23 is a view illustrating a location managing function according to the first embodiment.

FIG. 23 illustrates an explanatory drawing regarding the location managing function. A case where one narrow-area base station 2, one wireless power transmitter 3, and one wireless terminal apparatus 4 are connected to each other in an area 101. An absolute location (a three-dimensional coordinate indicating a location) of each apparatus is as follows. A location of the narrow-area base station 2 is referred to as a location P2, a location of the wireless power transmitter 3 is referred to as a location P3, and a location of the wireless terminal apparatus 4 is referred to as a location P4. Further, a relative position (corresponding to a displacement amount or a vector) of the wireless terminal apparatus 4 when viewed from the narrow-area base station 2 is referred to as a location L1. A, relative position of the wireless terminal apparatus 4 when viewed from the wireless power transmitter 3 is referred to as a location L2. A relative position of the wireless power transmitter 3 when viewed from the narrow-area base station 2 is referred to as a location L3.

When the wireless power transmitter 3 executes wireless power transfer to the wireless terminal apparatus 4, in particular, executes wireless power transfer using millimeter waves, the wireless power transmitter 3 needs to grasp the location of the wireless terminal apparatus 4 as a target with high accuracy. As illustrated in FIG. 13 described above, due to strength of a directional characteristic of the millimeter waves, a relationship of Line of Sight between the location P3 of the wireless power transmitter 3 (in particular, the antenna 361) and the location P4 of the wireless terminal apparatus 4 (in particular, the antenna 61) is important for efficient wireless power transfer. Namely, it is desirable that the wireless power transmitter 3 grasps the location L2 with high accuracy. For that reason, the location managing function is used in the present system. The terminal information manager 301D illustrated in FIG. 11 also executes processing corresponding to the location managing function.

In a case where the wireless power transmitter 3 can obtain information on the location L2 (or the location P4 of the wireless terminal apparatus 4 and the location P3 of the wireless power transmitter 3) directly from the wireless terminal apparatus 4 or the narrow-area base station 2 as the terminal information JT, it is not necessary to use this location managing function. For example, the wireless terminal apparatus 4 may provide the wireless power transmitter 3 with the terminal information JT containing its own location P4 obtained by using a GPS with high accuracy or a sensor.

However, for example, in a case where the information obtained as the location of the wireless terminal apparatus 4 is only the location L1 when viewed from the narrow-area base station 2, there is a location difference between the wireless power transmitter 3 and the narrow-area base station 2, and it is different from the location L2 when viewed from the wireless power transmitter 3. For that reason, efficiency of the wireless power transfer based on the location L1 is lower than an ideal value. Therefore, in the present system, the location managing function is used to obtain the information on the location L2 from the information on the location L1 and the location L3 by correction, and wireless power transfer based on the location L2 is executed. This makes it possible to execute more efficient wireless power transfer.

In FIG. 23, the location L3 of the wireless power transmitter 3 when viewed from the narrow-area base station 2 is registered in the present system in advance as a setting when the system is installed. Each of the narrow area base station 2 and the wireless power transmitter 3 has the information on the location L3. FIG. 23 includes Steps S231 to S234 as a sequence regarding location correction.

At S231, when a wireless power transfer request is transmitted to the narrow-area base station 2 or the wireless power transmitter 3, the wireless terminal apparatus 4 transmits the terminal information JT thereto at the same time, for example. This terminal information JT contains an ID and a type of the wireless terminal apparatus 4, an electric power state including a state of the battery 423, location information, device configuration information, and the like. In this sequence, this terminal information JT contains information on the relative location L1 when viewed from the narrow-area base station 2 as the location information. The narrow-area base station 2 grasps the location L1 of the wireless terminal apparatus 4 for wireless data communication as a basic function. Alternatively, this location information on the location L1 may be location information grasped by the wireless terminal apparatus 4 itself by means of the GPS with high accuracy, the sensor or the other means.

At S252, the narrow-area base station 2 transmits the terminal information JT of the wireless terminal apparatus 4 to the wireless power transmitter 3. Alternatively, the wireless power transmitter requests and obtains the terminal information JT from the narrow-area base station 2. At S253, the wireless power transmitter 3 grasps the location L1 from the obtained terminal information JT. Further, the wireless power transmitter 3 grasps the location L3 of the wireless power transmitter 3 when viewed from the narrow-area base station 2. The wireless power transmitter 3 then corrects the location L1 by using the location L3, thereby obtaining the location L2. A formula when considered as a vector is L2=L1−L3. Further, the wireless power transmitter 3 can grasp the location P4 of the wireless terminal apparatus 4 from the location L2 with respect to its own location P3.

At S254, the wireless power transmitter 3 uses the location L2 and the location P4 obtained at S253 to execute wireless power transfer of millimeter waves to the wireless terminal apparatus 4. At that time, the wireless power transmitter 3 selects the antenna 361 that becomes the best location relationship with respect to the location L2 and the location P4, and executes the wireless power transfer of the millimeter waves. Namely, as described above, for example, one that has a location relationship in which a difference between a direction of the antenna 361 and a direction of the antenna 61 of the wireless terminal apparatus 4 is the smallest is selected. Further, for example, the wireless power transmitter 3 may adjust the direction of the antenna 361 so as to face a direction corresponding to the location L2 and the location P4, and execute the wireless power transfer of the millimeter waves. In a case where the antenna 361 has a movable mechanism, such adjustment is possible. Alternatively, the wireless power transmitter 3 may notify the wireless terminal apparatus 4 and cause the user to output a prompt so as to have a suitable location relationship corresponding to the location L2.

In the example of the location managing function described above, the location correction has been executed by the wireless power transmitter 3. However, the present invention is not limited to this, and any location correction is possible. In the modification example, the narrow-area base station 2 or the wireless terminal apparatus 4 may execute the location correction. In a case where the narrow-area base station 2 executes the location correction, the narrow-area base station 2 calculates the location L2 from the location L1 and the location L3, and transmits the information on the location L2 to the wireless power transmitter 3. In a case where the wireless terminal apparatus 4 executes the location correction, the wireless terminal apparatus 4 obtains the information on the location L1 and the location L3 from the narrow-area base station 2; calculates the location L2 from the location L1 and the location L3; and transmits the information on the location L2 to the wireless power transmitter 3.

Further, in case of the integrated wireless base station power transmitter 5 illustrated in FIG. 2, the location P3 is almost the same as the location P2, that is, the location L1 is almost the same as the location L2. In this case, the location correction can be omitted. Further, in a case where the location L3 of the wireless power transmitter 3 is changed in the area 101 due to movement by the user, as described above, it may be grasped by using a location measuring function regarding the location L3. For example, the narrow-area base station 2 uses an electromagnetic source of millimeter waves as a radar to grasp the location L3 of the wireless power transmitter 3 when viewed from the narrow-area base station 2. Alternatively, the wireless power transmitter 3 uses the electromagnetic source of the millimeter waves as the radar to grasp the location of the narrow-area base station 2 when viewed from the wireless power transmitter 3 and obtain the location L3 from the location.

Further, the narrow-area base station 2 may use the electromagnetic source of the millimeter waves as the radar to measure and grasp the location L1 of the wireless terminal apparatus 4. Further, the wireless power transmitter 3 may use the electromagnetic source of the millimeter waves as the radar to measure and grasp the location L2 of the wireless terminal apparatus 4.

[Effect and the Like (1)]

As described above, according to the system including the wireless terminal apparatus 4 and the wireless power transmitter 3 of the first embodiment, it is possible to prevent or reduce interference between the wireless power transfer and the wireless data communication by scheduling, and this makes it possible to improve efficiency, reliability, and convenience of the user. According to the first embodiment, by separating the time or the frequency of the wireless power transfer and the wireless data communication regarding one or more apparatuses, it is possible to prevent or reduce the interference thereof. Further, in particular, the first embodiment is a method of executing the wireless power transfer by using the radio wave transmitting method, and the wireless terminal apparatus 4 can be arranged within an area of a distance of about several meters with respect to the wireless power transmitter 3, for example. Since it is not limited to adjacent installation, it is highly convenient for the user. Further, in the first embodiment, the wireless power transfer and the wireless data communication using the millimeter wave band and the microwave band are possible. The interference can be reduced for each combination. Further, in case of the wireless power transfer using the millimeter wave band, the relationship of Line of Sight is determined by using the location managing function, whereby it is possible to heighten accuracy thereof.

Modification Example

The following is applicable as a modification example of the first embodiment. In the first embodiment, the wireless terminal apparatus 4 determines charging necessity to generate a wireless power transfer request. The present invention is not limited to this. In the modification example, the wireless power transmitter 3 may cooperate with and communicate with the wireless terminal apparatus 4, and determine charging necessity of the wireless terminal apparatus 4 to generate a wireless power transfer request. For example, the wireless power transmitter 3 obtains the terminal information JT from the wireless terminal apparatus 4, and determines necessity of wireless power transfer in accordance with an electric power state of the wireless terminal apparatus 4, which is indicated by the terminal information JT. The wireless power transmitter 3 then transmits the wireless power transfer request to a wireless base station for a scheduling request.

Further, the communication interface 410 of the wireless terminal apparatus 4 may be a communication interface that accepts one type of wireless communication interface (for example, only a millimeter wave band, or only a microwave band). Further, one communication interface may include a single antenna.

Further, as the system according to the modification example, the wireless base station does not execute scheduling, but the wireless power transmitter 3 may be configured so as to execute the scheduling. In this configuration, the wireless power transmitter 3 grasps information on the wireless power transfer request from the wireless terminal apparatus 4, and obtains and grasps information regarding a request and a state of wireless data communication in cooperation with the narrow area base station 2. The wireless power transmitter 3 executes scheduling, or at least suitable scheduling of the wireless power transfer on the basis of the information so as to reduce interference between the wireless power transfer and the wireless data communication. The wireless power transmitter 3 notifies the wireless terminal apparatus 4 of created schedule information. The wireless terminal apparatus 4 receives the wireless power transfer in accordance with the schedule information.

Modification Example—Communication System (2)

Figure 24:
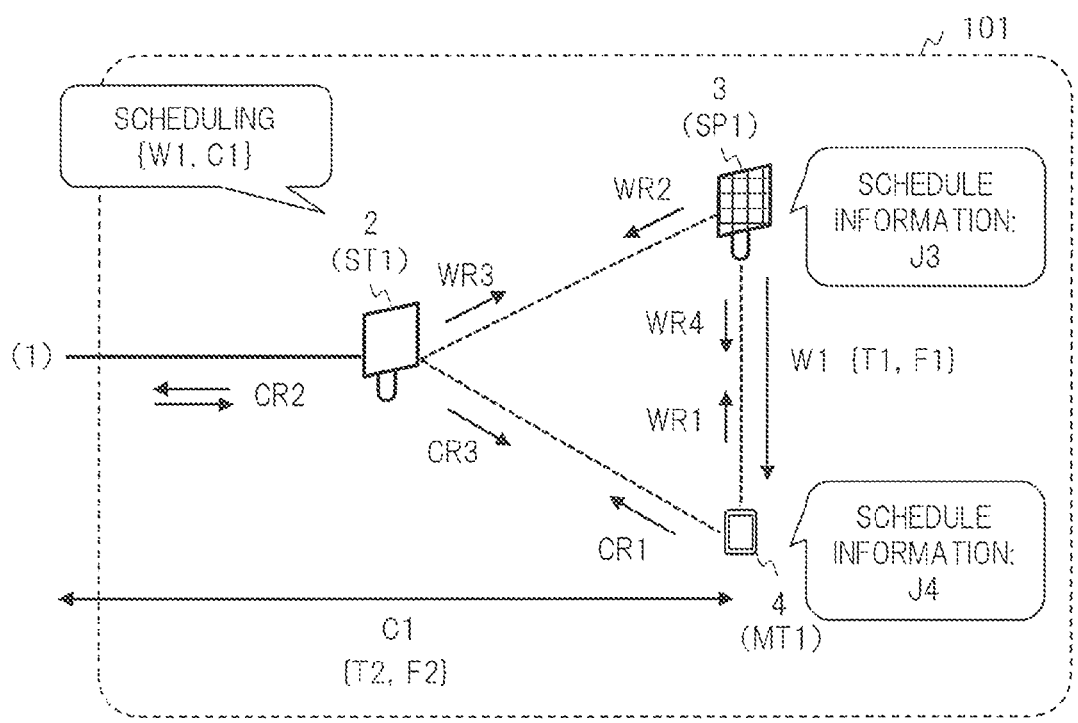
FIG. 24 is a view illustrating a second communication system according to a modification example of the first embodiment.

FIG. 24 illustrates a second communication system in a system according to a modification example of the first embodiment. In the second communication system, a narrow-area base station 2 executes scheduling. Further, in the second communication system, a wireless power transfer request from a wireless terminal apparatus 4 is transmitted to a wireless power transmitter 3. This modification example also allows to obtain the similar effects.

As communication procedures regarding a request of wireless power transfer W1, procedures WR1 to WR4 are illustrated. In the procedure WR1, the wireless terminal apparatus 4 transmits a wireless power transfer request to the wireless power transmitter 3. In the procedure WR2, the wireless power transmitter 3 grasps the wireless power transfer request from, the wireless terminal apparatus 4, and transmits a corresponding wireless power transfer request to the narrow-area base station 2. In the procedure WR3, the narrow-area base station 2 executes scheduling, and then transmits schedule information and the like to the wireless power transmitter 3. In the procedure WR4, the wireless power transmitter 3 transmits the schedule information and the like to the wireless terminal apparatus 4.

Further, as communication procedures regarding a request for wireless data communication C1, procedures CR1 to CR3 are illustrated. In the procedure CR1, the wireless terminal apparatus 4 transmits a request for connection to wireless data communication to the narrow area base station 2. In the procedure CR2, the narrow-area base station 2 communicates with the wide-area base station 1 to confirm connection to wireless data communication, and executes scheduling. In the procedure CR3, the narrow-area base station 2 transmits schedule information and the like to the wireless terminal apparatus 4.

The narrow-area base station 2 executes scheduling when each request is received. The wireless power transmitter 3 executes the wireless power transfer W1 for the wireless terminal apparatus 4 with a first time T1 and a first frequency F1 in accordance with obtained schedule information J3. In corresponding thereto, the wireless terminal apparatus 4 receives the wireless power transfer W1 from the wireless power transmitter 3 in accordance with obtained schedule information J4. Further, the wireless terminal apparatus 4 executes, in accordance with the schedule information J4, the wireless data communication C1 with a second time T2 and a second frequency F2.

Second Embodiment

A wireless power transfer system including a wireless terminal apparatus and a wire less power transmitter according to a second embodiment of the present invention will be described with reference to FIG. 26 and FIG. 27. Hereinafter, component parts of the second embodiment, which are different from those of the first embodiment, will be described. In the second embodiment, at the time of wireless power transfer, a narrow-area base station 2 and a wireless power transmitter 3 do not actively cooperate with each other (including wireless communication for a control) unlike the first embodiment. In the second embodiment, the narrow-area base station 2 and a wireless terminal apparatus 4 cooperate with each other, and the wireless terminal apparatus 4 and the wireless power transmitter 3 cooperate with each other, thereby executing the wireless power transfer. Further, in the second embodiment, the narrow-area base station 2 executes scheduling.

[Wireless Power Transfer System and Wireless Terminal Apparatus]

Figure 26:
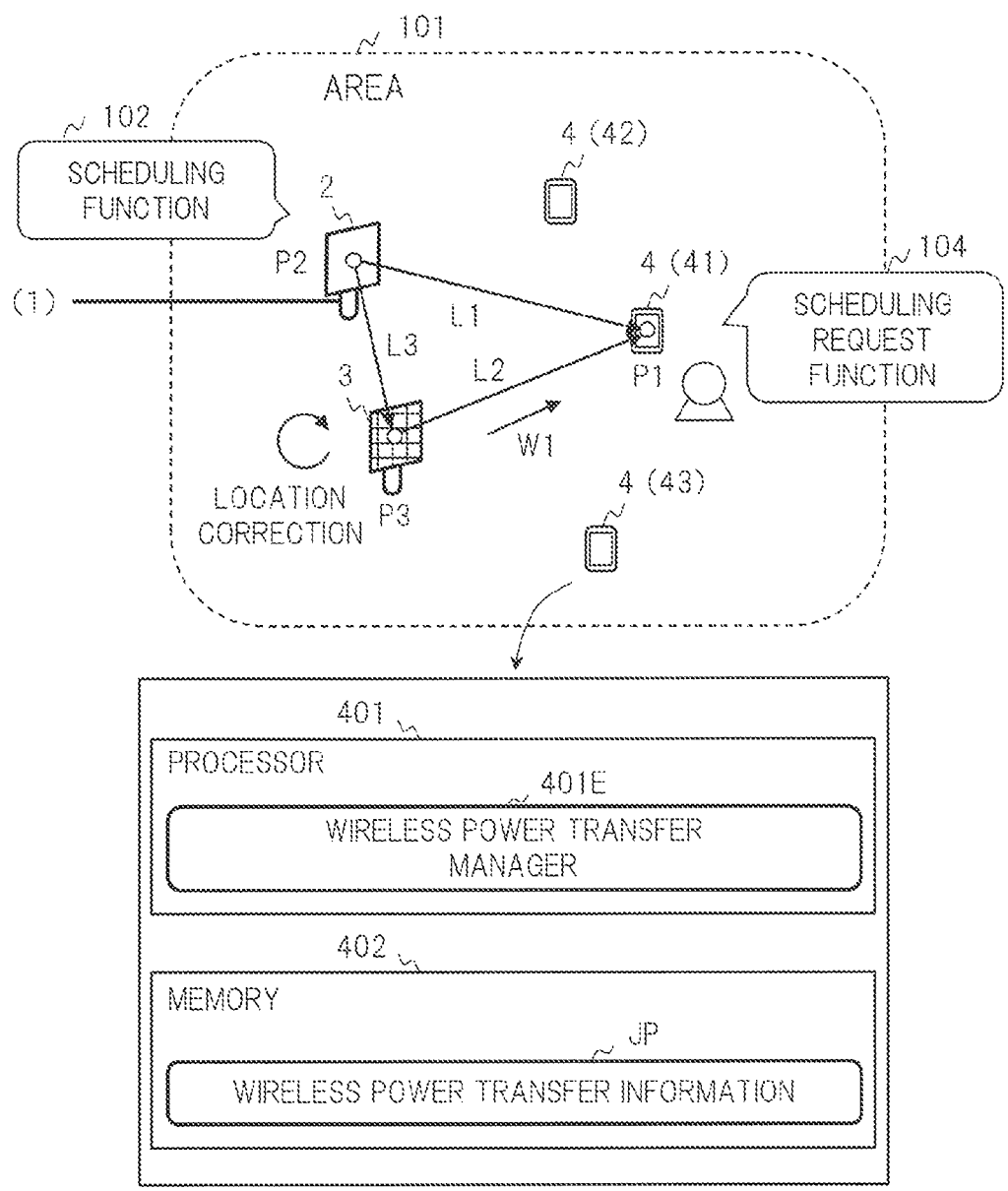
FIG. 26 is a view illustrating a configuration of a wireless power transfer system including a wireless terminal apparatus and a wireless power transmitter according to a second embodiment of the present invention.

FIG. 26 illustrates a configuration example of the wireless power transfer system according to the second embodiment. The narrow-area base station 2, the wireless power transmitter 3, and a plurality (for example, three) of wireless terminal apparatuses 4 (41 to 43) exist within an area 101. Unlike the first embodiment, the wireless power transmitter 3 does not actively cooperate with the narrow-area base station 2. The wireless power transmitter 3 wirelessly communicates with the wireless terminal apparatus 4 to cooperate with each other. A wireless base station (in particular, the narrow-area base station 2) includes a scheduling function 102. The wireless terminal apparatus 4 includes a scheduling request function 104.

A configuration of the wireless terminal apparatus 4 according to the second embodiment is different from the configuration of the wireless terminal apparatus 4 according to the first embodiment in that the processor 401 illustrated in FIG. 8 further includes a wireless power transfer manager 401E. The wireless power transfer manager 401E is a part that manages information (hereinafter, referred to as "wireless power transfer information JP") necessary for the wireless terminal apparatus 4 to recognize the wireless power transmitter 3 and for the wireless terminal apparatus 4 to receive wireless power transfer from the wireless power transmitter 3. The wireless power transfer manager 401E stores the wireless power transfer information JP in a memory 402. The wireless power transfer information JP contains wireless power transmitter information obtained from the wireless power transmitter 3. The wireless power transmitter information contains an ID, a type, a location, a state, and device configuration information of the wireless power transmitter 3. The device configuration information contains information on a type of each antenna and the number of antennas in a power transmitter. The wireless power transfer information JP may contain information on a relative location of the wireless power transmitter 3 when viewed from the wireless terminal apparatus 4. The wireless terminal apparatus 4 grasped the relative location by using the location determining function described above.

[Wireless Communication Sequence]

Figure 27:
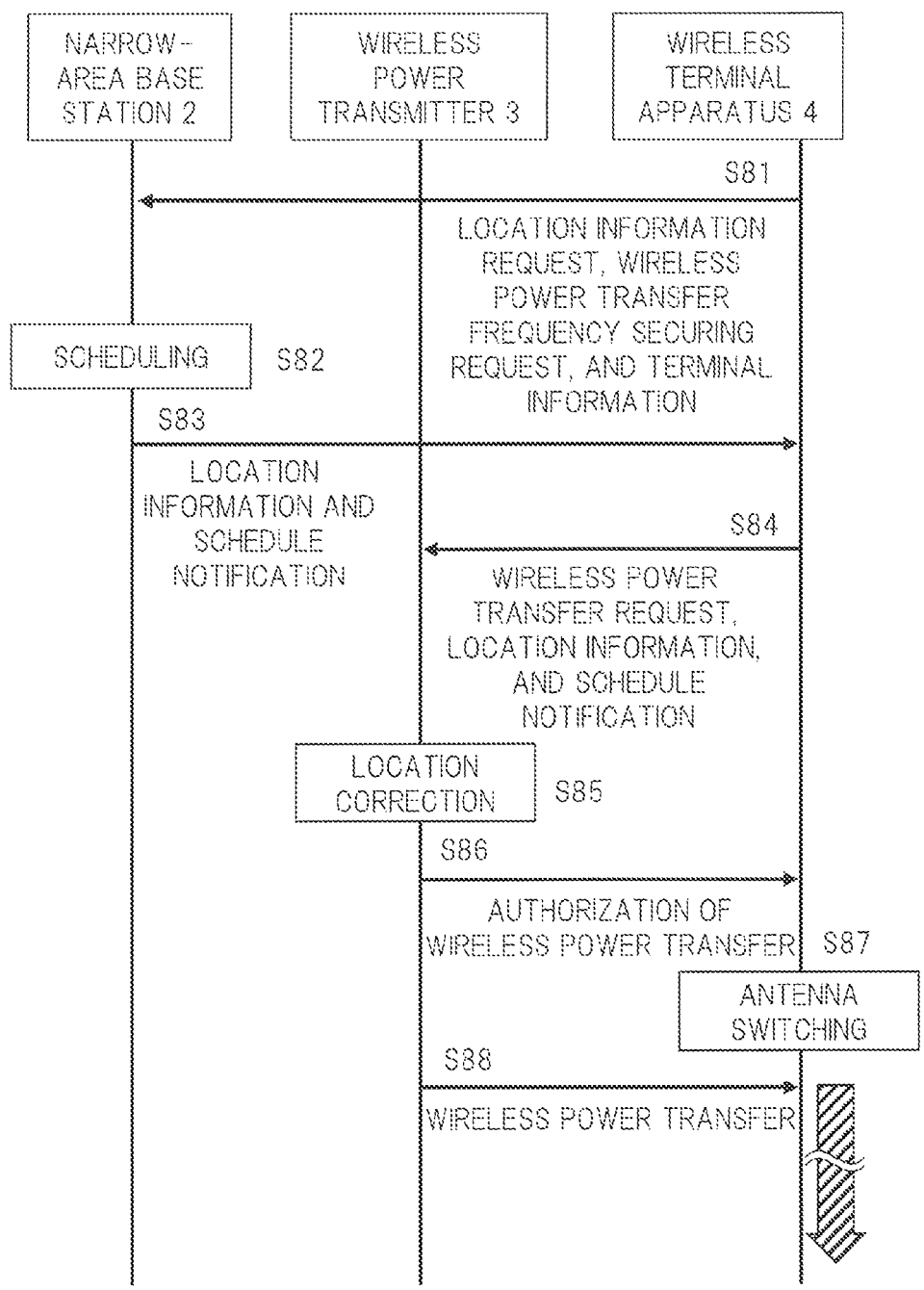
FIG. 27 is a view illustrating a sequence among apparatuses according to the second embodiment.

FIG. 27 illustrates a sequence of wireless communication by the system according to the second embodiment. This sequence is a sequence in which a location L1 of the wireless terminal apparatus 4 grasped by the narrow-area base station 2 is corrected to a location L2 of the wireless terminal apparatus 4 when viewed from the wireless power transmitter 3, and wireless power transfer is then executed. This sequence includes Steps S81 to S88 below.

At S81, when a wireless power transfer request is executed for charging the battery 423, the wireless terminal apparatus 4 first transmits a location information request, a wireless power transfer frequency securing request, and terminal information JT to the narrow-area base station 2. The location information request is a request regarding the location L1 of the wireless terminal apparatus 4 when viewed from the narrow-area base station 2. The wireless power transfer frequency securing request is a request regarding allocation of wireless resources such as frequencies for the wireless power transfer, in other words, it is a scheduling request. As described above, the terminal information JT is Information that contains an ID and a state of the wireless terminal apparatus 4, and does not contain location information.

At S82, in response to the wireless power transfer frequency securing request, the narrow-area base station 2 executes scheduling including the allocation of the wireless resources such as frequencies for the wireless power transfer on the basis of the state of the wireless terminal apparatus 4 indicated by the terminal information JT. Alternatively, in a case where the wide-area base station 1 executes the scheduling, the narrow-area base station 2 requests the wide-area base station 1 for scheduling, and obtains schedule information of a scheduling result by the wide-area base station 1. This scheduling prevents or reduces interference between wireless data communication and wireless power transfer in the similar manner to the first embodiment.

At S83, the narrow-area base station 2 responds to the location information request from the wireless terminal apparatus 4 to transmit information on the grasped location L1 to the wireless terminal apparatus 4. The narrow-area base station 2 transmits the schedule information (corresponding schedule notification) to the wireless terminal apparatus 4 as a response together with location information on the location L1. At S84, the wireless terminal apparatus 4 transmits the wireless power transfer request to the wireless power transmitter 3 together with the information on the location L1 obtained from the narrow-area base station 2 and the schedule information. At S85, the wireless power transmitter 3 obtains the location L2 of the wireless terminal apparatus 4 when viewed from the wireless power transmitter 3 by correction using the location L1 obtained from the wireless terminal apparatus 4 and the location L3 that is a setting value. In particular, this location correction is effective at the time of wireless power transfer using millimeter waves.

At S86, in a case where the wireless power transfer is authorized, the wireless power transmitter 3 transmits authorization of wireless power transfer to the wireless terminal apparatus 4 in accordance with the schedule information obtained at S83. At S87, in accordance with the schedule information, the wireless terminal apparatus 4 switches the antenna switch so that the antenna to be used of the communication interface 410 is connected to the wireless power transfer side. At S88, the wireless bower transmitter 3 executes the wireless power transfer with the wireless terminal apparatus 4 toward the location L2 obtained at S85 in accordance with the schedule information.

[Effect and the Like (2)]

As described above, according to the second embodiment, it is possible to obtain the similar effects to those of the first embodiment. In the system according to the second embodiment, at the time of the wireless power transfer, the narrow-area base station 2 and the wireless power transmitter 3 do not actively cooperate with each other, and the similar functions to those in the first embodiment are realized mainly by the wireless terminal apparatus 4 in a form of intervening between the narrow-area base station 2 and the wireless power transmitter 3.

Third. Embodiment

A wireless power transfer system including a wireless terminal apparatus and a wireless power transmitter according to a third embodiment of the present invention will be described with reference to FIG. 28. In the third embodiment, each apparatus includes a location determining function using a camera. Further, in the third embodiment, a detailed example of a case where an antenna dividing method is used as a scheduling method will be described.

[Location Determining Function Using Camera]

With respect to the location managing function described above, the following functions can be used when a location L2 of a wireless terminal apparatus 4 when viewed from a wireless power transmitter 3 is grasped. Each apparatus of the present system may include a location determining function that is a function to determine a location of each of the other apparatuses by analyzing an image using a camera as described below.

In a case where a narrow-area base station 2 includes a camera, a location L1 of the wireless terminal apparatus 4 and a location L3 of the wireless power transmitter 3 may be grasped by means of an analysis of an image photographed by the camera. Further, in a case where the wireless power transmitter 3 includes a camera 304, the location L2 of the wireless terminal apparatus 4 and a location of the narrow-area base station 2 may be grasped by means of an analysis of an image photographed by the camera 304. In a case where the wireless terminal apparatus 4 includes a camera 404, the location of the wireless power transmitter 3 and the location of the narrow-area base station 2 may be grasped by means of an analysis of an image photographed by the camera 404.

The location determining function will be described with reference to FIG. 13 described above. For example, in (A) of FIG. 13, each of the wireless power transmitter 3 and the wireless terminal apparatus 4 may include a location determining function. By determining a relationship of Line of Sight among the apparatuses using the location determining function, it is possible to realize the wireless power transfer more efficiently.

In a case where the wireless power transmitter 3 includes a location determining function, the wireless power transmitter 3 photographs an image using the camera 304 at the time of the wireless power transfer. The wireless power transmitter 3 determines, from the image, whether the wireless terminal apparatus 4 as a target exists within a predetermined area centered on a direction of the camera 304 or not and whether there is no shielding object OB (including a case where it is a person) in the vicinity of the line in the direction or not. In a case where the wireless terminal apparatus 4 as the target exists within the area in the direction and there is no shielding object OB, the wireless power transmitter 3 determines that the wireless power transfer can be executed efficiently, that is, it has a relationship of Line of Sight. In a case where the wireless terminal apparatus 4 as the target does not exist within the area in the direction and there is a shielding object OB, the wireless power transmitter 3 determines that the wireless power transfer cannot be executed efficiently, that is, it does not have a relationship of Line of Sight. The wireless power transmitter 3 controls the wireless power transfer on the basis of a determination result.

Further, the wireless power transmitter 3 may transmit determination result information of the location determining function to a wireless base station (the narrow-area base station 2 and a wide-area base station 1), and notify the wireless base station of it, whereby it may be reflected to scheduling. For example, the wireless power transmitter 3 transmits information containing whether there is a relationship of Line of Sight with the wireless terminal apparatus 4 or not or a location relationship to the wireless base station. The wireless base station takes the information into consideration to create a schedule including suitable wireless resource allocation. Further, the wireless power transmitter 3 may transmit the determination result information and notify the wireless terminal apparatus 4 as the target of it. Further, the wireless power transmitter 3 may cause a user of the wireless terminal apparatus 4 to output a prompt so as to adjust the location and the direction of the wireless terminal apparatus 4.

In a case where the wireless terminal apparatus 4 includes a location determining function, the wireless terminal apparatus 4 photographs an image using a camera 404 when the wireless power transfer is received. The wireless terminal apparatus 4 determines, from the image, whether the wireless power transmitter 3 that becomes the other side or a candidate exists within a predetermined area centered on a direction of the camera 404 or not and whether there is no shielding object OB within an area on a line of the direction or not. In a case where the wireless power transmitter 3 exists within the area in the direction and there is no shielding object OB, the wireless terminal apparatus 4 determines that the wireless power transfer can be received efficiently, that is, it has a relationship of Line of Sight. In a case where the wireless power transmitter 3 does not exist within the area in the direction and there is a shielding object OB, the wireless terminal apparatus 4 determines that the wireless power transfer can be received efficiently, that is, it has a relationship of Line of Sight. The wireless terminal apparatus 4 controls an operation of power reception of the wireless power transfer on the basis of a determination result.

Further, the wireless terminal apparatus 4 may transmit determination result information to the wireless base station (the narrow-area base station 2 and the wide-area base station 1), and notify the wireless base station of it, it may be reflected to scheduling. For example, the wireless terminal apparatus 4 transmits information containing whether there is a relationship of Line of Sight with the wireless power transmitter 3 or not or the location relationship to the wireless base station. The wireless base station takes the information into consideration to create a schedule including suitable wireless resource allocation. Further, the wireless terminal apparatus 4 may transmit the determination result information and notify the wireless power transmitter 3 as the other side of it. Further, the wireless terminal apparatus 4 may cause a user to output a prompt so as to adjust the location and the direction of the wireless terminal apparatus 4.

[Antenna Location Determining Function]

Moreover, in particular, each apparatus of the present system may include an antenna location determining function as the location determining function described above. The antenna location determining function is a function to determine a location of an antenna of the other apparatus by means of an analysis of an image of a camera. The antenna location determining function will be described with reference to FIG. 13 described above. For example, in (A) of FIG. 13, each of the wireless power transmitter 3 and the wireless terminal apparatus 4 may include the antenna location determining function. By determining a relationship of Line of Sight between antennas using the antenna location determining function, wireless power transfer using millimeter waves can be realized more efficiently.

In a case where the wire less power transmitter 3 includes the antenna location determining function, the wireless power transmitter 3 photographs an image using the camera 304 at the time of the wireless power transfer using the millimeter waves. The wireless power transmitter 3 determines, from the image, whether an antenna 61 for millimeter waves of the wireless terminal apparatus 4 as a target exists within a predetermined area centered on a direction (for example, a direction d1) of an antenna 361 or not and whether there is no shielding object OB within the area in the direction or not. In a case where the antenna 61 of the wireless terminal apparatus 4 as the target exists within the area in the direction and there is no shielding object OB, the wireless power transmitter 3 determines that the wireless power transfer using the millimeter waves can be executed efficiently, that is, it has a relationship of Line of Sight between the antennas. In a case where the antenna 61 of the wireless terminal apparatus 4 as the target does not exist within the area in the direction and there is a shielding object OB, the wireless power transmitter 3 determines that the wireless power transfer using the millimeter waves cannot be executed efficiently, that is, it does not have a relationship of Line of Sight between the antennas. The wireless power transmitter 3 controls the wireless power transfer using the millimeter waves on the basis of a determination result.

In a case where the wireless terminal apparatus 4 includes the antenna location determining function, the wireless terminal apparatus 4 photographs an image using the camera 404 when the wireless power transfer using the millimeter waves is received. The wireless terminal apparatus 4 determines, from the image, whether the antenna 361 of the wireless power transmitter 3 as the other side exists within a predetermined area centered on a direction of the antenna 61 or not and whether there is no shielding object OB within an area on a line of the direction or not. In a case where the antenna 361 of the wireless power transmitter 3 exists within the area in the direction and there is no shielding object OB, the wireless terminal apparatus 4 determines that the wireless power transfer using the millimeter waves can be received efficiently, that is, it has a relationship of Line of Sight between the antennas. In a case where the antenna 361 of the wireless power transmitter 3 as the target does not exist within the area in the direction and there is a shielding object OB, the wireless terminal apparatus 4 determines that the wireless power transfer using the millimeter waves cannot be received efficiently, that is, it does not have a relationship of Line of Sight between the antenna. The wireless terminal apparatus 4 controls an operation of power reception of the wireless power transfer using the millimeter waves on the basis of a determination result.

Similarly, with respect to the antenna location determining function, the wireless power transmitter 3 or the wireless terminal apparatus 4 may transmit determination result information to a wireless base station, and notify the wireless ruse station of it, whereby it may be reflected to scheduling. The wireless base station can execute the scheduling of an antenna dividing method, for example. Further, the wireless power transmitter 3 may transmit the determination result information to the wireless terminal apparatus 4 as the target, and notify the wireless terminal apparatus 4 of it. The wireless terminal apparatus 4 may transmit the determination result information to the wireless power transmitter 3 as the other side, and notify the wireless power transmitter 3 of it. The wireless terminal apparatus 4 may cause the user to output a prompt so as to adjust the location and the direction of the antenna 61.

The camera 404 and the camera 304 described above may be a lensless camera or another sensor that serves as the similar function. Note that a three-dimensional location coordinate or a distance (that is, a distance from the camera) of an object (a corresponding characteristic point) in a camera image can be estimated from a location coordinate of the object on the basis of known calculation. In particular, when electromagnetic waves of a millimeter wave band are used, it is important that the wireless power transmitter 3 and the wireless terminal apparatus 4 have a relationship of Line of Sight and a location relationship between the antennas is accurate. For that reason, it is effective to use the location determining function described above.

Further, in a case where the wireless terminal apparatus 4 has the configuration such as the antenna 61 as illustrated in FIG. 9 and the wireless power transmitter 3 is provided with the camera 304, the following can particularly be executed as the antenna location determining function. When the wireless terminal apparatus 4 uses the antenna 61, the wireless terminal apparatus 4 causes the LED element 612 described above (FIG. 10) to emit light, thereby transmitting a location of the antenna 61. The wireless power transmitter 3 grasps and tracks the location of the antenna 61 of the wireless terminal apparatus 4 from LED light in an image by analyzing the image of the camera 304. In a case where the camera 304 photographs a moving image, it is possible to track the location from, each image of the moving image. As a result, the wireless power transmitter 3 can grasp the location of the antenna 61 of the wireless terminal apparatus 4 with high accuracy, and this makes it possible to execute the wireless power transfer of the millimeter wave band on the basis of the grasp with higher accuracy. As another configuration example, an optical sensor may be provided in the wireless power transmitter 3 or the narrow-area base station 2 instead of the camera. This optical sensor detects the LED light of an antenna unit of the wireless terminal apparatus 4. Further, for example, infrared light may be emitted from the antenna unit of the wireless terminal apparatus 4, and a corresponding infrared sensor or the like may be used.

Moreover, the wireless power transmitter 3 determines, on the basis of the image of the camera 304, a case where a shielding object OB (including a person) is recognized within a predetermined area on a line between the antenna 361 of the wireless power transmitter and the antenna 61 of the wireless terminal apparatus 4. Alternatively, the wireless power transmitter 3 determines a case where a person is recognized in the vicinity of the area on the line or schematically in the image. In these cases, the wireless power transmitter 3 executes controls such that wireless power transfer is not started, wireless power transfer is stopped, or transmitted electric power is adjusted so as to be weakened. In a case where the wireless power transmitter 3 can confirm a state where any person is not recognized between the antennas, the wireless power transmitter 3 executes controls such that wireless power transfer is started, wireless power transfer is restarted, or transmitted electric power is restored.

Further, it is also effective to separate the plurality of antennas 61 of the wireless terminal apparatus 4 between the wireless power transfer and the wireless data communication at the time of scheduling on the basis of a directional characteristic of millimeter waves. For example, in FIG. 14, the antenna 61-4 for the millimeter waves is selected for the wireless power transfer, and the antenna 61-3 is selected for the wireless data communication. As a result, the wireless power transfer and the wireless data communication can be executed in a state of being spatially separated by the antennas, and this makes it possible to prevent or reduce interference therebetween.

[Antenna Switch and Antenna Dividing Method]

Figure 28:
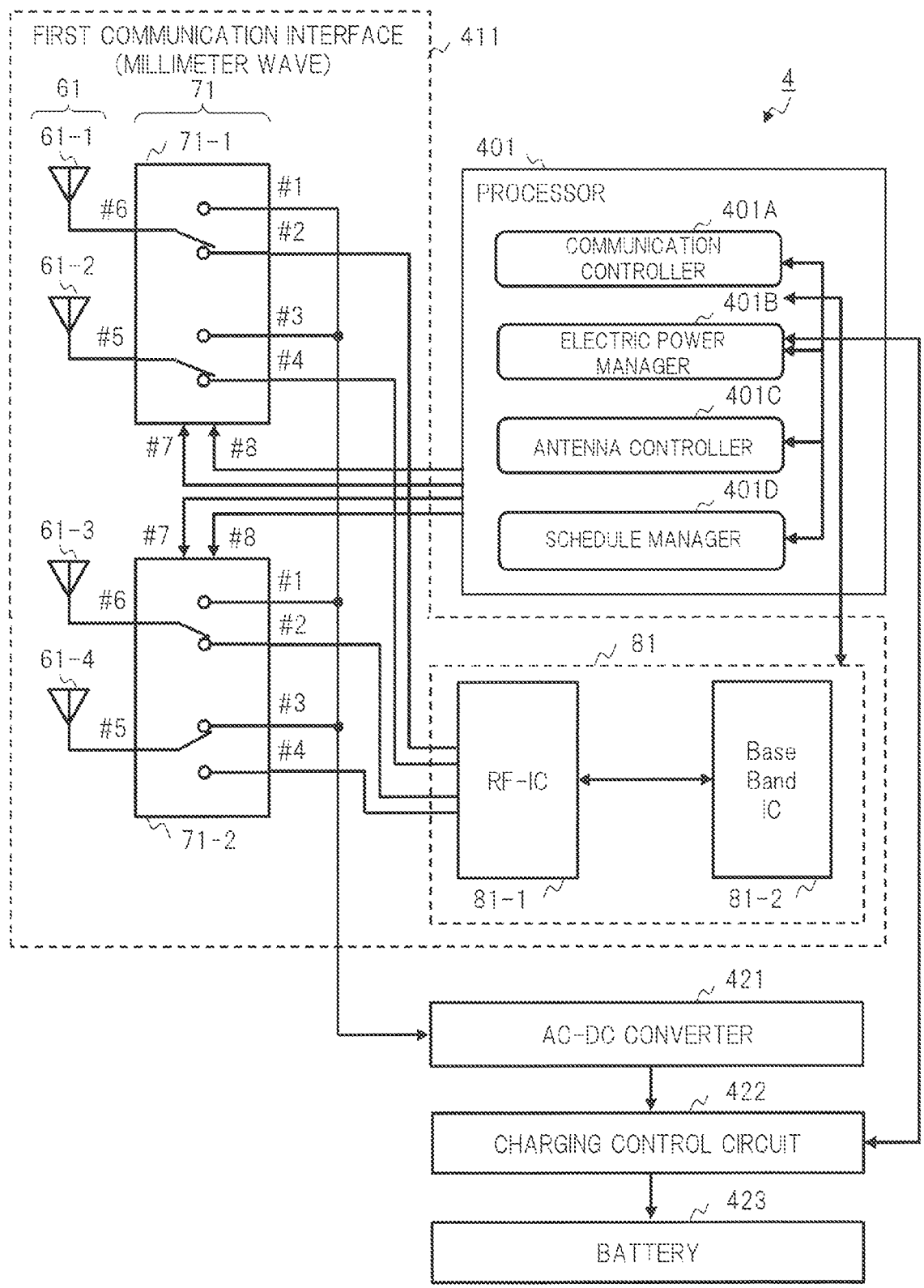
FIG. 28 is a view illustrating a configuration of a wireless terminal apparatus according to a third embodiment of the present invention.

FIG. 28 illustrates a configuration of the antenna switch 71 and the like of the first communication interface 411 in the wireless terminal apparatus 4 according to the third embodiment. The first communication interface 411 includes four antennas 61-1, 61-2, 61-3, 61-4 as illustrated in FIG. 9 as the antennas 61 that accept the millimeter wave band. In corresponding thereto, this configuration has two antenna switches 71 (71-1 and 71-2). A configuration of each of the antenna switches 71 is similar to that in case of FIG. 7, and has terminals of numbers #1 to #8, for example. The antennas 61-1 and 61-2 at a front face s1 are connected to the antenna switch 71-1.

The antennas 61-3 and 61-4 at a back face s2 side are connected to the antenna switch 71-2. An AC-DC converter 421 and a circuit 81 are respectively connected to connection destinations (#1 to #4) of the antenna switch 71-1 and the antenna switch 71-2. An antenna controller 401C controls switching of the antenna switches 71 (71-1, 71-2).

An example of scheduling by the antenna dividing method is as follows. Among the plurality of antennas 61 corresponding to the millimeter wave band, one antenna 61 is allocated for wireless power transfer, and another antenna 61 is allocated for wireless data communication. In an example of a state illustrated in FIG. 30, a connection destination of the antenna switch 71-2 is selected so that the antenna 61-4 is allocated for wireless power transfer and the antenna 61-3 is allocated for wireless data communication. Namely, by switches in the antenna switch 71-2, each of the terminals #2, #3 is selected as "H". As a result, the antenna 61-3 is connected to the circuit 81 side, and the antenna 61-4 is connected to the AC-DC converter 421 side.

At the time of scheduling, as described above, for example, the location determining function using the camera is used to determine the relationship of Line of Sight, and the antenna 61 is selected on the basis of its determination result. In particular, the antenna 61 for wireless power transfer is selected so that the relationship of Line of Sight between the antenna of the wireless power transmitter 3 and the antenna 61 of the wireless terminal apparatus 4 becomes good.

[Effects and the Like (3)]

As described above, according to the third embodiment, it is possible to obtain the similar effects to those of the first embodiment. In the third embodiment, by dividing the antennas to be used, it is possible to prevent or reduce the interference. In the third embodiment, it is possible to heighten location accuracy at the time of the wireless power transfer using the millimeter wave band, and this makes it possible to realize the wireless power transfer more efficiently.

Fourth Embodiment

A wireless power transfer system including a wireless terminal apparatus and a wireless power transmitter according to a fourth embodiment of the present invention will be described with reference to FIG. 29 and FIG. 30. In the fourth embodiment, in a case where a plurality of wireless terminal apparatuses exists within an area, with respect to a plurality of wireless data communications and a plurality of wireless power transfers, scheduling is executed so as to reduce interference.

[Scheduling Method (5)]

In the fourth embodiment, the following can be executed as a scheduling method. FIG. 29 illustrates the scheduling method and a configuration example of the wireless power transfer system. In the wireless power transfer system illustrated in FIG. 29, similarly to FIG. 2, a plurality of wireless terminal apparatuses 4 exists a power transferable range of one wireless power transmitter 3 (or a wireless base station power transmitter 5) within an area 101. A case where there are wireless terminal apparatuses 41, 42, and 43 is illustrated as examples of the plurality of wireless terminal apparatuses 4, each of which may become a candidate that receives wireless power transfer. A case where the plurality of wireless terminal apparatuses 4 (41 to 43) respectively generates wireless power transfer requests (requests RQ1 to RQ3) in schematically the same time zone is illustrated. A wireless base station (a wide-area base station 1 and a narrow-area base station) and the wireless power transmitter 3 grasp the plurality of wireless power transfer requests (requests RQ1 to RQ3). In the present embodiment, there are wireless data communications C1 to C3 and wireless power transfers W1 to W3 as a whole.

An electric power manager 401B of each of the wireless terminal apparatuses 4 grasps an electric power state including a state of a battery 423. A terminal information manager 301D of the wireless power transmitter 3 obtains terminal information JT containing the electric power state from the electric power manager 401B of each of the wireless terminal apparatuses 4 (41, 42, 43). For example, the terminal information JT contains information such as battery remaining electric power or an electric power consumed amount rate in addition to information on an ID and a type of the wireless terminal apparatus 4. The electric power consumed amount rate is an electric power consumed amount rate by a usage application. The wireless power transmitter 3 or the wireless base station grasps the electric power state of each of the wireless terminal apparatuses 4 (41 to 43) on the basis of the terminal information JT, and determines importance and priority regarding each of the wireless power transfers W1 to W3 on the basis of their electric power states.

For example, it is assumed that battery remaining electric powers are relatively small to large in the order of the wireless terminal apparatuses 41, 42, 43 as the electric power states of the wireless terminal apparatuses 4. The wireless power transmitter 3 determines that the wireless power transfer regarding the wireless terminal apparatus 4 whose battery remaining electric power is smaller is heightened as priority. The wireless base station executes scheduling on the basis of this determination of the priority by the wireless power transmitter 3. In the present embodiment, a schedule in which wireless resources are allocated is created with the wireless terminal apparatus 41 as first priority, the wireless terminal apparatus 42 as second, priority, and the wireless terminal apparatus 43 as third priority. For example, in case of a time division separation method, the wireless terminal apparatuses 4 are separated into the wireless power transfer W1 in a first time, the wireless power transfer W2 in a next second time, and the wireless power transfer W3 in a next third time, and the wireless terminal apparatus 4 having lower priority is postponed. Further, in a case where available frequencies are limited, the frequency is allocated from the wireless terminal apparatus 4 having high priority.

As another method of determining the priority, the priority may be determined on the basis of a type of the wireless terminal apparatus 4, a type of the application used by the wireless terminal apparatus 4, or the number of times or frequency of wireless power transfers in a history of the wireless power transfers. Further, as still another method, a method of setting priority regarding the wireless power transfer in advance among the plurality of wireless terminal apparatuses 4 in the area 101 and executing scheduling on the basis of the setting may be adopted.

[Scheduling Method (6)]

In the fourth embodiment, the following can also be executed as the scheduling method. FIG. 30 illustrates the scheduling method and a configuration example of the wireless power transfer system. In the configuration example illustrated in FIG. 30, similarly to FIG. 3, a plurality (for example, three) of wireless power transmitters 3 (31, 32, 33) is provided within an area 101. A plurality of wireless terminal apparatuses 4 (for example, the wireless terminal apparatuses 41, 42, 43) is provided with respect to these wireless power transmitters 3. A case where the plurality of wireless terminal apparatuses 4 (41 to 43) respectively generates wireless power transfer requests (requests RQ1 to RQ3) in schematically the same time zone is illustrated. A wireless base station grasps the plurality of wireless power transfer requests (requests RQ1 to RQ3) in cooperation with the plurality of wireless terminal apparatuses 4. In the present embodiment, there are wireless data communications C1 to C3 and wireless power transfers W1 to W3 as a whole.

The wireless base station, for example, the narrow-area base station 2 executes scheduling with respect to the plurality of wireless power transfer requests (requests RQ1 to RQ3). The narrow-area base station 2 may determine priority in the similar manner to the example of FIG. 29, for example. The narrow-area base station 2 respectively allocates different frequencies F1 to F3 to the wireless power transfers W1 to W3 by different channel numbers (that is, bandwidths) in accordance with the priority, for example. For example, a large number of channels are allocated to the wireless power transfer W1 having high priority.

[Effects and the Like (4)]

As described above, according to the fourth embodiment, the effects similar to those of the first embodiment can be obtained. In the fourth embodiment, it becomes possible to execute wireless power transfers efficiently while preventing interference among the plurality of wireless power transmitters 3 or among the plurality of wireless terminal apparatuses 4.

As described above, the present invention has been explained concretely on the basis of the embodiments. However, the present invention is not limited to the embodiments described above, and can be modified into various forms without departing from the substance thereof.

REFERENCE SINGS LIST

1 . . . wide-area base station, 2 . . . narrow-area base station, 3 . . . wireless power transmitter, 4 . . . wireless terminal apparatus, 101 . . . area, 102 . . . scheduling function, 103 . . . scheduling request function, 104 . . . scheduling request function, W1 . . . wireless power transfer, C1 (Ca, Cb) . . . wireless data communication.

The invention claimed is:

1. A wireless terminal apparatus constituting a wireless power transfer system,
the wireless power transfer system comprising:
the wireless terminal apparatus as a target of wireless power transfer;
a wireless power transmitter configured to execute the wireless power transfer to the wireless terminal apparatus; and
a wireless base station configured to relay wireless data communication of the wireless terminal apparatus,
wherein the wireless base station creates schedule information on a basis of grasp of a request of the wireless data communication and a request of the wireless power transfer of the wireless terminal apparatus, and transmits the schedule information to the wireless power transmitter and the wireless terminal apparatus, the schedule information containing allocation of wireless resources to the wireless data communication and the wireless power transfer,
wherein the wireless power transmitter executes the wireless power transfer to the wireless terminal apparatus in accordance with the schedule information, and
wherein the wireless terminal apparatus receives the wireless power transfer from the wireless power transmitter in accordance with the schedule information, and executes the wireless data communication via the wireless base station.

2. The wireless terminal apparatus according to claim 1,
wherein the wireless base station creates the schedule information so as to divide a time of the wireless data communication and a time of the wireless power transfer, and
wherein the wireless terminal apparatus executes the wireless data communication at the corresponding time according to the schedule information, and receives the wireless power transfer.

3. The wireless terminal apparatus according to claim 1,
wherein the wireless base station creates the schedule information so as to separate a frequency of electromagnetic waves for the wireless data communication from a frequency of electromagnetic waves for the wireless power transfer, and
wherein the wireless terminal apparatus executes the wireless data communication and receives the wireless power transfer at the corresponding frequency according to the schedule information.

4. The wireless terminal apparatus according to claim 1,
wherein the wireless base station creates the schedule information so as to separate an antenna used for the wireless data communication from an antenna used for the wireless power transfer,
wherein the wireless terminal apparatus includes a plurality of antennas, and
wherein the wireless terminal apparatus executes the wireless data communication and receives the wireless power transfer by using the corresponding antenna according to the schedule information.

5. The wireless terminal apparatus according to claim 1,
wherein the wireless power transfer system includes a plurality of wireless terminal apparatuses within an area as the wireless terminal apparatus,
wherein the wireless base station creates the schedule information so as to divide a time regarding a plurality of wireless power transfers for the plurality of wireless terminal apparatuses, and
wherein each of the wireless terminal apparatuses executes the wireless data communication and receives the wireless power transfer at the corresponding time according to the schedule information.

6. The wireless terminal apparatus according to claim 1,
wherein the wireless power transfer system includes a plurality of wireless terminal apparatuses within an area as the wireless terminal apparatus,
wherein the wireless base station creates the schedule information so as to divide frequencies of electromagnetic waves regarding a plurality of wireless power transfers for the plurality of wireless terminal apparatuses, and
wherein each of the wireless terminal apparatuses executes the wireless data communication and receives the wireless power transfer at the corresponding frequency according to the schedule information.

7. The wireless terminal apparatus according to claim 1,
wherein the wireless power transmitter executes the wireless power transfer using electromagnetic waves of a millimeter wave band, and
wherein the wireless terminal apparatus receives the wireless power transfer using the electromagnetic waves of the millimeter wave hand.

8. The wireless terminal apparatus according to claim 1,
wherein the wireless power transmitter includes a first power transmitter configured to execute the wireless power transfer using electromagnetic waves of a millimeter wave band and a second power transmitter configured to execute the wireless power transfer using electromagnetic waves of a microwave band,
wherein the wireless terminal apparatus includes a first communication interface using the electromagnetic waves of the millimeter wave band and a second communication interface using the electromagnetic waves of the microwave hand,
wherein the wireless base station creates the schedule information so as to separate a type of electromagnetic waves using the wireless data communication from a type of electromagnetic waves using the wireless power transfer, and
wherein the wireless terminal apparatus executes the wireless data communication and receives the wireless power transfer by using the communication interface corresponding to the type of the electromagnetic waves according to the schedule information.

9. The wireless terminal apparatus according to claim 1, further comprising:
an antenna allowed to share between the wireless power transfer and the wireless data communication;
a wireless power transfer circuit configured to charge a battery during the wireless power transfer;
a wireless data communication circuit configured to execute transmitting and receiving processes during the wireless data communication; and
a switch connected among the antenna, the wireless power transfer circuit, and the wireless data communication circuit,
wherein in accordance with the schedule information, the switch is switched so that the antenna is connected to the wireless power transfer circuit when the wireless power transfer is receives, and the switch is switched so that the antenna is connected to the wireless data communication circuit when the wireless data communication is executed.

10. The wireless terminal apparatus according to claim 1,
wherein the wireless power transmitter that executes the wireless power transfer is grasped using a camera or a sensor when the wireless power transfer is received.

11. The wireless terminal apparatus according to claim 1,
wherein the wireless terminal apparatus transmits the schedule information received from the wireless base station to the wireless power transfer.

12. The wireless terminal apparatus according to claim 1,
wherein the wireless power transmitter obtains, from the wireless base station, request information regarding a request of the wireless data communication and a request of the wireless power transfer of the wireless terminal apparatus; creates schedule information for preventing or reducing interference regarding the wireless data communication and the wireless power transfer on a basis of grasp of the request information; transmits the schedule information to the wireless terminal apparatus; and executes the wireless power transfer to the wireless terminal apparatus in accordance with the schedule information, the schedule information containing allocation of wireless resources to the wireless data communication and the wireless power transfer,
wherein the wireless terminal apparatus receives the wireless power transfer from the wireless power transmitter in accordance with the schedule information.

13. A wireless power transmitter constituting a wireless power transfer system,
the wireless power transfer system comprising:
a wireless terminal apparatus as a target of wireless power transfer;
the wireless power transmitter configured to execute wireless power transfer to the wireless terminal apparatus; and
a wireless base station configured to relay wireless data communication of the wireless terminal apparatus,
wherein the wireless base station creates schedule information on a basis of grasp of a request of the wireless data communication and a request of the wireless power transfer of the wireless terminal apparatus, and transmits the schedule information to the wireless power transmitter and the wireless terminal apparatus, the schedule information containing allocation of wireless resources to the wireless data communication and the wireless power transfer, wherein the wireless power transmitter executes the wireless power transfer to the wireless terminal apparatus in accordance with the schedule information, and wherein the wireless terminal apparatus receives the wireless power transfer from the wireless power transmitter in accordance with the schedule information, and executes the wireless data communication via the wireless base station.

14. The wireless power transmitter according to claim 13, wherein the wireless base station creates the schedule information so as to divide a time of the wireless data communication and a time of the wireless power transfer, and wherein the wireless power transmitter executes the wireless power transfer at the corresponding time according to the schedule information.

15. The wireless power transmitter according to claim 13, wherein the wireless base station creates the schedule information so as to separate a frequency of electromagnetic waves for the wireless data communication from a frequency of electromagnetic waves for the wireless power transfer, and wherein the wireless power transmitter executes the wireless power transfer at the corresponding frequency according to the schedule information.

16. The wireless power transmitter according to claim 13, wherein the wireless base station creates the schedule information so as to separate an antenna used for the wireless data communication from an antenna used for the wireless power transfer, wherein the wireless power transmitter includes a plurality of antennas, and executes the wireless power transfer by using the corresponding antenna according to the schedule information.

17. The wireless power transmitter according to claim 13, wherein the wireless power transfer system includes a plurality of wireless terminal apparatuses within an area as the wireless terminal apparatus, wherein the wireless base station creates the schedule information so as to divide a time regarding a plurality of wireless power transfers for the plurality of wireless terminal apparatuses, and wherein the wireless power transmitter executes the wireless power transfer at the corresponding time according to the schedule information.

18. The wireless power transmitter according to claim 13, wherein the wireless power transfer system includes a plurality of wireless terminal apparatuses within an area as the wireless terminal apparatus, wherein the wireless base station creates the schedule information so as to divide frequencies of electromagnetic waves regarding a plurality of wireless power transfers for the plurality of wireless terminal apparatuses, and wherein the wireless power transmitter executes the wireless power transfer at the corresponding frequency according to the schedule information.

19. The wireless power transmitter according to claim 13, wherein the wireless power transmitter executes the wireless power transfer using electromagnetic waves of a millimeter wave band, and wherein the wireless terminal apparatus receives the wireless power transfer using the electromagnetic waves of the millimeter wave band.

20. The wireless power transmitter according to claim 13, wherein the wireless power transmitter includes a first power transmitter configured to execute the wireless power transfer using electromagnetic waves of a millimeter wave band and a second power transmitter configured to execute the wireless power transfer using electromagnetic waves of a microwave band, wherein the wireless terminal apparatus includes a first communication interface using the electromagnetic waves of the millimeter wave band and a second communication interface using the electromagnetic waves of the microwave band, wherein the wireless base station creates the schedule information so as to separate a type of electromagnetic waves using the wireless data communication from a type of electromagnetic waves using the wireless power transfer, and wherein the wireless power transmitter executes the wireless power transfer by using the power transmitter corresponding to the type of the electromagnetic waves according to the schedule information.

21. The wireless power transmitter according to claim 13, wherein a location of the wireless terminal apparatus when viewed from the wireless power transmitter is calculated on a basis of location information indicating a location of the wireless terminal apparatus when viewed from the wireless base station, and the wireless power transfer is executed to the calculated location.

22. The wireless power transmitter according to claim 13, wherein the wireless terminal apparatus as the target of the wireless power transfer grasped by using a camera or a sensor when the wireless power transfer is executed.

23. The wireless power transmitter according to claim 13 wherein the wireless power transmitter receives the schedule information via the wireless terminal apparatus.

24. The wireless power transmitter according to claim 13, wherein the wireless power transmitter obtains, from the wireless base station, request information regarding a request of the wireless data communication of the wireless terminal apparatus and a request of the wireless power transfer; creates schedule information for preventing or reducing interference regarding the wireless data communication and the wireless power transfer on a basis of grasp of the request information; transmits the schedule information to the wireless terminal apparatus; and executes the wireless power transfer to the wireless terminal apparatus in accordance with the wireless power transfer request and the schedule information, wherein the wireless terminal apparatus receives the wireless power transfer from the wireless power transmitter in accordance with the schedule information.

* * * * *